US012405687B2

(12) United States Patent
Lee et al.

(10) Patent No.: US 12,405,687 B2
(45) Date of Patent: Sep. 2, 2025

(54) TOUCH DISPLAY DEVICE AND TOUCH SENSING METHOD

(71) Applicant: LG Display Co., Ltd., Seoul (KR)

(72) Inventors: HwiDeuk Lee, Gyeongsangbuk-do (KR); JuHong Kim, Incheon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/500,701

(22) Filed: Nov. 2, 2023

(65) Prior Publication Data

US 2024/0152228 A1 May 9, 2024

(30) Foreign Application Priority Data

Nov. 7, 2022 (KR) .......................... 10-2022-0147361

(51) Int. Cl.
*G06F 3/041* (2006.01)
(52) U.S. Cl.
CPC ............................. *G06F 3/04164* (2019.05)
(58) Field of Classification Search
None
See application file for complete search history.

(56) References Cited

U.S. PATENT DOCUMENTS

2011/0050586 A1* 3/2011 Miller ................. G06F 3/04146
345/173
2011/0242075 A1* 10/2011 Yamamoto ............ G06F 3/0412
250/208.6
2014/0327654 A1* 11/2014 Sugita ................... G06F 3/0445
345/87
2015/0339985 A1* 11/2015 Hong ...................... G06F 3/042
345/87
2016/0188040 A1* 6/2016 Shin ...................... G06F 3/0412
345/174
2017/0031505 A1* 2/2017 Kwon .................... G06F 3/0412
(Continued)

FOREIGN PATENT DOCUMENTS

CN 102207797 A 10/2011
CN 106997894 A 8/2017
(Continued)

*Primary Examiner* — Andre L Matthews
(74) *Attorney, Agent, or Firm* — Seed Intellectual Property Law Group LLP

(57) ABSTRACT

The present disclosure provides a touch display device comprising first and second subpixels included in adjacent first and second pixel areas in a column direction, first and second touch sensors respectively adjacent to the first and second pixel areas in a row direction, a first touch line electrically connected to the first and second touch sensors and extending in the column direction, a first sensing line extending in the column direction, a first sensing transistor configured to control an electrical connection between the first sensing line and the first touch sensor, a second sensing transistor configured to control electrical connection between the first sensing line and the second touch sensor, and a common touch bridge electrically connecting the first touch sensor and the second touch sensor to the first touch line. The touch display device can perform more accurate touch sensing by removing a ghost touch that may be caused by a temperature effect. In addition, the touch display device may reduce parasitic capacitance and load related to the touch sensor structure.

21 Claims, 28 Drawing Sheets

(56) References Cited

U.S. PATENT DOCUMENTS

| | | | |
|---|---|---|---|
| 2017/0068339 A1 | 3/2017 | Zimmerman et al. | |
| 2017/0185193 A1* | 6/2017 | Kim | G02F 1/136286 |
| 2018/0120994 A1* | 5/2018 | Yoo | G06F 3/047 |
| 2019/0278455 A1* | 9/2019 | Li | G09G 3/20 |
| 2020/0020747 A1* | 1/2020 | Bok | H10K 59/1213 |
| 2020/0097108 A1 | 3/2020 | Seo et al. | |
| 2022/0206619 A1 | 6/2022 | Kim et al. | |
| 2022/0221957 A1 | 7/2022 | Kim et al. | |
| 2022/0336784 A1 | 10/2022 | Kang et al. | |
| 2023/0200181 A1 | 6/2023 | Park et al. | |

FOREIGN PATENT DOCUMENTS

| | | |
|---|---|---|
| EP | 3156888 A1 | 4/2017 |
| EP | 4198696 A1 | 6/2023 |
| JP | 2014026465 A | 2/2014 |
| JP | 2018206390 A | 12/2018 |
| JP | 2022104582 A | 7/2022 |
| KR | 20130033827 A | 4/2013 |
| KR | 20170080967 A | 7/2017 |
| KR | 20200101255 A | 8/2020 |
| TW | 202125197 A | 7/2021 |
| TW | 202225930 A | 7/2022 |

\* cited by examiner

TOUCH DISPLAY DEVICE AND TOUCH SENSING METHOD

CROSS-REFERENCE TO RELATED APPLICATION

This application claims the benefit and priority from Korean Patent Application No. 10-2022-0147361, filed in the Republic of Korea on Nov. 7, 2022, the entire contents of which are hereby incorporated by reference for all purposes as if fully set forth into the present application.

BACKGROUND

Technical Field

The present disclosure relates to a touch display device and a touch sensing method.

Description of the Related Art

These days, touch display devices can provide a touch-based input method that enables users to easily and intuitively input information or commands, compared with typical input devices, such as buttons, keyboards, mice, and the like.

In the case of a self-emissive display, when a touch sensor is embedded in a display panel, parasitic capacitance of the touch sensor may increase due to electrical patterns (e.g., electrodes and/or lines for driving the display) disposed around the touch sensor in the display panel. Accordingly, touch sensitivity may be reduced. In addition, there is a problem that touch sensitivity is reduced due to a variance in parasitic capacitance by various causes, which are not clearly identified.

BRIEF SUMMARY

In the field of display technology and touch technology, although various technologies for improving touch sensitivity have been developed, a phenomenon where touch sensitivity is reduced has been still occurred, and causes of reducing the touch sensitivity have not been clearly determined.

The inventors of the present disclosure have performed long-term experiments and analyses to address these issues, and have identified a phenomenon where a ghost touch, which is not a touch inputted in actual, is recognized even after a touch input by a touch object such as a finger is ended.

In addition, the inventors have identified, through long-term experiments and analyses, a phenomenon where a ghost touch is recognized in a situation an image is changed.

The inventors have tried to determine the causes of the ghost touch through long-term experiments and analyses, and found that a variance in parasitic capacitance occurs in a touch sensor due to the characteristics of an organic material in a display panel, and in turn, this causes a ghost touch in a situation where a touch input by a touch object such as a finger is ended, or in a situation where an image is changed.

According to these developments, one or more embodiments of the present disclosure may provide a touch display device and a touch sensing method for eliminating a ghost touch.

One or more embodiments of the present disclosure may provide a touch display device and a touch sensing method for preventing a ghost touch from being recognized after a touch input by a touch object such as a finger is performed.

One or more embodiments of the present disclosure may provide a touch display device and a touch sensing method for preventing a ghost touch from being recognized in a situation where an image is changed.

One or more embodiments of the present disclosure may provide a touch display device having a temperature-sensing-enabled touch sensor structure, and a touch sensing method based on the temperature-sensing-enabled touch sensor structure.

One or more embodiments of the present disclosure may provide a touch display device and a touch sensing method for sensing a current in which temperature is reflected. One or more embodiments of the present disclosure may provide a touch display device and a touch sensing method for compensating for a value resulting from touch sensing based on a value by sensing current in which temperature is reflected.

One or more embodiments of the present disclosure may provide a touch display device and a touch sensing method for reducing parasitic capacitance and load in relation to a touch sensor structure.

According to aspects of the present disclosure, a touch display device can be provided that includes: a first subpixel included in a first pixel area and including a first light emitting element and a first scanning transistor; a second subpixel included in a second pixel area adjacent to the first pixel area in a column direction and including a second light emitting element and a second scanning transistor; a first touch sensor disposed in a first touch sensor area adjacent to the first pixel area in a row direction; a second touch sensor disposed in a second touch sensor area adjacent to the second pixel area in the row direction; a first touch line electrically connected to the first touch sensor and the second touch sensor and extending in the column direction; a first sensing line disposed adjacent to the first touch line and extending in the column direction; a first sensing transistor configured to control an electrical connection between the first sensing line and the first touch sensor; a second sensing transistor configured to control an electrical connection between the first sensing line and the second touch sensor; and a common touch bridge for electrically connecting the first touch sensor and the second touch sensor to the first touch line.

In one or more embodiments, the touch display device may further include a first scanning gate line electrically connected to a gate node of the first scanning transistor and a gate node of the first sensing transistor; and a second scanning gate line electrically connected to a gate node of the second scanning transistor and a gate node of the second sensing transistor.

In one or more embodiments, the common touch bridge of the touch display device may include a first horizontal common touch bridge line electrically connecting the first touch sensor and the second touch sensor to the first touch line, disposed between the first touch sensor and the second touch sensor, and extending in the row direction.

In one or more embodiments, the common touch bridge of the touch display device may further include a first resistor pattern located between the first horizontal common touch bridge line and the first touch sensor, and a second resistor pattern located between the first horizontal common touch bridge line and the second touch sensor.

The first resistor pattern may be a first extension portion of the first horizontal common touch bridge line or a first connection pattern electrically connected to the first horizontal common touch bridge line. The second resistor pattern may be a second extension portion of the first horizontal common touch bridge line or a second connection pattern electrically connected to the first horizontal common touch bridge line.

In one or more embodiments, the touch display device may further include a dummy touch bridge line adjacent to the second touch sensor in the column direction, disposed in parallel with the first horizontal common touch bridge line, and electrically separated from the first horizontal common touch bridge line.

In one or more embodiments, the common touch bridge of the touch display device may include a first horizontal common touch bridge line electrically connected to the first touch line, disposed between the first touch sensor and the second touch sensor, and extending in the row direction, and a first vertical common touch bridge line connecting the first touch sensor and the second touch sensor to the first horizontal common touch bridge line, and intersecting the first horizontal common touch bridge line.

In one or more embodiments, the common touch bridge of the touch display device may further include a first resistor pattern located between the first vertical common touch bridge line and the first touch sensor, and a second resistor pattern located between the first vertical common touch bridge line and the second touch sensor.

The first resistor pattern may be a first extension portion of the first vertical common touch bridge line or a first connection pattern electrically connected to the first vertical common touch bridge line. The second resistor pattern may be a second extension portion of the first vertical common touch bridge line or a second connection pattern electrically connected to the first vertical common touch bridge line.

In one or more embodiments, the touch display device may further include a dummy touch bridge line adjacent to the second touch sensor in the column direction, disposed in parallel with the first horizontal common touch bridge line, and electrically separated from the first horizontal common touch bridge line.

In one or more embodiments, in the touch display device, a portion of the first vertical common touch bridge line may overlap the first touch sensor, and another portion of the first vertical common touch bridge line may overlap the second touch sensor.

When the first sensing transistor and the second sensing transistor are turned off, a signal having a variable voltage level may be supplied to the first vertical common touch bridge line.

According to aspects of the present disclosure, a touch sensing method of a touch display device can be provided that includes: acquiring a temperature sensing value by sensing the temperature of a first touch sensor area or acquiring a temperature sensing value based on a current sensing value obtained by sensing a current through a first touch sensor disposed in the first touch sensor area; during a touch period, obtaining a first touch sensing value through the first touch sensor; generating a second touch sensing value by changing the first touch sensing value based on the temperature sensing value; and determining the presence or absence of a touch or a location of the touch based on the second touch sensing value.

According to one or more embodiments of the present disclosure, a touch display device and a touch sensing method may be provided for preventing a ghost touch, which is not a touch inputted in actual, but is recognized as if a touch had been inputted.

According to one or more embodiments of the present disclosure, a touch display device and a touch sensing method may be provided for preventing a ghost touch from being recognized after a touch is input by a touch object such as a finger is performed.

According to one or more embodiments of the present disclosure, a touch display device and a touch sensing method may be provided for preventing a ghost touch from being recognized in a situation where an image is changed.

According to one or more embodiments of the present disclosure, a touch display device having a temperature-sensing-enabled touch sensor structure may be provided, and a touch sensing method performed based on the temperature-sensing-enabled touch sensor structure may be provided.

According to one or more embodiments of the present disclosure, a touch display device and a touch sensing method may be provided for sensing a current in which temperature is reflected. According to one or more embodiments of the present disclosure, a touch display device and a touch sensing method may be provided for compensating for a value resulting from touch sensing based on a value obtained by sensing current in which temperature is reflected.

According to one or more embodiments of the present disclosure, a touch display device may be provided that has a shared touch bridge structure capable of reducing parasitic capacitance and load in relation to a touch sensor structure, and a touch sensing method performed based on the shared touch bridge structure may be provided.

According to one or more embodiments of the present disclosure, a touch display device may be provided that has a dummy touch bridge structure capable of preventing a phenomenon where a specific area (e.g., a specific horizontal area) in a screen is displayed abnormally, and a touch sensing method performed based on the dummy touch bridge structure may be provided.

BRIEF DESCRIPTION OF THE SEVERAL VIEWS OF THE DRAWINGS

The above and other aspects, features and advantages of the present disclosure will be more apparent from the following detailed description taken in conjunction with the accompanying drawings.

DETAILED DESCRIPTION

Figure 1:
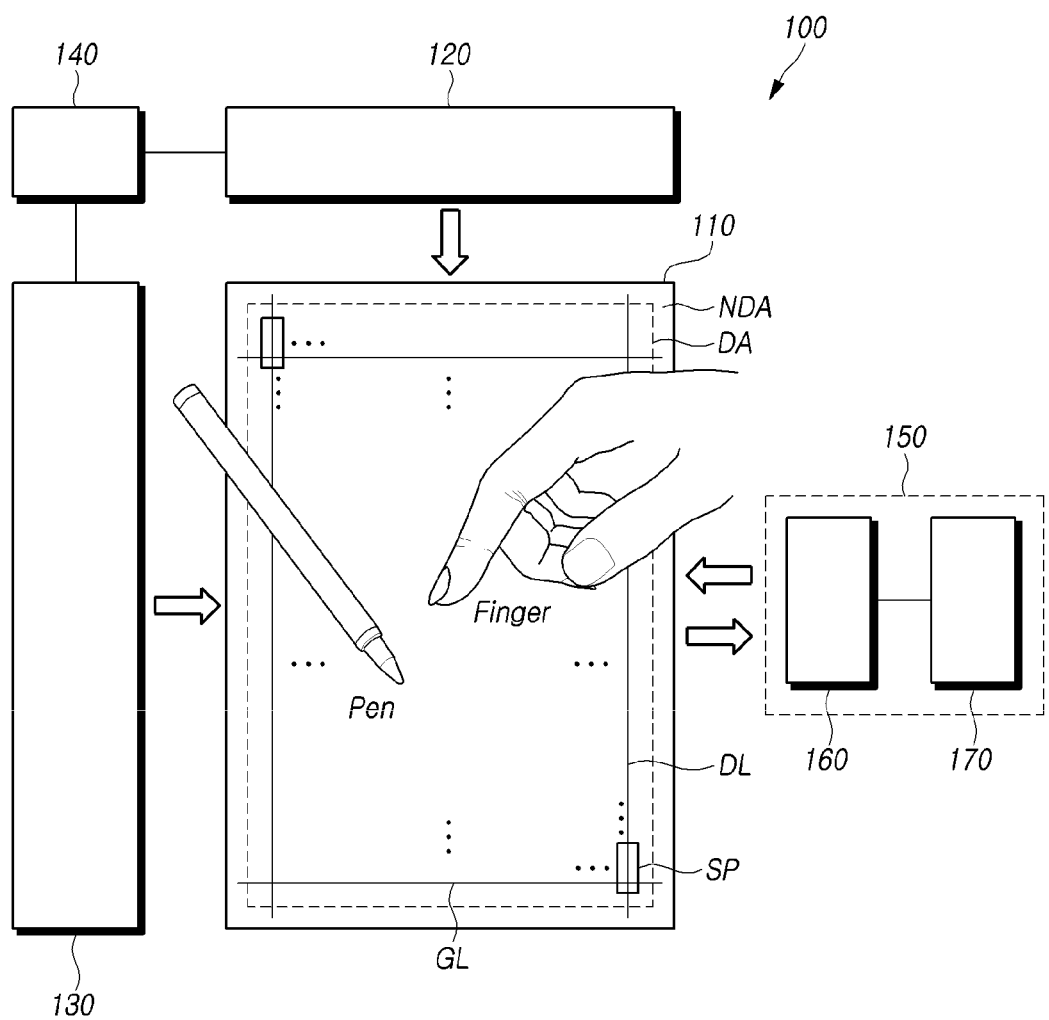
FIG. 1 is a system configuration diagram of a touch display device according to embodiments of the present disclosure.

Reference will now be made in detail to embodiments of the present disclosure, examples of which may be illustrated in the accompanying drawings.

In the following description, the structures, embodiments, implementations, methods and operations described herein are not limited to the specific example or examples set forth herein and may be changed as is known in the art, unless otherwise specified Like reference numerals designate like elements throughout, unless otherwise specified. Names of the respective elements used in the following explanations are selected only for convenience of writing the specification and may thus be different from those used in actual products. Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the protected scope of the present disclosure is defined by claims and their equivalents. In the following description, where the detailed description of the relevant known function or configuration may unnecessarily obscure aspects of the present disclosure, a detailed description of such known function or configuration may be omitted. The shapes, sizes, ratios, angles, numbers, and the like, which are illustrated in the drawings to describe various example embodiments of the present disclosure, are merely given by way of example. Therefore, the present disclosure is not limited to the illustrations in the drawings. Where the terms "comprise," "have," "include," "contain," "constitute," "make up of," "formed of," and the like are used, one or more other elements may be added unless the term, such as "only," is used. An element described in the singular form is intended to include a plurality of elements, and vice versa, unless the context clearly indicates otherwise.

Although the terms "first," "second," A, B, (a), (b), and the like may be used herein to describe various elements, these elements should not be interpreted to be limited by these terms as they are not used to define a particular order or precedence. These terms are used only to distinguish one element from another. For example, a first element could be termed a second element, and, similarly, a second element could be termed a first element, without departing from the scope of the present disclosure.

When it is mentioned that a first element "is connected or coupled to," "contacts or overlaps" etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

Where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third element or layer may be interposed therebetween. Furthermore, the terms "left," "right," "top," "bottom, "downward," "upward," "upper," "lower," and the like refer to an arbitrary frame of reference.

In addition, when any dimensions, relative sizes etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Hereinafter, various embodiments of the present disclosure will be described in detail with reference to the accompanying drawings.

FIG. 1 illustrates an example system configuration of a touch display device 100 according to embodiments of the present disclosure.

Referring to FIG. 1, the touch display device 100 may include a display panel 110 and a display driving circuit as components for displaying an image.

The display driving circuit may be a circuit for driving the display panel 110, and include a data driving circuit 120, a gate driving circuit 130, a display controller 140, and other circuit components.

The display panel 110 may include a display area DA in which one or more images can be displayed and a non-display area NDA in which an image is not displayed. The non-display area NDA may be an area outside of the display area DA, and may also be referred to as an edge area or a bezel area. For example, all or a portion of the non-display area NDA may be an area visible from the front of the touch display device 100. In another example, all or a portion of the non-display area NDA may be an area that is not visible from the front surface of the touch display device 100 because it is covered by a case or bent.

The display panel 110 may include a plurality of subpixels SP. The display panel 110 may further include various types of signal lines (which may also be referred to as signal wires) to drive the plurality of subpixels SP.

In one or more aspects, the touch display device 100 may be a display device in which the display panel 110 does not have a self-emissive capability, and instead, requires a backlight unit for illumination, for example, a liquid crystal display device, or be a self-emissive display device (which may also referred to as a self-luminous display device) in which the display panel 110 has a self-emissive capability. In one or more embodiments where the touch display device 100 according to aspects of the present disclosure is a self-emissive display device, each of the plurality of subpixels SP may include a light emitting element (which may also be referred to as a light emitting device).

In one embodiment, when the touch display device 100 according to aspects of the present disclosure is a self-emissive display device, the display device 100 may be an organic light emitting display device implemented using organic light emitting diodes (OLED) as light emitting elements. In another embodiment, when the touch display device 100 according to aspects of the present disclosure is a self-emissive display device, the touch display device 100 may be an inorganic light emitting display device implemented using light emitting diodes based on inorganic material as light emitting elements. In further another embodiment, when the touch display device 100 according to aspects of the present disclosure is a self-emissive display device, the touch display device 100 may be a quantum dot display device implemented using quantum dots as light emitting elements, which are self-emissive semiconductor crystals.

The structure of each of the plurality of subpixels SP may vary according to types of the touch display device 100. For example, when the touch display device 100 is a self-emissive display device including self-emissive subpixels SP, each subpixel SP may include a self-emissive light emitting element, one or more transistors, and one or more capacitors.

The various types of signal lines may include, for example, a plurality of data lines for transmitting data signals (also referred to as data voltages or image signals) and a plurality of gate lines for delivering gate signals (also referred to as scan signals).

The plurality of data lines and the plurality of gate lines may intersect each other. Each of the plurality of data lines may be disposed such that it extends in a first direction. Each of the plurality of gate lines may be disposed such that it extends in a second direction different from the first direction.

For example, the first direction may be a column or vertical direction, and the second direction may be a row or horizontal direction. In another example, the first direction may be the row or horizontal direction, and the second direction may be the column or vertical direction.

The data driving circuit 120 may be a circuit for driving a plurality of data lines, and can output data signals to the plurality of data lines. The gate driving circuit 130 may be a circuit for driving a plurality of gate lines, and can output gate signals to the plurality of gate lines. The display controller 140 may be a device configured to control the data driving circuit 120 and the gate driving circuit 130, and can control driving timings for the plurality of data lines and driving timings for the plurality of gate lines.

The display controller 140 can supply at least one data driving control signal to the data driving circuit 120 to control the data driving circuit 120. The display controller 140 can supply at least one gate driving control signal to the gate driving circuit 130 to control the gate driving circuit 130.

The data driving circuit 120 can supply data signals to the plurality of data lines according to the driving timing control of the display controller 140. The data driving circuit 120 can receive digital image data from the display controller 140, convert the received image data into analog data signals, and output the resulting analog data signals to the plurality of data lines DL.

The gate driving circuit 130 can supply gate signals to the plurality of gate lines GL according to the timing control of the display controller 140. The gate driving circuit 130 can receive a first gate voltage corresponding to a turn-on level voltage and a second gate voltage corresponding to a turn-off level voltage along with several types of gate driving control signals (e.g., a start signal, a reset signal, and the like). The gate driving circuit 130 can generate gate signals based on such gate driving control signals, the first gate voltage, and the second gate voltage, and supply the generated gate signals to the plurality of gate lines GL.

In one or more embodiments, the data driving circuit 120 may be connected to the display panel 110 using one of a tape-automated-bonding (TAB) technique, a chip-on-glass (COG) technique, a chip-on-panel (COP) technique, and a chip-on-film (COF) technique.

The gate driving circuit 130 may be disposed on or electrically connected to the substrate. In one or more embodiments, the gate driving circuit 130 may be connected to the display panel 110 using one of the tape-automated-bonding (TAB) technique, the chip-on-glass (COG) technique, the chip-on-panel (COP) technique, and the chip-on-film (COF) technique. In these embodiments, the gate driving circuit 130 may be directly or indirectly electrically connected to the substrate. In one or more embodiments, the gate driving circuit 130 may be disposed in the display panel 110 using a gate-in-panel (GIP) technique. For example, in the case of the gate in panel (GIP) type, the gate driving circuit 130 may be disposed in the non-display area NDA of the substrate.

In one or more embodiments, at least one of the data driving circuit 120 and the gate driving circuit 130 may be disposed in the display area DA of the display panel 110. In these embodiments, at least one of the data driving circuit 120 and the gate driving circuit 130 may be disposed not to overlap subpixels SP, or disposed to overlap one or more, or all, of the subpixels SP.

The data driving circuit 120 may be located in, and/or electrically connected to, but not limited to, only one side or portion (e.g., an upper edge or a lower edge) of the display panel 110. In one or more embodiments, the data driving circuit 120 may be located in, and/or electrically connected to, but not limited to, two sides or portions (e.g., an upper edge and a lower edge) of the display panel 110 or at least two of four sides or portions (e.g., the upper edge, the lower edge, a left edge, and a right edge) of the display panel 110 according to driving schemes, panel design schemes, or the like.

The gate driving circuit 130 may be located in, and/or electrically connected to, but not limited to, only one side or portion (e.g., a left edge or a right edge) of the display panel 110. In one or more embodiments, the gate driving circuit 130 may be located in, and/or electrically connected to, but not limited to, two sides or portions (e.g., a left edge and a right edge) of the panel 110 or at least two of four sides or portions (e.g., an upper edge, a lower edge, the left edge, and the right edge) of the panel 110 according to driving schemes, panel design schemes, or the like.

The display controller 140 may be implemented in a separate component from the data driving circuit 120, or incorporated in the data driving circuit 120 and thus implemented in an integrated circuit.

The display controller 140 may be a timing controller used in the typical display technology or a controller or a control device capable of performing other control functions in addition to the function of the typical timing controller. In one or more embodiments, the display controller 140 may be a controller or a control device different from the timing controller, or a circuitry or a component included in the controller or the control device. The display controller 140 may be implemented with various circuits or electronic components such as an integrated circuit (IC), a field programmable gate array (FPGA), an application specific integrated circuit (ASIC), a processor, and/or the like.

The display controller 140 may be mounted on a printed circuit board, a flexible printed circuit, and/or the like and be electrically connected to the gate driving circuit 120 and the data driving circuit 130 through the printed circuit board, flexible printed circuit, and/or the like.

The display controller 140 can transmit signals to, and receive signals from, the data driving circuit 120 via one or more predefined interfaces. For example, such interfaces may include, a low voltage differential signaling (LVDS) interface, an embedded clock point-point interface (EPI), a serial peripheral interface (SPI), and the like.

In one or more embodiments, the touch display device 100 according to aspects of the present disclosure can provide a touch sensing function as well as an image display function. To provide the touch sensing function, the touch display device 100 may include a touch panel and a touch sensing circuit 150. The touch sensing circuit 150 can sense the touch panel to detect whether a touch is input by a touch object (which may be referred to as a touch pointer), such as a finger, a pen, or the like, or detect the location of the touch.

The touch sensing circuit 150 may include a touch driving circuit 160 and a touch controller 170. The touch driving circuit 160 can drive and sense the touch panel, and thereby generate and output touch sensing data. The touch controller 170 can detect the presence or absence of a touch or detect the location of the touch using the touch sensing data supplied from the touch driving circuit 160.

The touch panel may include a plurality of touch electrodes as a touch sensor. The touch panel may also be referred to as a touch screen panel (TSP). The touch panel may further include a plurality of touch lines for electrically interconnecting the plurality of touch electrodes and the touch driving circuit 160. The touch panel or the plurality of touch electrodes may also be referred to as a touch sensor.

The touch panel may be located outside of the display panel 110 or inside of the display panel 110. The touch panel located outside of the display panel 110 may be referred to as an external type. In an example where the touch panel is implemented in the external type, the touch panel and the display panel 110 may be manufactured separately and combined during an assembly process. The touch panel may include a base substrate and a plurality of touch electrodes on the base substrate. The touch panel located inside of the display panel 110 may be referred to as an embedded type. In an example where the touch panel is implemented in the embedded type, the touch panel may be disposed in the display panel 110 during a manufacturing process of the display panel 110. In the touch panel implemented in the embedded type, the touch sensor may be disposed on the substrate along with various electrodes or lines for displaying an image.

The touch driving circuit 160 can supply a touch driving signal to at least one of the plurality of touch electrodes included in the touch sensor, and generate touch sensing data by sensing at least one of the plurality of touch electrodes.

The touch sensing circuit 150 can perform touch sensing using a self-capacitance sensing technique, and/or a mutual-capacitance sensing technique.

When the touch sensing circuit 150 performs touch sensing using the self-capacitance sensing technique, the touch sensing circuit 150 can perform touch sensing based on capacitance between each touch electrode and a touch object (e.g., a finger, a pen, etc.).

According to the self-capacitance sensing technique, each of the plurality of touch electrodes can serve as both a driving touch electrode and a sensing touch electrode. The touch driving circuit 160 can drive all, or one or some, of the plurality of touch electrodes and sense all, or one or some, of the plurality of touch electrodes.

When the touch sensing circuit 150 performs touch sensing using the mutual-capacitance sensing technique, the touch sensing circuit 150 can perform touch sensing based on capacitance between touch electrodes.

According to the mutual-capacitance sensing technique, the plurality of touch electrodes are divided into driving touch electrodes and sensing touch electrodes. The touch driving circuit 160 can drive the driving touch electrodes and sense the sensing touch electrodes.

As described above, the touch sensing circuit 150 can perform touch sensing using the self-capacitance sensing technique and/or the mutual-capacitance sensing technique. Hereinafter, for convenience of description, it is assumed that the touch sensing circuit 150 performs touch sensing using the self-capacitance sensing technique.

In one embodiment, the touch driving circuit 160 and the touch controller 170 included in the touch sensing circuit 150 may be implemented independently or in independent devices, or may be integrated into a single device.

Further, the touch driving circuit 160 and the data driving circuit 120 may be implemented independently or in independent devices, or may be integrated into a single device.

The touch display device 100 may further include a power supply circuit for supplying various types of power to the circuits for display driving and/or the touch sensing circuit 150.

The touch display device 100 according to aspects of the present disclosure may be a mobile terminal such as a smart phone, a tablet, or the like, or a monitor or television (TV) of various sizes, but embodiments of the present disclosure are not limited thereto. For example, the touch display device 100 may include displays of various types, or displays of various sizes, suitable for presenting information or images.

Figure 2:
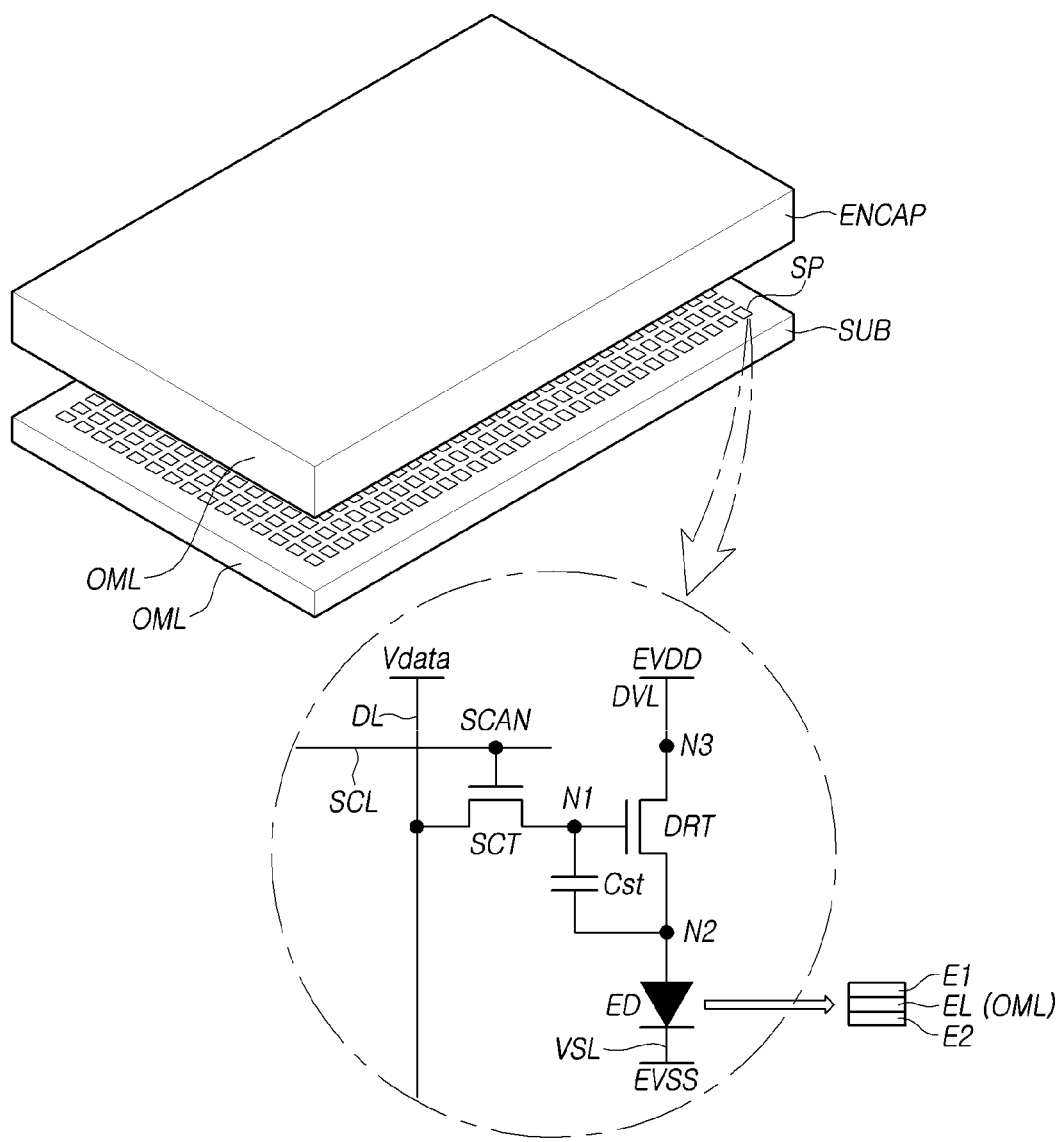
FIG. 2 illustrates a schematic structure of a display panel of the touch display device according to embodiments of the present disclosure.

FIG. 2 illustrates an example configuration of the display panel 110 of the touch display device 100 according to embodiments of the present disclosure.

Referring to FIG. 2, the display panel 110 may include a plurality of subpixels SP disposed on a substrate SUB. Each of the plurality of subpixels SP may include a light emitting element ED, a driving transistor DRT for driving the light emitting element ED, a scanning transistor SCT for transmitting a data voltage Vdata to a first node N1 of the driving transistor DRT, and a storage capacitor Cst for maintaining a voltage at an approximate constant level during one frame.

The driving transistor DRT may include the first node N1 to which a data voltage Vdata is applied, a second node N2 electrically connected to the light emitting element ED, and a third node N3 to which a first driving power signal EVDD through a first driving voltage line DVL is applied. In the driving transistor DRT, the first node N1 may be a gate node, the second node N2 may be a source node or a drain node, and the third node N3 may be the drain node or the source node.

The light emitting element ED may include a first electrode PE, an emission layer EL, and a second electrode CE.

For example, the first electrode E1 may be disposed in each subpixel SP and electrically connected to the second node N2 of the driving transistor DRT of the corresponding subpixel SP. The second electrode E2 may be commonly disposed in the plurality of subpixels SP, and a second driving power signal EVSS may be applied to the second electrode E2. The first electrode E1 may be referred to as a pixel electrode, and the second electrode E2 may be referred to as a common electrode.

For example, the first electrode E1 may be an anode electrode, and the second electrode E2 may be a cathode electrode. In another example, the first electrode E1 may be the anode electrode, and the second electrode E2 may be the cathode electrode.

The display panel 110 may further include a second driving power line VSL for supplying the second driving power signal EVSS to the second electrode E2.

Hereinafter, for convenience of description, it is assumed that the first electrode E1 is the pixel electrode and the anode electrode, and the second electrode E2 is the common electrode and the cathode electrode.

The light emitting element ED may be, for example, an organic light emitting diode (OLED), an inorganic light emitting diode, a quantum dot light emitting element, or the like. In an embodiment where the light emitting element ED is an organic light emitting diode (OLED), the emission layer EL of the light emitting element ED may include, as an organic emission layer, an organic layer OML including an organic material.

The scanning transistor SCT may be connected between the first node N1 of the driving transistor DRT and a corresponding data line DL among a plurality of data lines DL, and can control a voltage state in the first node N1 of the driving transistor DRT.

The scanning transistor SCT can control a connection between the first node N1, which is the gate node of the driving transistor DRT, and the corresponding data line DL according to a scanning gate signal SCAN delivered through a corresponding scanning gate line SCL among a plurality of scanning gate lines SCL, which are one type of gate line GL.

The drain node or the source node of the scanning transistor SCT may be electrically connected to the corresponding data line DL. The source node or drain node of the scanning transistor SCT may be electrically connected to the first node N1 of the driving transistor DRT. The gate node of the scanning transistor SCT may be electrically connected to the scanning gate line SCL to receive the scanning gate signal SCAN.

The scanning transistor SCT can be turned on by the scanning gate signal SCAN with a turn-on level voltage, and transmit a data voltage Vdata supplied through the corresponding data line DL to the first node N1 of the driving transistor DRT.

The scanning transistor SCT can be turned on by the scanning gate signal SCAN with the turn-on level voltage and turned off by the scanning gate signal SCAN with a turn-off level voltage. For example, when the scanning transistor SCT is an n-type transistor, the turn-on level voltage may be a high level voltage, and the turn-off level voltage may be a low level voltage. In another example, when the scanning transistor SCT is a p-type transistor, the turn-on level voltage may be the low level voltage, and the turn-off level voltage may be the high level voltage.

The storage capacitor Cst may be electrically connected between the first node N1 and the second node N2 of the driving transistor DRT.

In some embodiments, the storage capacitor Cst, which may be present between the first node N1 and the second node N2 of the driving transistor DRT, may be an external capacitor intentionally configured or designed to be located outside of the driving transistor DRT, other than internal capacitors, such as parasitic capacitors (e.g., a gate-to-source capacitance Cgs, a gate-to-drain capacitance Cgd, and the like).

Each of the driving transistor DRT and the scanning transistor SCT may be an n-type transistor, or a p-type transistor.

As illustrated in FIG. 2, each subpixel SP may have a 2T-1C structure in which two transistors (DRT and SCT) and one capacitor Cst are included. In one or more implementations, each subpixel SP may further include one or more transistors or one or more capacitors in the 2T-1C structure.

Since circuit elements (in particular, light emitting elements ED) in each subpixel SP are vulnerable to external moisture or oxygen, an encapsulation layer ENCAP may be disposed in the display panel 110. The encapsulation layer ENCAP can prevent the external moisture or oxygen from penetrating into the circuit elements (in particular, light emitting elements ED), and may be disposed in various types or have various shapes.

The encapsulation layer ENCAP may be disposed on the second electrode E2. The encapsulation layer ENCAP may have a stack of a single layer or a stack of a multilayer including several sub-encapsulation layers. For example, the encapsulation layer ENCAP may have a multilayer structure in which an inorganic encapsulation layer, an organic encapsulation layer, and an inorganic encapsulation layer are stacked.

As described above, the display panel 110 may include an organic layer OML disposed inside of the light emitting element ED or disposed over or under the light emitting element ED, and including an organic material. For example, to form the light emitting element ED, the emission layer EL of the light emitting element ED may include an organic layer OML including an organic material. Further, the encapsulation layer ENCAP may include an organic encapsulation layer, which is an organic layer OML including an organic material. Further, an organic layer OML including an organic material may be disposed under the encapsulation layer ENCAP to provide a planarization function or the like. Further, an organic layer OML including an organic material may be disposed on or over the encapsulation layer ENCAP. Thus, organic layers OML including an organic material may be disposed at various positions of the display panel 110 for various purposes.

In one or more embodiments, the touch display device 100 may have a top emission structure in which light from a light emitting element is emitted in a direction opposite to the substrate SUB of the display panel 110. In these embodiments, the first electrode E1, which is the pixel electrode, may be a reflective electrode (or a reflective metal) or a transparent electrode (or a transparent metal), and the second electrode E2, which is the common electrode, may be a transparent electrode (or a transparent metal).

Figure 3:
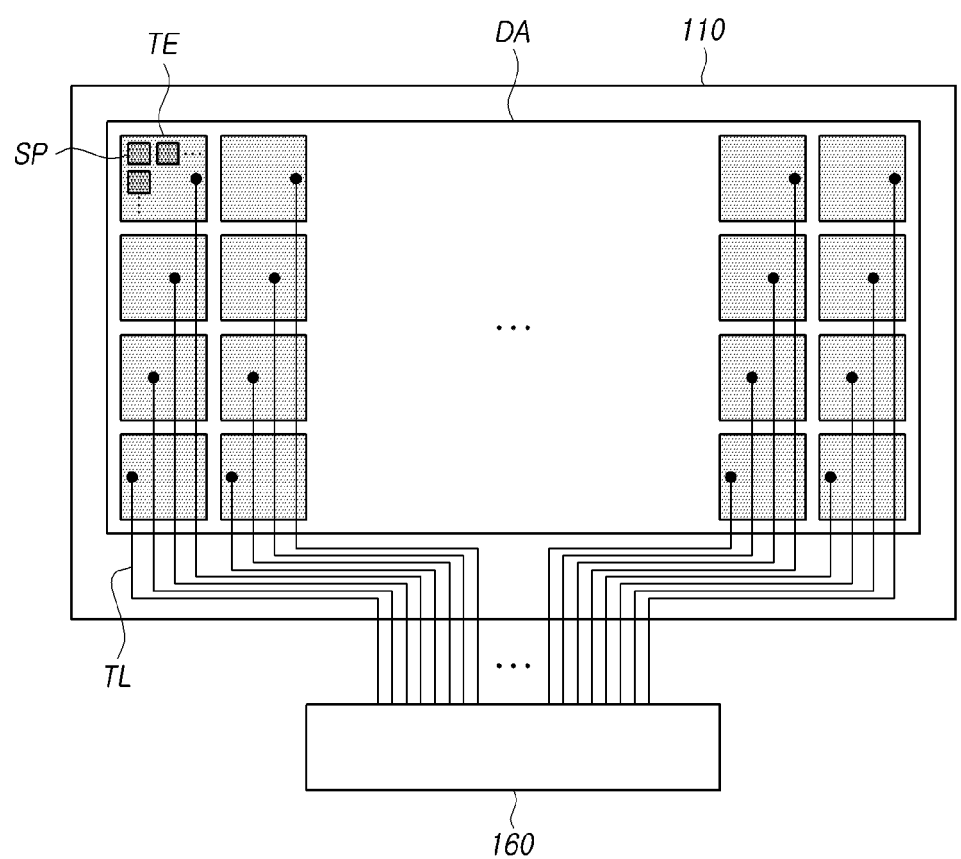
FIG. 3 schematically illustrates a touch sensing system of the touch display device according to embodiments of the present disclosure.

FIG. 3 illustrates an example touch sensing system of the touch display device 100 according to embodiments of the present disclosure.

Referring to FIG. 3, the display panel 110 of the touch display device 100 may include an embedded touch panel. Such a touch panel embedded in the display panel 110 may be referred to as an embedded touch panel, an in-cell type touch panel, an on-cell type touch panel, or the like.

Referring to FIG. 3, when a touch panel is embedded in the display panel 110 of the touch display device 100 according to embodiments of the disclosure, the display panel 110 may include a touch sensor disposed in the display area DA.

The touch sensor may include a plurality of touch electrodes TE separated from each other and disposed in the display area DA.

The touch sensor may further include a plurality of touch lines TL for electrically connecting each of the plurality of touch electrodes TE to the touch driving circuit 160. The touch lines TL may be also referred to as touch routing lines.

According to the example of FIG. 3, each of the plurality of touch electrodes TE may be disposed apart from each other. For example, the plurality of touch electrodes TE may not overlap each other in a vertical direction.

In another example, the plurality of touch electrodes TE may include touch electrodes TE arranged in a first direction and touch electrodes TE arranged in a second direction different from the first direction. In this example, the touch electrodes TE in the first direction and the touch electrodes TE in the second direction may intersect each other.

According to the example of FIG. 3, one or more touch lines TL may be connected to each of the plurality of touch electrodes TE. Each touch line TL can electrically connect the corresponding touch electrode TE (or two or more touch electrodes TE) to the touch driving circuit 160.

Each touch line TL may overlap one or more touch electrodes TE.

Referring to FIG. 3, for example, among touch electrodes TE disposed in a first column, a first touch electrodes TE disposed in a first row may be electrically connected to a first touch line TL. The first touch line TL may overlap one or more of the remaining touch electrodes TE except for the first touch electrodes TE among the touch electrodes TE disposed in the first column without being electrically connected to the one or more touch electrodes TE.

Referring to FIG. 3, for example, when the touch display device 100 senses a touch based on the self-capacitance sensing technique, the touch driving circuit 160 can supply a touch driving signal to at least one of a plurality of touch electrodes TE and sense the touch electrode TE to which the touch driving signal is supplied.

Each of the plurality of touch electrodes TE may be an electrode without an opening or a mesh-type electrode having a plurality of openings.

Each of the plurality of touch electrodes TE may be, for example, an opaque electrode or a transparent electrode. In another example, the plurality of touch electrodes TE may include at least one opaque electrode and at least one transparent electrode.

For example, each of the plurality of touch electrodes TE may overlap an area where two or more subpixels SP are formed. In another example, each of the plurality of touch electrodes TE may be located in an area not overlapping a subpixel SP.

A sensing value obtained by sensing the touch electrode TE to which the touch driving signal is supplied may be a value corresponding to a capacitance or a variance in capacitance in the touch electrode TE to which the touch driving signal is supplied. The capacitance in the touch electrode TE to which the touch driving signal is supplied may be a capacitance between the touch electrode TE to which the touch driving signal is supplied and a touch object, such as a finger.

As described above, in an example where a touch sensor including a plurality of touch electrodes TE is embedded in the display panel 110$n$ of the touch display device 100 according to embodiments of the disclosure, touch electrodes TE and touch lines TL may be formed together when patterns such as electrodes and lines related to display driving are formed during a manufacturing process of the display panel 110.

Figure 4:
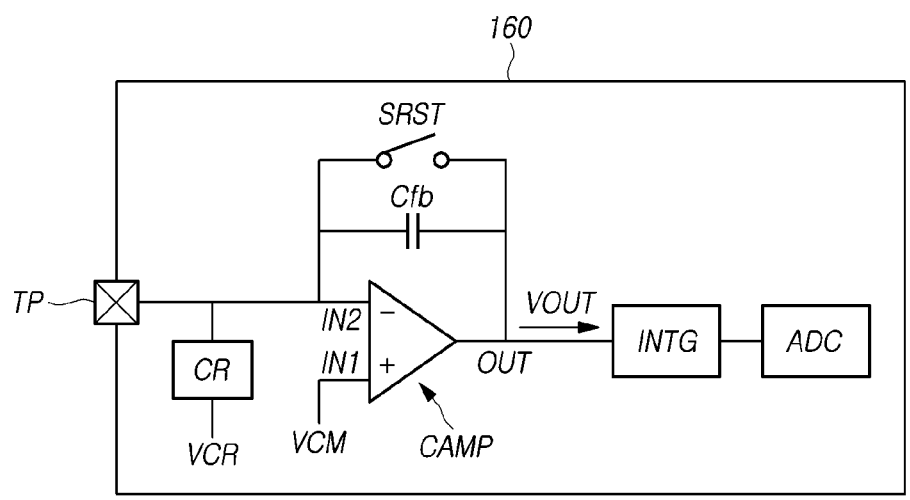
FIG. 4 illustrates a touch driving circuit of the touch display device according to embodiments of the present disclosure.

FIG. 4 illustrates an example configuration of the touch driving circuit 160 of the touch display device 100 according to embodiments of the present disclosure.

Referring to FIG. 4, the touch driving circuit 160 may include S (where S is a natural number of 1 or more) charge amplifiers CAMP and Q (where Q is a natural number of 1 or more) analog-to-digital converters ADC.

The touch driving circuit 160 may further include a first selection circuit for selecting S touch lines TL among a plurality of touch lines TL and electrically connecting the selected S touch lines TL to the S charge amplifiers CAMP. Further, the touch driving circuit 160 may further include a second selection circuit for selecting Q charge amplifiers among the S charge amplifiers CAMP and connecting the selected Q charge amplifiers to the Q analog-to-digital converters ADC.

Referring to FIG. 4, each charge amplifier CAMP may include a first input terminal IN1, a second input terminal IN2, and an output terminal OUT.

The charge amplifier CAMP may further include a feedback capacitor Cfb connected between the second input terminal IN2 and the output terminal OUT.

The charge amplifier CAMP may further include a reset switch SRST connected between the second input terminal IN2 and the output terminal OUT. While the touch driving circuit 160 performs an operation for touch sensing, the reset switch SRST may be in an off state.

A driving signal VCM can be input to the first input terminal IN1 of the charge amplifier CAMP. The second input terminal IN2 of the charge amplifier CAMP may be electrically connected to one touch pad TP which is selected among a plurality of touch pads TP disposed in the display panel 110. For example, one touch line TL may be electrically connected to the touch pad TP electrically connected to the second input terminal IN2.

The driving signal VCM input to the first input terminal IN1 of the charge amplifier CAMP can be supplied to a touch line TL connected to the touch pad TP through the second input terminal IN2 of the charge amplifier CAMP. The driving signal VCM supplied to the touch line TL can be supplied to a touch electrode TE connected to the touch line TL.

Referring to FIG. 4, the touch driving circuit 160 may further include a charge removal circuit CR connected to the second input terminal IN2 of the charge amplifier CAMP. The charge removal circuit CR can control an amount of electric charges at the second input terminal IN2 of the charge amplifier CAMP according to an input charge removal control signal VCR.

When electric charges are introduced into the second input terminal IN2 of the charge amplifier CAMP, the electric charges can be stored in the feedback capacitor Cfb. An output voltage VOUT corresponding to the amount of electric charges stored in the feedback capacitor Cfb can be output to the output terminal OUT of the charge amplifier CAMP.

The amount of electric charges stored in the feedback capacitor Cfb may vary depending on an electrical state (e.g., capacitance, etc.) in the touch electrode TE electrically connected to the second input terminal IN2 of the charge amplifier CAMP.

The analog-to-digital converter ADC can convert the output voltage VOUT output from the output terminal OUT of the charge amplifier CAMP into a digital value, and output the resulting digital value.

Referring to FIG. 4, the touch driving circuit 160 may further include an integrator INTG connected between the output terminal OUT of the charge amplifier CAMP and the analog-to-digital converter ADC. The integrator INTG can integrate output voltages VOUT output from the output terminal OUT of the charge amplifier CAMP, and output an integral value obtained by integrating the output voltages VOUT. The analog-to-digital converter ADC can convert the integral value into a digital value. Accordingly, the value output from the analog-to-digital converter ADC may be a value enabling more accurate information processing.

A value output from the analog-to-digital converter ADC during a touch period for touch sensing may be referred to as a touch sensing value. The touch controller 170 can determine the presence or absence of a touch and/or the location (or coordinates) of the touch using the touch sensing value output from the analog-to-digital converter ADC.

Figure 5:
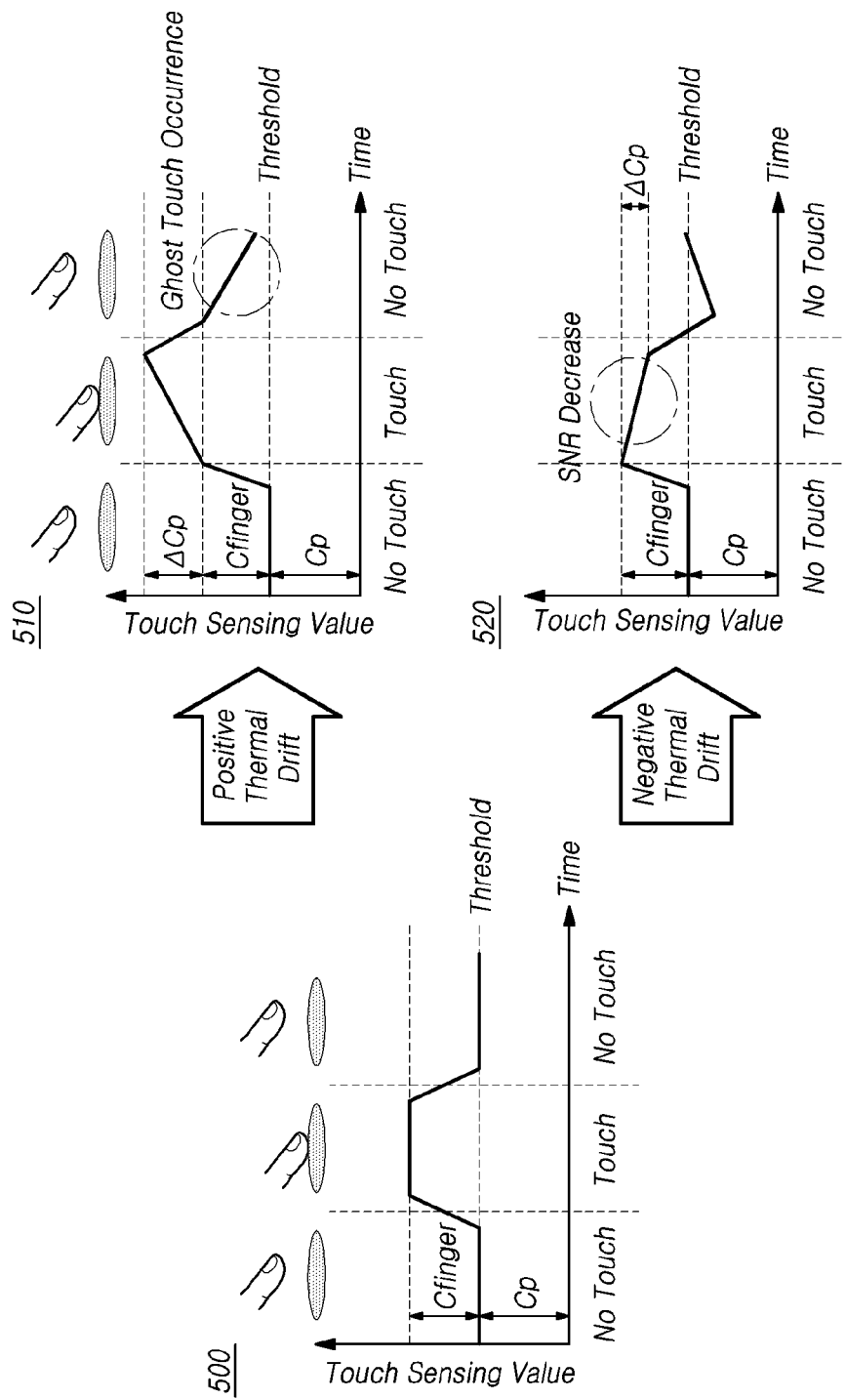
FIG. 5 is a diagram for explaining a variance in touch sensitivity when thermal drift is caused by a touch object in the touch display device according to embodiments of the present disclosure.

FIG. 5 illustrates an example variance in touch sensitivity when thermal drift is caused by a touch object in the touch display device 100 according to embodiments of the disclosure.

Three graphs (500, 510, and 520) illustrated in FIG. 5 are graphs, in a situation where a touch is input by a user with a touch pointer such as a finger or a pen for a predetermined time, that show touch sensing values output from the touch driving circuit 160 from before the touch is input to after the touch is input.

A reference graph 500 shows touch sensing values over time in a normal driving state in which the temperature of the touch pointer is not transferred to the display panel 110 when a user touches the display panel 110 with the touch pointer such as a finger or a pen.

Referring to the reference graph 500, a touch sensing value before a touch is input may have a threshold value. For example, the threshold value may be an intrinsic touch sensing value resulting from a parasitic capacitance Cp formed across a corresponding touch electrode TE among touch electrodes TE disposed in the display panel 110 even before a touch is input.

Referring to the reference graph 500, when a touch is input, a capacitance Cfinger between the corresponding touch electrode TE and the touch pointer can be formed, and thereby, a resulting touch sensing value can increase. The increased touch sensing value may be determined by the corresponding parasitic capacitance Cp and the capacitance Cfinger based on the touch pointer. For example, the capacitance based on the touch pointer may be self-capacitance.

Referring to the reference graph 500, after the touch is input, the increased touch sensing value may remain constant during a period in which the touch input is maintained.

Referring to the reference graph 500, when the pointer is lifted off by the user, i.e., when the touch is ended, the capacitance Cfinger based on the touch pointer is no longer formed, and therefore, the touch sensing value can decrease and reach a level (e.g., the threshold value) measured in a situation before the touch is input.

Referring to FIG. 5, first and second graphs (510 and 520) illustrate touch sensing values over time in a situation where when the display panel 110 is touched by a user with a touch pointer such as a finger or a pen, the temperature of the touch pointer becomes greater than that of the display panel 110, and thereby, the temperature of the touch pointer is transferred to the display panel 110.

Referring to FIG. 5, referring to the first graph 510, before the touch is input, a touch sensing value may have a threshold value. For example, the threshold value may be an intrinsic touch sensing value resulting from a parasitic capacitance Cp formed across a corresponding touch electrode TE among touch electrodes TE disposed in the display panel 110 even before the touch is input.

Referring to the first graph 510, when a touch is input, a capacitance Cfinger between the corresponding touch electrode TE and the touch pointer can be formed, and thereby, a resulting touch sensing value can increase. The increased touch sensing value may be determined by the corresponding parasitic capacitance Cp and the capacitance Cfinger based on the touch pointer.

Referring to the first graph 510, after the touch is input, during a period in which the touch input is maintained, the touch sensing value may not remain constant, and the touch sensing value may additionally increase.

As a result of analyzing causes of such an additional increase in the touch sensing value, the following results have been obtained. When the temperature of the touch pointer touching the display panel 110 is greater than the surface temperature of the display panel 110 (or the temperature of the corresponding touch electrode TE), the temperature of the touch pointer may be transferred to the display panel 110, and this may cause a variance in the temperature (e.g., an increase in the temperature) of the display panel 110. In turn, the parasitic capacitance at the touch electrode TE may increase, and this may lead to an additional increase in the touch sensing value.

As the temperature of the touch pointer is transferred to the display panel 110, the permittivity of an organic material included in one or more organic layers OML disposed in the display panel 110 may be varied by the temperature variance (e.g., the temperature increase) of the display panel 110. Due to this, the parasitic capacitance at the corresponding touch electrode TE can increase. The parasitic capacitance increase ΔCp at the corresponding touch electrode TE can additionally increase the touch sensing value. In this case, during a time period in which a touch is input, a parasitic capacitance increase ΔCp may be caused by such an organic material when the temperature increases, and may be based on intrinsic material characteristics of the organic material.

As shown in the first graph 510, when the temperature of the touch pointer is greater than the surface temperature of the display panel 110, the phenomenon in which the parasitic capacitance increase (ΔCp) by the higher temperature of the touch pointer during the touch input time period is caused may be referred to as a positive thermal drift phenomenon.

Referring to the first graph 510, when the touch pointer is lifted off by the user, i.e., when the touch is ended, the touch sensing value may not immediately fall to a level (e.g., the threshold value) measured in a situation before the touch is input, and even after the touch is ended, the touch sensing value may have a value greater than or equal to the threshold value for a certain time period. As a result, even after the touch is ended, a ghost touch may be recognized as if the touch had been still input. As described above, such a touch that is not input in actual but is recognized as if it were input is referred to as a ghost touch, and when the ghost touch is recognized, a significant decrease in touch sensitivity may occur.

Referring to FIG. 5, referring to the second graph 520, before the touch is input, a touch sensing value may have a threshold value. For example, the threshold value may be an intrinsic touch sensing value resulting from a parasitic capacitance Cp formed across a corresponding touch electrode TE among touch electrodes TE disposed in the display panel 110 even before the touch is input.

Referring to the second graph 520, when a touch is input, a capacitance Cfinger between the corresponding touch electrode TE and the touch pointer can be formed, and thereby, a resulting touch sensing value can increase. The increased touch sensing value may be determined by the corresponding parasitic capacitance Cp and the capacitance Cfinger based on the touch pointer.

Referring to the second graph 520, after the touch is input, during a period in which the touch input is maintained, the touch sensing value may not remain constant, and the touch sensing value may decrease.

As a result of analyzing causes of such a decrease in the touch sensing value, the following results have been obtained. When the temperature of the touch pointer touching the display panel 110 is greater than the surface temperature of the display panel 110 (or the temperature of the corresponding touch electrode TE), the temperature of the touch pointer may be transferred to the display panel 110, and this may cause a variance in the temperature of the display panel 110. In turn, the parasitic capacitance at the touch electrode TE may decrease, and this may lead to a decrease in the touch sensing value.

As the temperature of the touch pointer is transferred to the display panel 110, the permittivity of an organic material included in one or more organic layers OML disposed in the display panel 110 may be varied by the temperature variance (e.g., a temperature increase) of the organic material. Due to this, the parasitic capacitance at the corresponding touch electrode TE may decrease by intrinsic characteristics of the organic material. The parasitic capacitance decrease ΔCp at the corresponding touch electrode TE may decrease the touch sensing value. In this case, during a time period in which a touch is input, a parasitic capacitance decrease ΔCp may be caused by such an organic material when the temperature increases, and may be based on intrinsic material characteristics of the organic material.

As shown in the first graph 520, when the temperature of the touch pointer is greater than the surface temperature of the display panel 110, the phenomenon in which the parasitic capacitance decrease (ΔCp) by the higher temperature of the touch pointer during the touch input time period is caused may be referred to as a negative thermal drift phenomenon.

As described above, when the touch sensing value decreases while the touch input is maintained, a signal-to-noise ratio (SNR) may decrease, and the touch sensitivity may decrease.

Figure 6A:
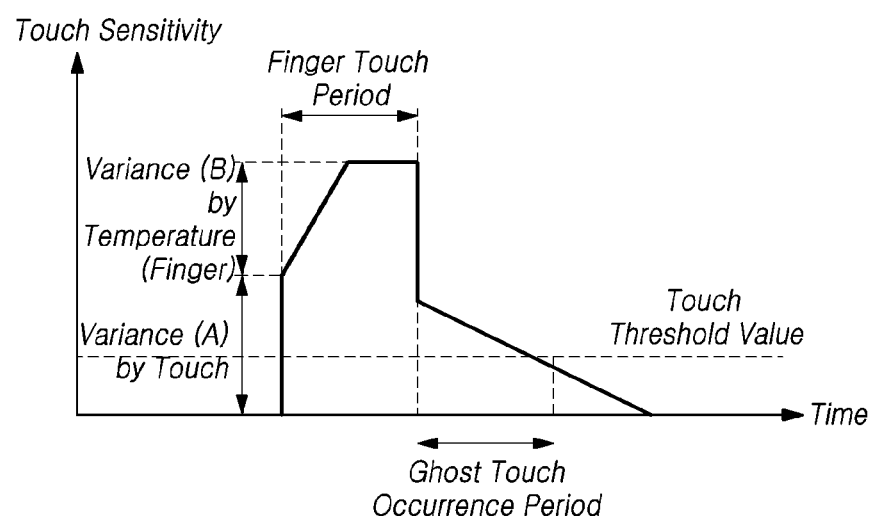
FIG. 6A is a diagram for explaining a variance in touch sensitivity caused by a finger touch in the touch display device according to embodiments of the present disclosure.

FIG. 6A illustrates a variance in touch sensitivity (e.g., a variance in a touch sensing value) by a touch using a touch pointer in the touch display device 100 according to embodiments of the disclosure.

Referring to FIG. 6A, when a touch is input by a touch pointer such as a finger, a pen, or the like, the temperature of the touch pointer may be transferred to the display panel 110, and a positive thermal drift phenomenon may occur.

Referring to FIG. 6A, a variance in the temperature of the display panel 110 may be caused by the touch of the touch pointer. A variance in a touch sensing value caused by the variance in the temperature of the display panel 110 by the touch through the touch pointer may include a touch sensing value variance A caused by the touch of the touch pointer and a touch sensing value variance B caused by the temperature of the touch pointer.

The touch sensing value variance A caused by the touch of the touch pointer, which is normally required for touch sensing, may be a variance caused by the touch of the touch pointer.

The touch sensing value variance B by the temperature of the touch pointer, which is an undesired variance that may cause a decrease in touch sensitivity, may be a variance caused by a parasitic capacitance increase ΔCp by a positive thermal drift phenomenon during a time period in which a touch by the touch pointer is input.

After the touch input by the touch pointer is ended, although the touch sensing value decreases, the touch sensing value may not immediately fall to a level measured in a situation before the touch is input, but may rather have a value greater than or equal to a touch threshold value for a predetermined time period. For example, the threshold value may mean a minimum touch sensing value or a reference value for determining that a touch is input.

Even when the touch input is ended, when a touch sensing value greater than or equal to the touch threshold value is obtained from the touch driving circuit 160 for a predetermined time period (a ghost touch generation period), the touch controller 170 may erroneously determine that the touch has occurred. The recognition of such a ghost touch may significantly reduce touch sensitivity.

Figure 6B:
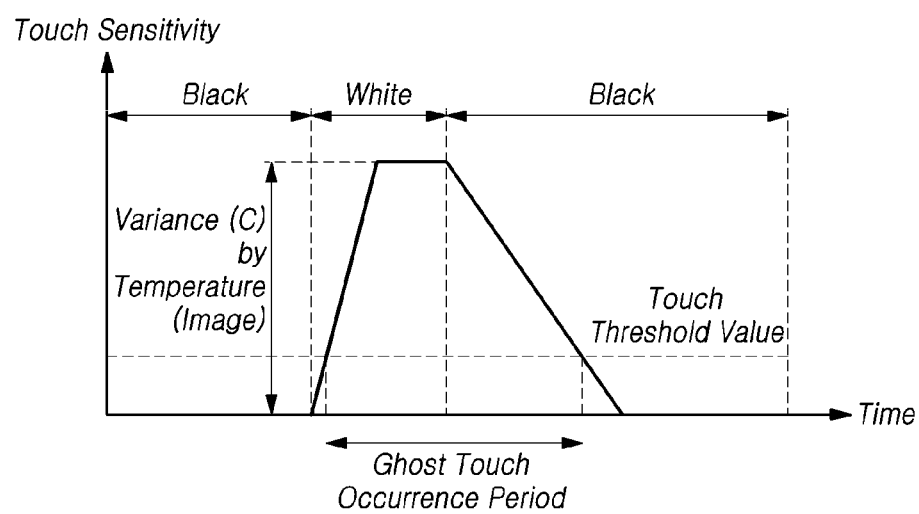
FIG. 6B is a diagram for explaining a variance in touch sensitivity caused by an image change in the touch display device according to embodiments of the present disclosure.

FIG. 6B illustrates a variance in touch sensitivity (e.g., a variance in a touch sensing value) as an image is changed in the touch display device 100 according to embodiments of the disclosure.

Referring to FIG. 6B, touch sensitivity may be decreased not only by a touch pointer but also by an image change.

Referring to FIG. 6B, a phenomenon in which the surface temperature of the display panel 110 is increased by a touch pointer may occur similarly even when an image is changed. That is, when an image is changed, a positive thermal drift phenomenon may occur similarly. In other words, although a touch is not input, a variance in a touch sensing value may be caused by a change in an image.

Referring to FIG. 6B, a variance in a touch sensing value by a change in an image may be considered as a variance C in a touch sensing value according to a variance in the temperature of the display panel 110 corresponding to the image change.

For example, when a low grayscale image (e.g., a black image) is changed to a high grayscale image (e.g., a white image), a touch sensing value greater than or equal to a touch threshold value may be obtained from the touch driving circuit 160 even though a touch is not input in actual. When the high grayscale image (e.g., the white image) is changed back to the low grayscale image (e.g., the black image), the touch sensing value may not fall immediately below the touch threshold value, but may fall below the touch threshold value after a certain time period passes.

Referring to FIG. 6B, even when a touch is not input in actual, when a touch sensing value greater than or equal to the touch threshold value is obtained from the touch driving circuit 160 according to a change in an image, the touch controller 170 may recognize that a touch is input during a period in which the touch sensing value is greater than or equal to the touch threshold value (or a period in which a ghost touch is recognized). The recognition of such a ghost touch may significantly reduce touch sensitivity.

To address these issues, embodiments of the disclosure may suggest a temperature sensing structure and a temperature sensing method for preventing a decrease in touch sensitivity according to a variance in the temperature of the display panel 110, and a method for compensating for the variance in touch sensitivity according to the temperature variance.

Hereinafter, a temperature sensing structure and a temperature sensing method according to embodiments of the disclosure and a method for compensating for a variance in touch sensitivity according to a variance in temperature will be described with reference to figures. It should be noted that a variance in the temperature of the display panel 110 may be caused by the temperature of a touch pointer such as a finger or a pen, or may be related to a change in an image.

Figure 7:
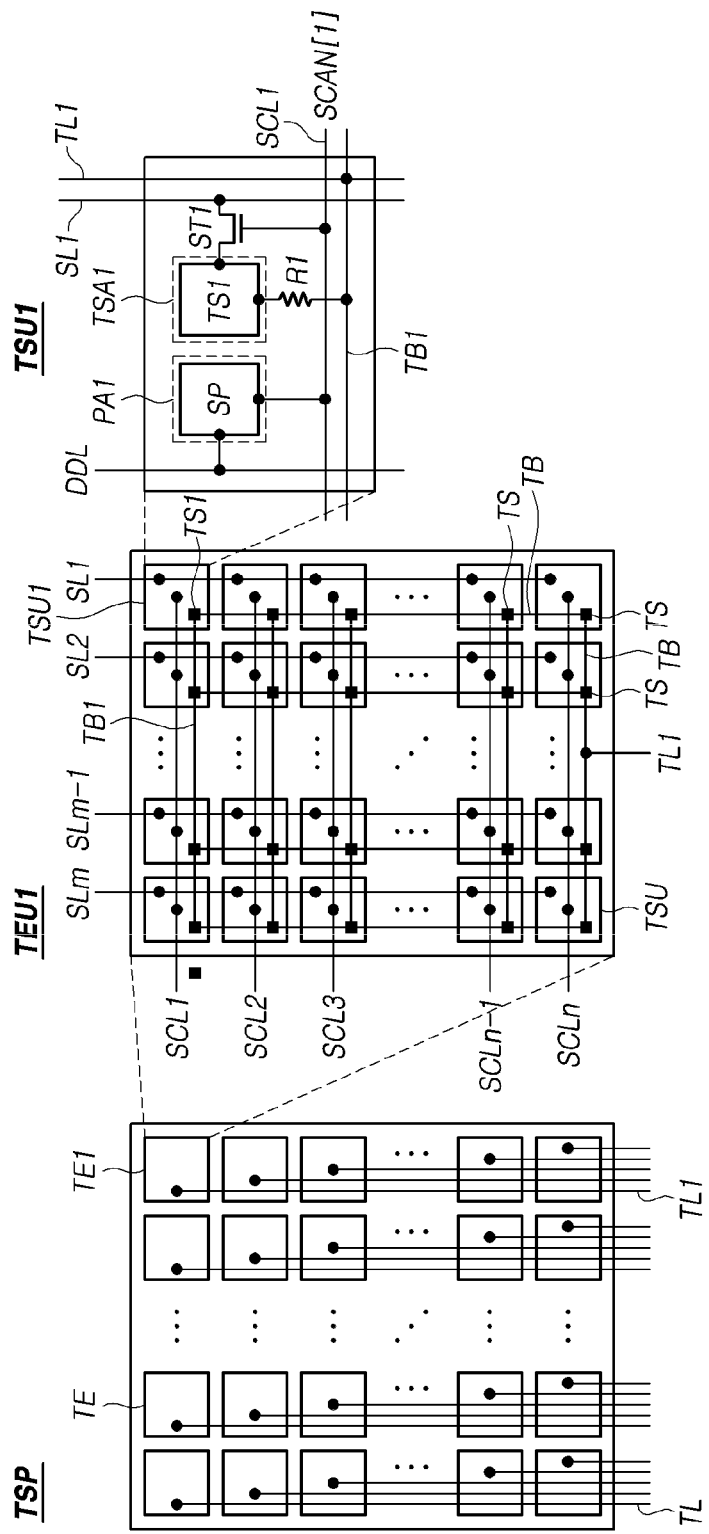
FIG. 7 illustrates a configuration of a touch sensor for compensating for a variance in touch sensitivity according to a variance in temperature of a display panel in the touch display device according to embodiments of the present disclosure.

FIG. 7 illustrates an example configuration of a touch sensor for compensating for a variance in touch sensitivity according to a variance in the temperature of the display panel 110 in the touch display device 100 according to embodiments of the present disclosure.

Referring to FIG. 7, a touch panel area TSP of the display panel 110 may include a plurality of touch electrodes TE and a plurality of touch lines TL. The plurality of touch lines TL may be connected to the plurality of touch electrodes TE, respectively.

The plurality of touch electrodes TE may include a first touch electrode TE1, and the plurality of touch lines TL may include a first touch line TL1 connected to the first touch electrode TE1.

Referring to FIG. 7, each of the plurality of touch electrodes TE may not be a single plate-shaped electrode, but may include touch sensors TS connected by touch bridge lines TB. The configuration of each of the plurality of touch electrodes TE will be discussed with the first touch electrode TE1 as an example.

Referring to FIG. 7, a first touch electrode area TEU1 in which the first touch electrode TE1 is disposed may include touch sensors TS arranged in n rows and m columns. For example, the first touch electrode area TEU1 in which the first touch electrode TE1 is disposed may include (nxm) touch sensors TS.

The first touch electrode area TEU1 may include touch bridge lines TB for electrically interconnecting all of the (nxm) touch sensors TS.

The touch bridge lines TB included in the first touch electrode area TEU1 may include row touch bridge lines TB for interconnecting touch sensors TS arranged in the same row, and column touch bridge lines TB for interconnecting touch sensors TS arranged in the same column.

Referring to FIG. 7, the (nxm) touch sensors TS included in the first touch electrode area TEU1 may include a first touch sensor TS1.

The touch bridge lines TB included in the first touch electrode area TEU1 may include a first touch bridge line TB1 for connecting the first touch sensor TS1 to another touch sensor TS adjacent to the first touch sensor TS1 in the row direction.

Referring to FIG. 7, the first touch electrode area TEU1 may include (nxm) touch sensor unit areas TSU. The (nxm) touch sensor unit areas TSU may be areas corresponding to the (nxm) touch sensors TS, respectively.

The structure of each of the (nxm) touch sensor unit areas TSU will be discussed with a first touch sensor unit area TSU1 in which the first touch sensor TS1 is located as an example.

Referring to FIG. 7, the first touch sensor unit area TSU1 may include a first pixel area PA1 in which at least one first subpixel SP is disposed and a first touch sensor area TSA1 in which the first touch sensor TS1 is disposed.

The first touch sensor area TSA1 may be located on one side of the first pixel area PA1.

The first subpixel SP disposed in the first pixel area PA1 may include a light emitting element ED, a scanning transistor SCT, and the like. The first subpixel SP may be configured as shown in FIG. 2.

Referring to FIG. 7, a first display driving line DDL may be disposed such that it runs across the first touch sensor unit area TSU1. The first display driving line DDL may be connected to the first subpixel SP1.

Referring to FIG. 7, a first touch line TL1 may be disposed such that it runs across the first touch sensor unit area TSU1. The first touch line TL1 may be electrically connected to the first touch sensor TS1. The first touch line TL1 may be connected to the touch driving circuit 160.

Referring to FIG. 7, the touch display device 100 according to embodiments of the disclosure may further include a first sensing line SL1 disposed adjacent to the first touch sensor TS1, and a first sensing transistor ST1 for control an electrical connection between the first sensing line SL1 and the first touch sensor TS1.

Referring to FIG. 7, the first sensing line SL1 may be disposed across the first touch sensor unit area TSU1, and the first sensing transistor ST1 may be disposed in the first touch sensor unit area TSU1.

Referring to FIG. 7, a first scanning gate line SCL1 may be electrically connected to the gate node of the scanning transistor SCT in the first subpixel SP. The first scanning gate line SCL1 may deliver a first scanning gate signal SCAN[1] to the gate node of the scanning transistor SCT in the first subpixel SP.

Referring to FIG. 7, the first scanning gate line SCL1 may be electrically connected to the gate node of the first sensing transistor ST1 in the first touch sensor unit area TSU1.

As such, the first scanning gate line SCL1 may simultaneously deliver the first scanning gate signal SCAN[1] to the scanning transistor SCT and the first sensing transistor ST1 in order to simultaneously control turn-on and/or turn-off of the first sensing transistor ST1 and the scanning transistor SCT in the first subpixel SP.

Accordingly, the first sensing transistor ST1 and the scanning transistor SCT of the first subpixel SP may be simultaneously turned on or off.

While the scanning transistor SCT of the first subpixel SP is turned on, the first sensing transistor ST1 may be turned on, and the first touch sensor TS1 and the first sensing line SL1 may be electrically connected to each other.

For example, while the first touch sensor TS1 and the first sensing line SL1 are connected, the scanning transistor SCT of the first subpixel SP may be in a turned-on state.

While the scanning transistor SCT of the first subpixel SP is turned off, the first sensing transistor ST1 may be turned off, and thereby, the first touch sensor TS1 and the first sensing line SL1 may be electrically separated from each other.

For example, while the first touch sensor TS1 and the first sensing line SL1 are disconnected, the scanning transistor SCT of the first subpixel SP may be in a turned-off state.

Referring to FIG. 7, the touch display device 100 according to embodiments of the disclosure may further include the first touch bridge line TB1 for an electrical connection between the first touch sensor TS1 and the first touch line TL1.

Referring to FIG. 7, a first resistor pattern R1 (which may also be referred to as a first sensing resistor R1) may be connected between the first touch line TL1 and the first touch sensor TS1.

The first resistor pattern R1 may be, for example, a resistor connected between the first touch bridge line TB1 and the first touch sensor TS1. In another example, the first resistor pattern R1 may be a resistor connected between an extension of the first touch bridge line TB1 and the first touch sensor TS1. In further another example, the first sensing resistor R1 may be a resistor present in the first touch bridge line TB1, or may be a resistance component of the first touch bridge line TB1 or an extension of the first touch bridge line TB1.

Referring to FIG. 7, the display panel 110 may further include one or more display common electrodes corresponding to a second electrode E2 of the light emitting element ED of the first subpixel SP.

In an example where one display common electrode is included in the display panel 110, the one display common electrode may be disposed in the entire area of the display panel 110, and may be a single metal without being divided into sub-electrodes.

In another example where the display panel 110 includes a plurality of display common electrodes, each of the plurality of display common electrodes may be disposed only in a respective pixel area in each touch sensor unit area TSU. For example, one display common electrode may be disposed in the first pixel area PA1 in the first touch sensor unit area TSU1.

Referring to FIG. 7, the first display driving line DDL may be various signal lines for display driving.

For example, the first display driving line DDL may include at least one of a data line DL for supplying a data voltage Vdata to the first subpixel SP, a first driving power line DVL for supplying a first driving power signal EVDD to the first subpixel SP, a second driving power line VSL for supplying a second driving power signal EVSS to the first subpixel SP, a reference voltage line for supplying a reference voltage to the first subpixel SP, and the like.

For example, when the first display driving line DDL is the second driving power line VSL, the first display driving line DDL may be the second driving power line VSL connected to a second electrode E2 among first and second electrodes (E1 and E2) of the light emitting element ED.

In this example, the first display driving line DDL, which is the second driving power line VSL, may be electrically connected to the second electrode E2 corresponding to the display common electrode among the first and second electrodes (E1 and E2) of the light emitting element ED of the first subpixel SP in the first pixel area PA1.

The first touch sensor TS1 disposed in the first touch sensor area TSA1 may include the same material as the display common electrode. For example, in the process of manufacturing the panel, display common electrodes (i.e., second electrodes E2) and touch sensors TS may be formed to be separated from each other by patterning a display common electrode material (e.g., a cathode electrode material).

Referring to FIG. 7, in the first touch sensor unit area TSU1, the first pixel area PA1 may be a non-transmissive area through which light is not transmitted, and the first touch sensor area TSA1 may be a transmissive area through which light can be transmitted so that a lower portion of, or a portion under, the display panel 110 can be viewed from the front of the display panel 110. Accordingly, the first touch sensor TS1 may be formed from a transparent electrode material. Further, the display common electrode disposed in the first pixel area PA1 may be formed from the same transparent electrode material as the first touch sensor TS1.

Figure 8:
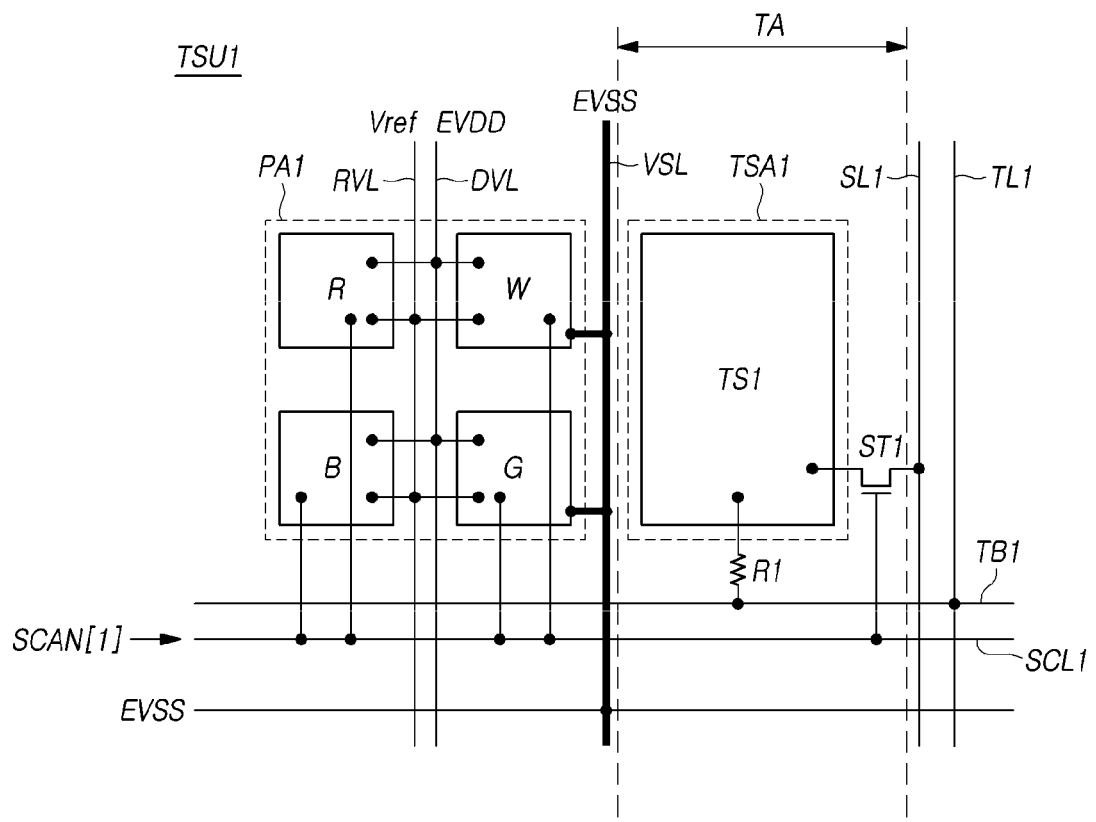
FIG. 8 illustrates a first touch sensor unit area of FIG. 7 in more detail.

FIG. 8 illustrates an example detailed configuration for the first touch sensor unit area TSU1 of FIG. 7.

The structure of the first touch sensor unit area TSU1 of FIG. 8 illustrates the structure of the first touch sensor unit area TSU1 of FIG. 7 in more detail. Accordingly, discussions on the structure of the first touch sensor unit area TSU1 of FIG. 8 will be provided by focusing on a different configuration from the structure of the first touch sensor unit area TSU1 of FIG. 7.

Referring to FIG. 8, three types of the first display driving line DDL, such as the first driving power line DVL, the second driving power line VSL, and the reference voltage line RVL may be arranged in the column direction.

Referring to FIG. 8, for example, four subpixels (R, W, B, and G) may be disposed in the first pixel area PA1. For example, the four subpixels (R, W, B, and G) may include a red subpixel R emitting red light, a white subpixel W emitting white light, a blue subpixel B emitting blue light, and a green subpixel G emitting green light.

For example, in the first pixel area PA1, the four subpixels (R, W, B, and G) may be arranged in two rows and two columns.

Referring to FIG. 8, the reference voltage line RVL and the first driving power line DVL may be disposed such that they run across the first pixel area PA1 in the column direction.

Referring to FIG. 8, the second driving power line VSL may be located between the first pixel area PA1 and the first touch sensor area TSA1 and may be disposed in the column direction. An auxiliary line connected to the second driving power line VSL may be disposed in the row direction.

Referring to FIG. 8, in the first touch sensor unit area TSU1, the first pixel area PA1 may be a non-transmissive area through which light is not transmitted, and the first touch sensor area TSA1 may be a transmissive area TA through which light can be transmitted. The transmissive area TA may refer to an area through which external light is transmitted, enabling a lower portion of, or a portion under, the display panel 110 to be viewed from the front of the display panel 110.

The first touch sensor TS1 may include a transparent electrode material. Further, one display common electrode disposed in the first pixel area PA1 may include the same transparent electrode material as the first touch sensor TS1. For example, the non-transmissive area may be an area in which transistors related to the subpixels (R, W, B, and G) in the first pixel area PA1 are disposed. The transmissive area TA may be an area outside of the non-transmissive area and may have a transmittance higher than the non-transmissive area. The transmissive area TA may be an area in which the transistors related to the subpixels (R, W, B, and G) in the first pixel area PA1 are not disposed. The transmissive area TA may include the first touch sensor area TSA1 in which the first touch sensor TS1 is disposed. The non-transmissive area may include an area in which the display common electrode is disposed, and the transmissive area TA may include an area in which the display common electrode is not disposed. The transmissive area TA described herein may also be referred to as a transparent area.

As described above, as a variance in the temperature of the display panel 110, or a change in an image, is caused by a touch of a touch pointer (e.g., a finger or a pen) having a temperature higher than the surface temperature of the display panel 110, an undesired parasitic capacitance variance ($\Delta Cp$) may be caused in a corresponding touch electrode TE, and thereby, touch sensitivity may be reduced.

In discussions that follow, since it can be understood that the image change has an effect equal to the temperature variance of the display panel 110, for convenience of description, even when it is described that the temperature variance of the display panel 110 is caused by a touch of a touch pointer (e.g., a finger or a pen) having a temperature higher than the surface temperature of the display panel 110, it should be understood that a situation of the temperature variance of the display panel 110 includes a situation of the image change. Here, the image change may mean a change in a grayscale of an image. The touch pointer may include a finger and a pen, but hereinafter, for convenience of description, the touch pointer will be considered to be a finger as an example.

The touch display device 100 according to embodiments of the disclosure may include a temperature sensing structure to compensate for a decrease in touch sensitivity due to a temperature variance of the display panel 110 caused by a finger touch.

The temperature sensing structure included in the touch display device 100 according to embodiments of the disclosure may be included in each of the plurality of touch sensor unit areas TSU.

Referring to FIGS. 7 and 8, a temperature sensing structure related to the first touch sensor unit area TSU1 may include a first sensing transistor ST1, a first resistor pattern R1, a first sensing line SL1, a first touch sensor TS1, and a first touch line TL1.

Hereinafter, discussions are provided for a temperature sensing method using a temperature sensing structure and a touch sensitivity variance compensation method based on temperature sensing.

Figure 9:
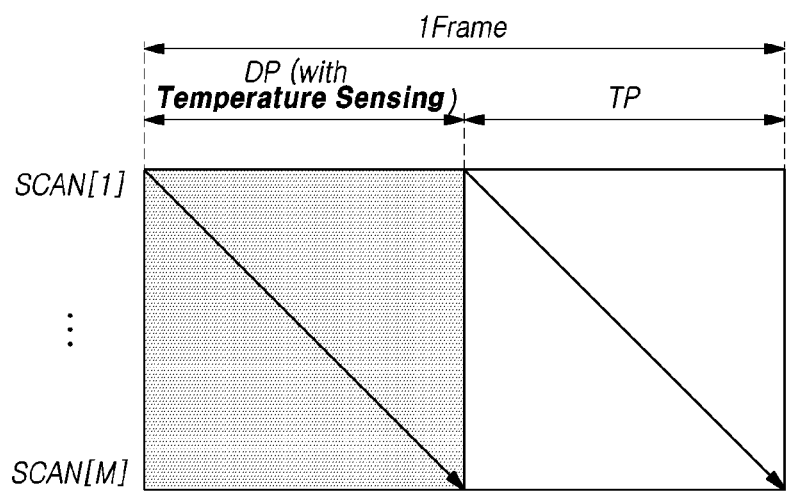
FIG. 9 is a driving timing diagram of the touch display device according to embodiments of the present disclosure.

FIG. 9 illustrates an example driving timing of the display device 100 according to embodiments of the present disclosure.

Referring to FIG. 9, for example, in the touch display device 100 according to embodiments of the disclosure, one frame time may be divided into one display period DP and one touch period TP. In this example, the touch display device 100 can perform display driving for image displaying (e.g., an image update) during the display period DP, and perform touch driving for touch sensing during the touch period TP.

In another example, in the touch display device 100 according to embodiments of the disclosure, one frame time may be divided into a plurality of display periods DP and a plurality of touch periods TP. In this example, the touch display device 100 can perform display driving for image displaying (e.g., an image update) during each display period DP, and perform touch driving for touch sensing during each touch period TP. In this example, the display periods DP and the touch periods TP may be alternated.

As illustrated in FIGS. 7 and 8, in the first touch sensor unit area TSU1, the first scanning gate line SCL1 may be simultaneously connected to the gate node of the scanning transistor SCT of the first subpixel SP and the gate node of the first sensing transistor ST1.

Accordingly, in the first touch sensor unit area TSU1, the first scanning gate line SCL1 may simultaneously supply the first scanning gate signal SCAN[1] to the gate node of the scanning transistor SCT of the first subpixel SP and the gate node of the first sensing transistor ST1.

Accordingly, in the first touch sensor unit area TSU1, the first sensing transistor ST1 and the scanning transistor SCT of the first subpixel SP may be simultaneously turned on or off.

As described above, as illustrated in FIG. 9, the touch display device 100 according to embodiments of the disclosure may simultaneously perform a temperature sensing operation during the display period DP.

The first sensing transistor ST1 in the first touch sensor unit area TSU1 can be turned on during the display period DP in which a data voltage for image displaying is supplied to the first subpixel SP in the first touch sensor unit area TSU1.

In other words, during a period in which the first sensing transistor ST1 in the first touch sensor unit area TSU1 is turned on, i.e., during a period in which a temperature sensing operation is executed, a data voltage Vdata for image displaying may be supplied to the first subpixel SP in the first touch sensor unit area TSU1.

During the touch period TP different from the display period DP, the first sensing transistor ST1 in the first touch sensor unit area TSU1 can be turned off. In this situation, the scanning transistor SCT of the first subpixel SP in the first touch sensor unit area TSU1 can be in a turned-off state.

The touch display device 100 according to embodiments of the disclosure can perform a temperature sensing processing in each of the plurality of touch sensor unit areas TSU included in each of the plurality of touch electrode areas TEU.

Hereinafter, the temperature sensing processing in the first touch sensor unit area TSU1 of the first touch electrode area TEU1 will be described as an example.

The first sensing transistor ST1 disposed in the first touch sensor unit area TSU1 may have characteristics in which mobility varies according to a temperature variance. By utilizing these characteristics, a temperature variance in the first touch sensor unit area TSU1 can be determined.

The touch display device 100 according to embodiments of the disclosure can measure a current flowing through the first sensing transistor ST1 disposed in the first touch sensor unit area TSU1, and sense or determine a temperature based on the measured current. Here, the current flowing through the first sensing transistor ST1 may vary depending on the mobility of the first sensing transistor ST1. When the mobility of the first sensing transistor ST1 increases, the amount of current flowing through the first sensing transistor ST1 can increase.

Temperature sensing of the touch display device 100 according to embodiments of the disclosure may be performed using two driving methods. According to the two driving methods, one or more lines on which current sensing for temperature sensing is performed may be different, and driving methods for each of the first sensing line SL1 and the first touch line TL1 may be different.

The two driving methods may include a first driving method in which a first sensing line SL1 serves as a current sensing path, and a second driving method in which a first touch line TL1 serves as a current sensing path. Hereinafter, the first driving method is described in detail first, and then the second driving method is described in detail.

Figure 10:
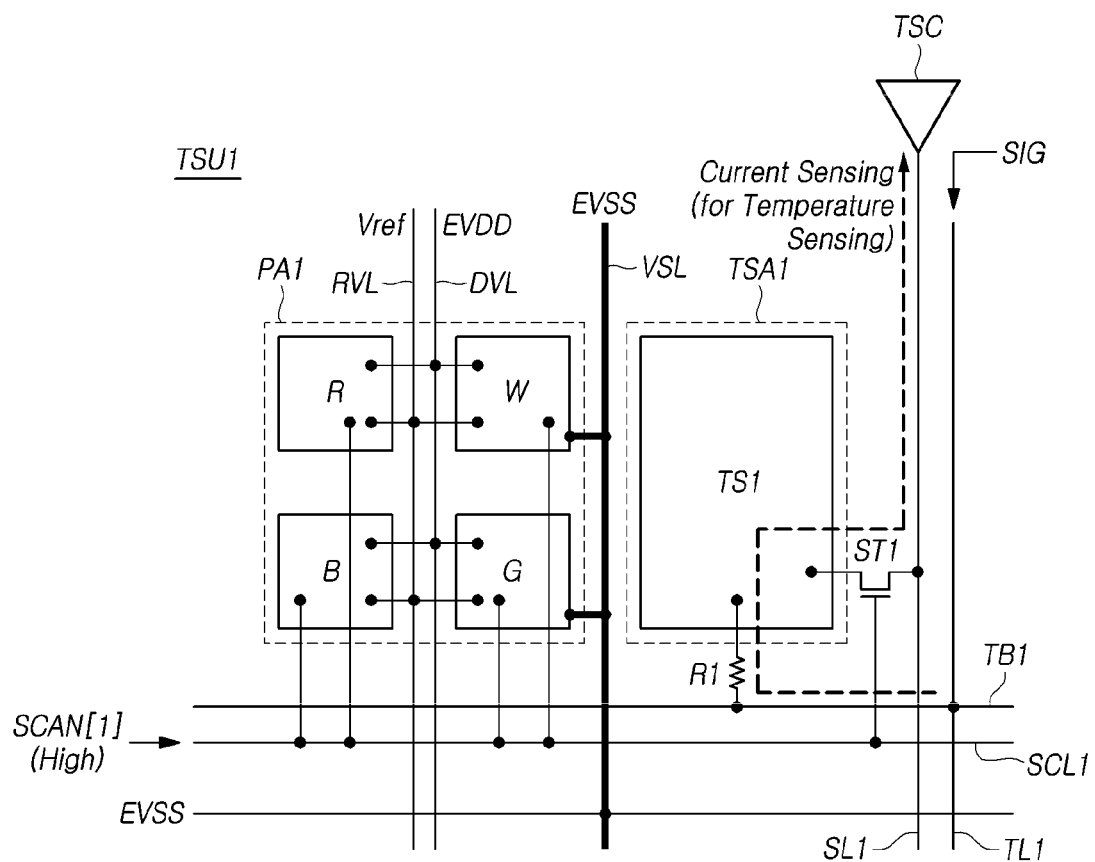
FIG. 10 illustrates a first touch sensor unit area during a display period in which temperature sensing is performed in the touch display device according to embodiments of the present disclosure.

FIG. 10 illustrates an example first touch sensor unit area TSU1 (e.g., the first touch sensor unit area TSU1 in the figures discussed above) during a display period DP in which temperature sensing proceeds in the touch display device 100 according to embodiments of the present disclosure.

Referring to FIG. 10, the touch display device 100 according to embodiments of the disclosure may further include a current sensing circuit TSC connected to the first sensing line SL1 to sense a current flowing through the first sensing line SL1.

Referring to FIG. 10, during a display period DP, a first scanning gate signal SCAN[1] may have a turn-on level voltage for a predetermined time (e.g., 1 horizontal time period or 2 horizontal time periods). As illustrated in FIG. 10, when the first sensing transistor ST1 is an n-type transistor, the turn-on level voltage of the first scanning gate signal SCAN[1] may be a high level voltage. When the first sensing transistor ST1 is a p-type transistor, the turn-on level voltage of the first scanning gate signal SCAN[1] may be a low level voltage.

Referring to FIG. 10, during the display period DP, when the first scanning gate signal SCAN[1] has the turn-on level voltage, the first sensing transistor ST1 can be turned on. In this situation, scanning transistors SCT included in the subpixels (R, W, B, and G) of the first pixel area PA1 can also be turned on.

Referring to FIG. 10, as the first sensing transistor ST1 is turned on for temperature sensing during the display period DP, the first touch sensor TS1 and the first sensing line SL1 can be electrically connected to each other through the first sensing transistor ST1.

For example, during the entire display period DP, temperature sensing may be performed. In another example, temperature sensing may be performed during a portion of the display period DP.

Referring to FIG. 10, a test signal SIG for temperature sensing may be supplied to the first touch line TL1 during the display period DP. For example, during the display period DP, the test signal SIG supplied to the first touch line TL1 for temperature sensing may be a voltage having a constant first voltage level or a voltage having a variable voltage level.

Referring to FIG. 10, when the test signal SIG is supplied to the first touch line TL1 for temperature sensing during the display period DP, no signal may be applied to the first sensing line SL1 or a voltage having a constant second voltage level may be applied to the first sensing line SL1. The second voltage level may be different from the first voltage level. For example, the second voltage level may be a voltage level lower than the first voltage level. In another example, the second voltage level may be a voltage level higher than the first voltage level.

During the display period DP, as the first sensing transistor ST1 is turned on, the first touch sensor TS1 and the first sensing line SL1 are electrically connected to each other, and the test signal SIG is applied to the first touch line TL1 connected to the first touch sensor TS1, a current can flow through the first sensing line SL1. For example, the path through which the current flows may include the first touch line TL1, the first touch bridge line TB1, the first touch sensor TS1, the first sensing transistor ST1, and the first sensing line SL1.

Referring to FIG. 10, during the display period DP, the current sensing circuit TSC connected to the first sensing line SL1 can sense the current flowing through the first sensing line SL1. For example, the current sensing circuit TSC may include an analog-to-digital converter. The analog-to-digital converter can convert a voltage corresponding to the current flowing through the first sensing line SL1 into a digital value and output the resulted digital value as a current sensing value.

In other words, during the display period DP, the first sensing transistor ST1 may be turned on. During a period in which the first sensing transistor ST1 is turned on, the touch driving circuit 160 can supply the test signal SIG to the first touch line TL1, and the current sensing circuit TSC can sense the current flowing through the first sensing line SL1.

During the display period DP, the first scanning gate signal SCAN[1] supplied to the gate node of the first sensing transistor ST1 in the first touch sensor unit area TSU1 may be simultaneously supplied to the gate node of the respective scanning transistor SCT included in each of the subpixels (R, W, B, and G) disposed in the first pixel area PA1 in the first touch sensor unit area TSU1.

Accordingly, when current sensing is performed through the first sensing transistor ST1 in the first touch sensor unit area TSU1 during the display period DP, display driving of the subpixels (R, W, B, and G) disposed in the first pixel area PA1 in the first touch sensor unit area TSU1 may be performed. For example, the display driving may include supplying data voltages Vdata for image displaying to the subpixels (R, W, B, and G).

Referring to FIG. 10, as the temperature of the first touch sensor area TSA1 increases during the display period DP, the amount of current flowing through the first sensing line SL1 per unit time may increase.

During the display period DP, as the temperature of the first touch sensor area TSA1 increases, the mobility of the first sensing transistor ST1 may increase, and thereby, the amount of current flowing through the first sensing line SL1 may increase per unit time.

During the display period DP, as the temperature of the first touch sensor area TSA1 decreases, the amount of current flowing through the first sensing line SL1 per unit time may decrease.

During the display period DP, as the temperature of the first touch sensor area TSA1 decreases, the mobility of the first sensing transistor ST1 may decrease, and thereby, the amount of current flowing through the first sensing line SL1 may decrease per unit time.

In order to increase the accuracy of temperature sensing, the first sensing transistor ST1 may be a transistor having a characteristic in which a mobility variance relative to a temperature variance is large. That is, the first sensing transistor ST1 may be a transistor having a characteristic variance sensitive to a temperature variance.

For example, the first sensing transistor ST1 may be an oxide transistor having an active layer including an oxide semiconductor material.

A temperature variance in the first touch sensor area TSA1 may be caused by a touch by a finger in the first touch sensor area TSA1 or around the first touch sensor area TSA, or may occur in a situation where an image displayed in relation to the first pixel area PA1 is changed.

During the display period DP, when a touch is input by a finger in or around the first touch sensor area TSA1, or when a grayscale of an image displayed in relation to the first pixel area PA1 increases, the amount of current flowing through the first sensing line SL1 may increase.

An increase in current by such a finger touch is described in more detail.

When a touch is input by a finger in or around the first touch sensor area TSA1 of the first touch sensor unit area TSU1, the display panel 110 may be affected by the temperature of the finger, and thereby, the temperature of the first touch sensor unit area TSU1 may increase. Accordingly, the mobility of the first sensing transistor ST1 of the first touch sensor unit area TSU1 may increase, and thereby, the amount of current per unit time through the first sensing transistor ST1 may increase.

An increase in current by a change in an image is described in more detail.

When an image displayed in relation to the first pixel area PA1 of the first touch sensor unit area TSU1 is changed, a temperature in the first touch sensor unit area TSU1 may vary.

For example, when an image displayed in relation to the first pixel area PA1 of the first touch sensor unit area TSU1 is changed from a low grayscale image (e.g., a black image) to a high grayscale image (e.g., a white image), the temperature of the first touch sensor unit area TSU1 may increase. Accordingly, the mobility of the first sensing transistor ST1 of the first touch sensor unit area TSU1 may increase, and thereby, the amount of current flowing through the first sensing transistor ST1 may increase per unit time.

As the amount of current flowing through the first sensing line SL1 per unit time varies during the display period DP, a touch sensing value obtained during a touch period TP after the display period DP may vary.

Figure 11:
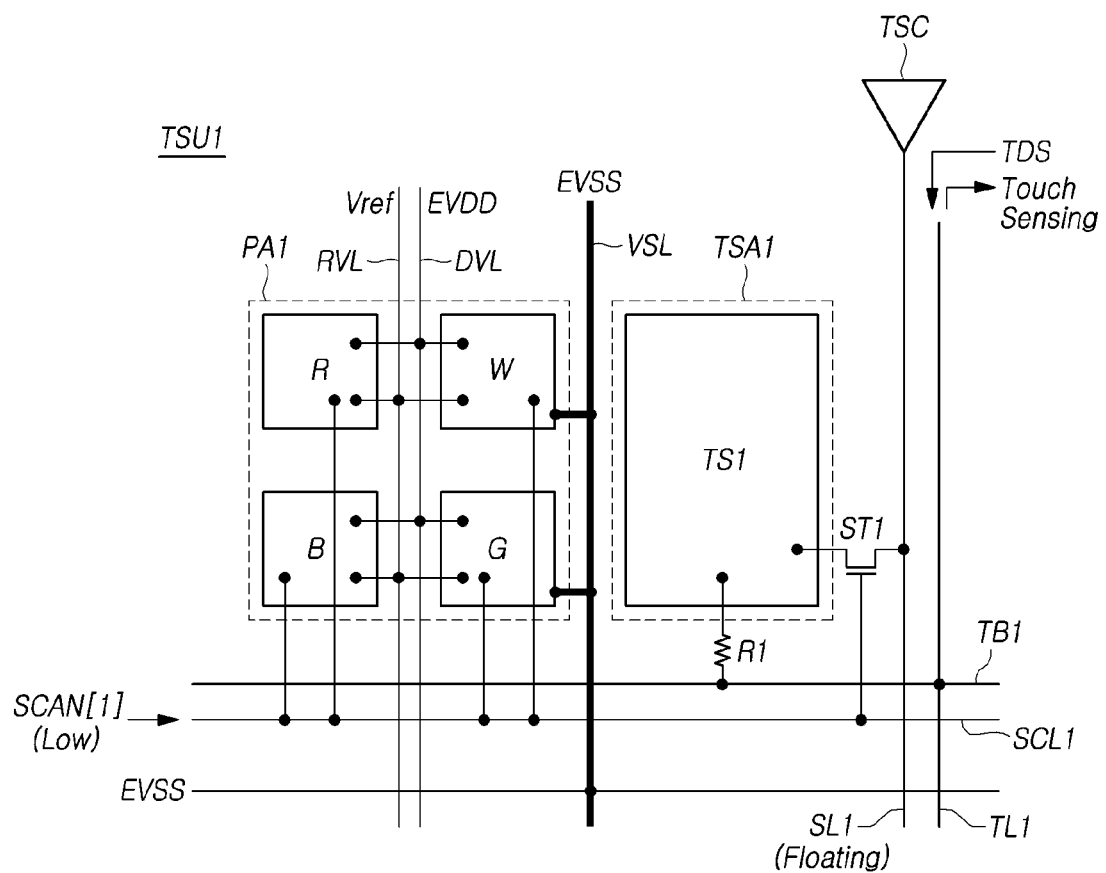
FIG. 11 illustrates the first touch sensor unit area during a touch period in the touch display device according to embodiments of the present disclosure.

FIG. 11 illustrates an example first touch sensor unit area TSU1 (e.g., the first touch sensor unit area TSU1 in the figures discussed above) during a touch period TP in the touch display device 100 according to embodiments of the present disclosure.

Referring to FIG. 11, during a touch period TP for touch sensing, a first scanning gate signal SCAN[1] may have a turn-off level voltage. As illustrated in FIG. 11, when the first sensing transistor ST1 is an n-type transistor, the turn-off level voltage of the first scanning gate signal SCAN[1] may be a low level voltage. When the first sensing transistor ST1 is a p-type transistor, the turn-off level voltage of the first scanning gate signal SCAN[1] may be a high level voltage.

Referring to FIG. 11, as the first scanning gate signal SCAN[1] has the turn-off level voltage during the touch period TP for touch sensing, the first sensing transistor ST1 can be turned off, and respective scanning transistors SCT included in the subpixels (R, W, G, and B) of the first pixel area PA1 may also be turned off.

Referring to FIG. 11, as the first sensing transistor ST1 is turned off during the touch period TP, the first touch sensor TS1 and the first sensing line SL1 may be electrically separated from each other.

During the touch period TP, a touch driving signal TDS having a variable voltage level may be supplied to the first touch line TL1.

During the touch period TP, the touch driving circuit 160 can supply the touch driving signal TDS to the first touch sensor TS1 through the first touch line TL1.

During the touch period TP, since the first touch sensor TS1 and the first sensing line SL1 are electrically separated by the turn-off of the first sensing transistor ST1, the touch driving signal TDS supplied to the first touch sensor TS1 cannot be transferred to the first sensing line SL1.

During the touch period TP, after outputting the touch driving signal TDS to the first touch line TL1, the touch driving circuit 160 can sense a capacitance (self-capacitance) of the first touch sensor TS1 through the first touch line TL1.

During the touch period TP, since the first sensing transistor ST1 is in a turned-off state, the first sensing line SL1 can be electrically separated from the first touch sensor TS1 and may be in an electrically floating state. Accordingly, a current may not flow through the first sensing line SL1 during the touch period TP. As a result, the first sensing line SL1 cannot affect touch sensing.

Figure 12:
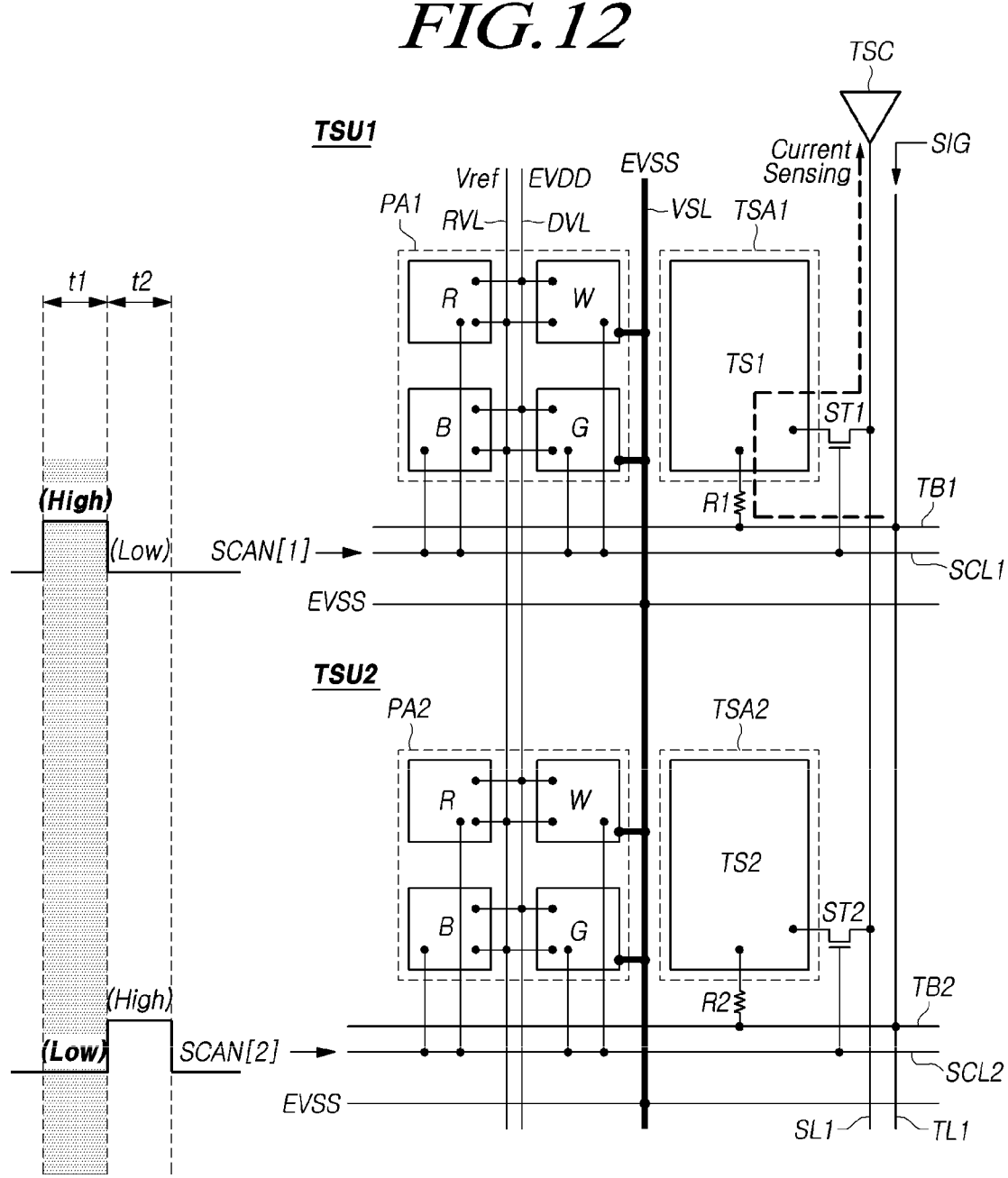
FIG. 12 illustrates two touch sensor unit areas during a display period in which temperature sensing is performed in the touch display device according to embodiments of the present disclosure.

FIG. 12 illustrates example two touch sensor unit areas (TSU1 and TSU2) during a display period DP in which temperature sensing proceeds in the touch display device 100 according to embodiment of the present disclosure.

Referring to FIG. 12, the touch display device 100 may include a first touch sensor unit area TSU1 (e.g., the first touch sensor unit area TSU1 in the figures discussed above) and a second touch sensor unit area TSU2.

The first touch sensor unit area TSU1 may include a first pixel area PA1 and a first touch sensor area TSA1. First subpixels (R, W, B, and G) may be disposed in the first pixel area PA1, and a first touch sensor TS1 may be disposed in the first touch sensor area TSA1. The first touch sensor area TSA1 may be positioned on one side of the first pixel area PA1.

The second touch sensor unit area TSU2 may include a second pixel area PA2 and a second touch sensor area TSA2. Second subpixels (R, W, B, and G) may be disposed in the second pixel area PA2, and a second touch sensor TS2 may be disposed in the second touch sensor area TSA2. The second touch sensor area TSA2 may be positioned on one side of the second pixel area PA2.

The second touch sensor unit area TSU2 may be adjacent to the first touch sensor unit area TSU1 in the column direction. The second pixel area PA2 may be adjacent to the first pixel area PA1 in the column direction. The second touch sensor area TSA2 may be adjacent to the first touch sensor area TSA1 in the column direction.

For display driving (pixel driving), a first driving power line DVL, a second driving power line VSL, and a reference voltage line RBL may be arranged in the column direction. The first driving power line DVL, the second driving power line VSL, and the reference voltage line RBL may be disposed such that they run across the first touch sensor unit area TSU1 and the second touch sensor unit area TSU2.

For display driving and temperature sensing, a first scanning gate line SCL1 may be disposed in the first touch sensor unit area TSU1, and a second scanning gate line SCL2 may be disposed in the second touch sensor unit area TSU2.

The first scanning gate line SCL1 can supply a first scanning gate signal SCAN[1] to respective scanning transistors SCT of the first subpixels (R, W, B, and G) included in the first pixel area PA1 in the first touch sensor unit area TSU1.

The second scanning gate line SCL2 can supply a second scanning gate signal SCAN[2] to respective scanning transistors SCT of the second subpixels (R, W, B, and G) included in the second pixel area PA2 in the second touch sensor unit area TSU2.

The first touch line TL1 and the first sensing line SL1 may be disposed in the column direction.

A first touch bridge line TB1 interconnecting the first touch line TL1 and the first touch sensor TS1 may be disposed in the first touch sensor unit area TSU1.

A first resistor pattern R1 connected between the first touch sensor TS1 and the first touch bridge line TB1 may be disposed in the first touch sensor unit area TSU1.

A second touch bridge line TB2 interconnecting the first touch line TL1 and the second touch sensor TS2 may be disposed in the second touch sensor unit area TSU2.

A second resistor pattern R2 (which may be referred to as a second sensing resistor R1) connected between the second touch sensor TS2 and the second touch bridge line TB2 may be disposed in the second touch sensor unit area TSU2.

A first sensing transistor ST1 configured to control an electrical connection between the first sensing line SL1 and the first touch sensor TS1 may be disposed in the first touch sensor unit area TSU1.

A second sensing transistor ST2 configured to control an electrical connection between the first sensing line SL1 and the second touch sensor TS2 may be disposed in the second touch sensor unit area TSU2.

During the display driving period DP, a test signal SIG may be supplied to the first touch line TL1.

Referring to FIG. 12, during a first time period t1 of the display driving period DP, the first scanning gate signal SCAN[1] may have a turn-on level voltage High, and the second scanning gate signal SCAN[2] may have a turn-off level voltage Low.

Accordingly, during the first time period t1, the first sensing transistor ST1 can be turned on, and the second sensing transistor ST2 can be turned off.

Thereby, during the first time period t1, a current for temperature sensing of the first touch sensor unit area TSU1 may flow along a first current flow path. The first current flow path may include the first touch line TL1, the first touch bridge line TB1, the first touch sensor TS1, the first sensing transistor ST1, and the first sensing line SL1.

During the first time period t1, the current sensing circuit TSC can sense a current flowing along the first current flow path, generate a current sensing value for the first touch sensor unit area TSU1 based on a result from the current sensing, and supply the generated current sensing value to the touch controller 170.

During the first time period t1, the touch controller 170 can compensate for a touch sensing value based on the current sensing value for the first touch sensor unit area TSU1.

Referring to FIG. 12, the display driving period DP may include the first time period t1 and a second time period t2.

Referring to FIG. 12, during the second time period t2 after the first time period t1, the first scanning gate signal SCAN[1] may have the turn-off level voltage Low, and the second scanning gate signal SCAN[2] may have the turn-on level voltage High.

Accordingly, during the second time period t2, the first sensing transistor ST1 can be turned off, and the second sensing transistor ST2 can be turned on.

Thereby, during the second time period t2, a current for temperature sensing of the second touch sensor unit area TSU2 may flow along a second current flow path. The second current flow path may include the first touch line TL1, the second touch bridge line TB2, the second touch sensor TS2, the second sensing transistor ST2, and the first sensing line SL1.

During the second time period t2, the current sensing circuit TSC can sense a current flowing along the second current flow path, generate a current sensing value for the second touch sensor unit area TSU2 based on a result from the current sensing, and supply the generated current sensing value to the touch controller 170.

During the second time period t2, the touch controller 170 can compensate for a touch sensing value based on the current sensing value for the second touch sensor unit area TSU2.

Figure 13:
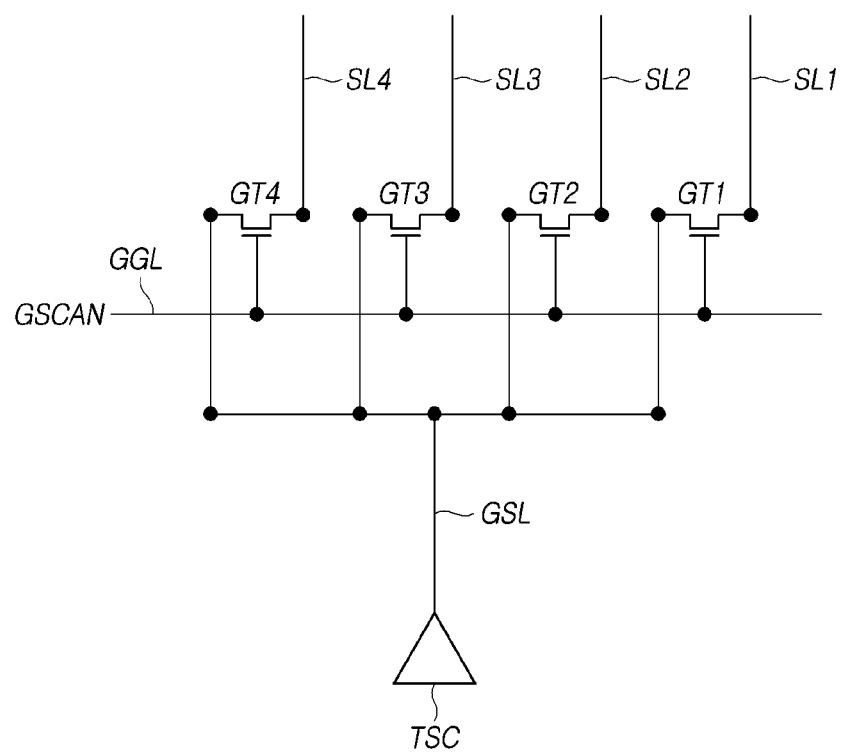
FIG. 13 illustrates a structure for simultaneously performing temperature sensing on a plurality of touch sensors in the touch display device according to embodiments of the present disclosure.

FIG. 13 illustrates an example structure for simultaneously performing temperature sensing on a plurality of touch sensors in the touch display device 100 according to embodiments of the present disclosure.

Referring to FIG. 13, the touch display device 100 according to embodiments of the disclosure may simultaneously perform current sensing for temperature sensing in a plurality of touch sensor unit areas TSU.

To perform this implement, the touch display device 100 according to embodiments of the disclosure may group two or more sensing lines (SL1, SL2, SL3, and/or SL4) into one sensing line group, and sense based on the one sensing line group. Thereby, the touch display device 100 can simultaneously sense the temperature of the two or more touch sensor unit areas TSU. This sensing method is referred to as group sensing.

The group sensing configuration employed in the touch display device 100 according to embodiments of the disclosure may include two or more group transistors (GT1, GT2, GT3, and/or GT4), which are included in the same group, a group gate line GGL, and a group sensing line GSL.

The two or more group transistors (GT1, GT2, GT3, and/or GT4) may correspond to the two or more sensing lines (SL1, SL2, SL3, and/or SL4), respectively.

The group gate line GGL may be connected to gate nodes of two or more group transistors (GT1, GT2, GT3, and/or GT4) together.

By a group scanning signal GSCAN delivered through the group gate line GGL, the two or more group transistors (GT1, GT2, GT3, and/or GT4) may be turned on or off simultaneously.

When the two or more group transistors (GT1, GT2, GT3, and/or GT4) are turned on simultaneously, the two or more sensing lines (SL1, SL2, SL3, and/or SL4) may be electrically connected to the one group gate line GGL together.

Currents flowing through the two or more sensing lines (SL1, SL2, SL3, and/or SL4) may be added, and then flow through the one group gate line GGL. The current sensing circuit TSC can sense the added current flowing through the one group gate line GGL.

The current sensing value may correspond to the temperature of the two or more touch sensor unit areas TSU corresponding to the two or more sensing lines (SL1, SL2, SL3, and/or SL4).

The above-described group sensing may be a more effective and rapid sensing method in an example where a contact area between a touch pointer (e.g., a finger or a pen) and the display panel 110 is small.

When the two or more group transistors (GT1, GT2, GT3, and/or GT4) are turned off together, the two or more sensing lines (SL1, SL2, SL3, and/or SL4) may be electrically disconnected to the one group gate line GGL together.

The two or more sensing lines (SL1, SL2, SL3, and/or SL4) may be electrically connected to the one group sensing line GSL through the two or more group transistors (GT1, GT2, GT3, and/or GT4).

Figure 14:
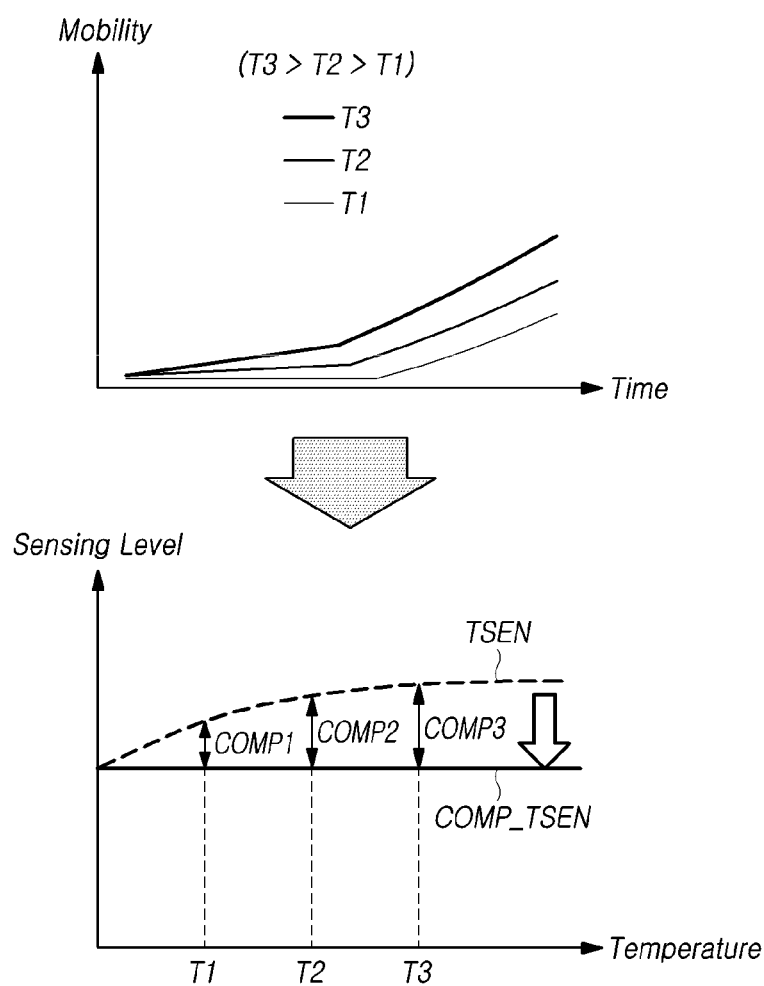
FIG. 14 illustrates a process for compensating for a variance in touch sensitivity according to a variance in temperature in the touch display device according to embodiments of the present disclosure.

FIG. 14 illustrates example processing of compensating for a variance in touch sensitivity caused by a temperature variance in the touch display device 100 according to embodiments of the present disclosure.

FIG. 14 illustrates a graph (hereinafter, referred to as a mobility graph) indicating a variance in mobility of a first sensing transistor ST1 over time, and a graph (hereinafter, referred to as a touch sensing value graph) indicating touch sensing values and compensated touch sensing values according to temperature.

Referring to FIG. 14, the mobility graph shows a variance in mobility of the first sensing transistor ST1 over time for each of three temperatures (T1, T2, and T3). Among a first temperature T1, a second temperature T2, and a third temperature T3, the third temperature T3 may be the highest temperature, and the first temperature T1 may be the lowest temperature. That is, respective values of the three temperatures (T1, T2, and T3) may be expressed as the third temperature T3>the second temperature T2>the first temperature T1.

Referring to FIG. 14, at a same time, as the temperature increases, the mobility may increase. That is, it can be seen that: at the third temperature T3, the mobility of the first sensing transistor ST1 may have the largest third mobility value; at the first temperature T1, the mobility of the first sensing transistor ST1 may have the smallest first mobility value; and at the second temperature T2, the mobility of the first sensing transistor ST1 may have the second mobility value between the first mobility value and the third mobility value.

Accordingly, by performing current sensing for temperature sensing during a display period DP, the current sensing circuit TSC can obtain: the third current sensing value, which is the largest, at the third temperature T3; the first current sensing value, which is the smallest, at the first temperature T1; and the second current sensing value between the first current sensing value and the third current sensing value at the second temperature T2.

The touch display device 100 according to embodiments of the disclosure may include a memory for storing a lookup table including compensation values corresponding to each current sensing value.

For example, when the touch controller 170 receives a first current sensing value from the current sensing circuit TSC through temperature sensing (current sensing) during a display period DP, and thereafter, receives a first touch sensing value TSEN from the touch driving circuit 160 during a touch period TP, the touch controller 170 can change the first touch sensing value TSEN based on the first current sensing value, and generate a second touch sensing value COMP_TSEN.

The second touch sensing value COMP_TSEN may be a value obtained by subtracting a first compensation value COMP1 corresponding to the first current sensing value from the first touch sensing value TSEN. Here, the first compensation value COMP1 is a compensation value extracted from the lookup table, and may be a compensation value corresponding to the first current sensing value.

The touch controller 170 can extract the first compensation value COMP1 corresponding to the first current sensing value received from the current sensing circuit TSC from the lookup table. The second touch sensing value COMP_TSEN may be a touch sensing value produced by removing a factor affected by the temperature from the first touch sensing value TSEN.

In another example, when the touch controller 170 receives a second current sensing value from the current sensing circuit TSC through temperature sensing (current sensing) during a display period DP, and thereafter, receives a first touch sensing value TSEN from the touch driving circuit 160 during a touch period TP, the touch controller 170 can change the first touch sensing value TSEN based on the second current sensing value, and generate a second touch sensing value COMP_TSEN.

The second touch sensing value COMP_TSEN may be a value obtained by subtracting a second compensation value COMP2 corresponding to the second current sensing value from the first touch sensing value TSEN. Here, the second compensation value COMP2 is a compensation value extracted from the lookup table, and may be a compensation value corresponding to the second current sensing value.

The touch controller 170 can extract the second compensation value COMP2 corresponding to the second current sensing value received from the current sensing circuit TSC from the lookup table. The second touch sensing value COMP_TSEN may be a touch sensing value produced by removing a factor affected by the temperature from the first touch sensing value TSEN.

In further another example, when the touch controller 170 receives a third current sensing value from the current sensing circuit TSC through temperature sensing (current sensing) during a display period DP, and thereafter, receives a first touch sensing value TSEN from the touch driving circuit 160 during a touch period TP, the touch controller 170 can change the first touch sensing value TSEN based on the third current sensing value, and generate a second touch sensing value COMP_TSEN.

The second touch sensing value COMP_TSEN may be a value obtained by subtracting a third compensation value COMP3 corresponding to the third current sensing value from the first touch sensing value TSEN. Here, the third compensation value COMP3 is a compensation value extracted from the lookup table, and may be a compensation value corresponding to the third current sensing value.

The touch controller 170 can extract the third compensation value COMP3 corresponding to the third current sensing value received from the current sensing circuit TSC from the lookup table. The second touch sensing value COMP_T-SEN may be a touch sensing value produced by removing a factor affected by the temperature from the first touch sensing value TSEN.

As described above, among the two driving methods, the first driving method in which the first sensing line SL1 serves as a current sensing path has been discussed. Hereinafter, the second driving method in which the first touch line TL1 serves as a current sensing path will be described. Hereinafter, descriptions of the same features as the first driving method will be omitted for simplicity.

Figure 15:
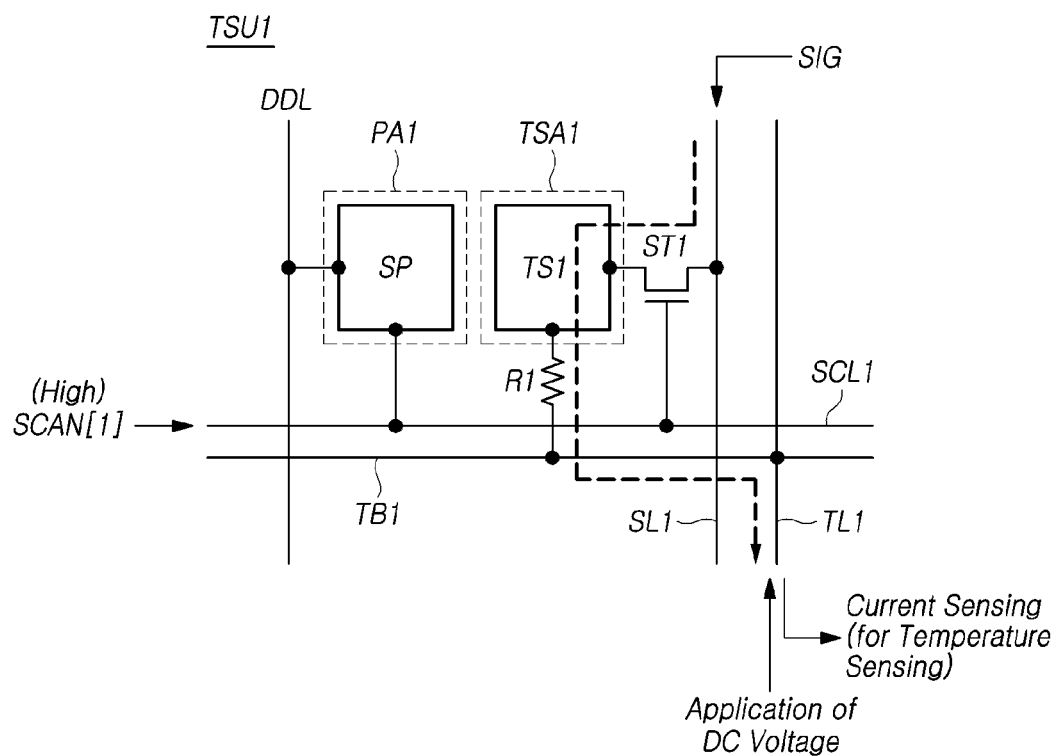
FIG. 15 illustrates a first touch sensor unit area during a display period in which temperature sensing is performed in the touch display device according to embodiments of the present disclosure.

FIG. 15 illustrates an example first touch sensor unit area TSU1 during a display period DP in which temperature sensing proceeds in the touch display device 100 according to embodiments of the present disclosure.

Referring to FIG. 15, for a predetermined time period of a display period DP, a first scanning gate signal SCAN[1] delivered through the first scanning gate line SCL1 may have a turn-on level voltage (e.g., a high level voltage). Accordingly, the scanning transistor SCT of the first sub-pixel SP1 in the first pixel area PA1 can be turned on, and at the same time, the first sensing transistor ST1 can be turned on.

Referring to FIG. 15, as the first sensing transistor ST1 is turned on during the display period DP, the first touch sensor TS1 and the first sensing line SL1 can be electrically connected to each other through the first sensing transistor ST1.

Referring to FIG. 15, a test signal SIG may be supplied to the first sensing line SL1 during the display period DP.

Referring to FIG. 15, during a period in which the first sensing transistor ST1 is turned on, the test signal SIG can be supplied to the first sensing line SL1.

For example, during the display period DP, the test signal SIG supplied to the first sensing line SL1 for temperature sensing may be a voltage having a constant first voltage level (e.g., a DC voltage) or a voltage having a variable voltage level (e.g., an AC voltage).

Referring to FIG. 15, when the test signal SIG is supplied to the first sensing line SL1 for temperature sensing during the display period DP, a voltage having a predetermined second voltage level (e.g., a DC voltage) may be applied to the first touch line TL1. Here, the second voltage level may be different from the first voltage level. For example, the second voltage level may be a voltage level lower than the first voltage level. In another example, the second voltage level may be a voltage level higher than the first voltage level.

Referring to FIG. 15, a current may flow through the first touch line TL1 during the display period DP. The touch driving circuit 160 can sense the current flowing through the first touch line TL1, and may include the current sensing circuit TSC connected to the first touch line TL1 for current sensing. In the case of the second driving method, the current sensing circuit TSC connected to the first sensing line SL1 may have a function of supplying the test signal SIG to the first sensing line SL1 instead of the current sensing function.

Referring to FIG. 15, during the display period DP, as the temperature of the first touch sensor area TSA1 increases, the amount of current flowing through the first touch line TL1 may increase, and as the temperature of the first touch sensor area TSA1 decreases, the amount of current flowing through the first touch line TL1 may decrease.

During the display period DP, when a touch is input in or around the first touch sensor area TSA1, or when an image displayed in relation to the first pixel area PA1 is changed, the amount of current flowing through the first touch line TL1 may increase.

As the amount of current flowing through the first touch line TL1 varies during the display period DP, a touch sensing value obtained during a touch period TP after the display period DP may vary (see FIG. 14 and refer to related description).

Figure 16:
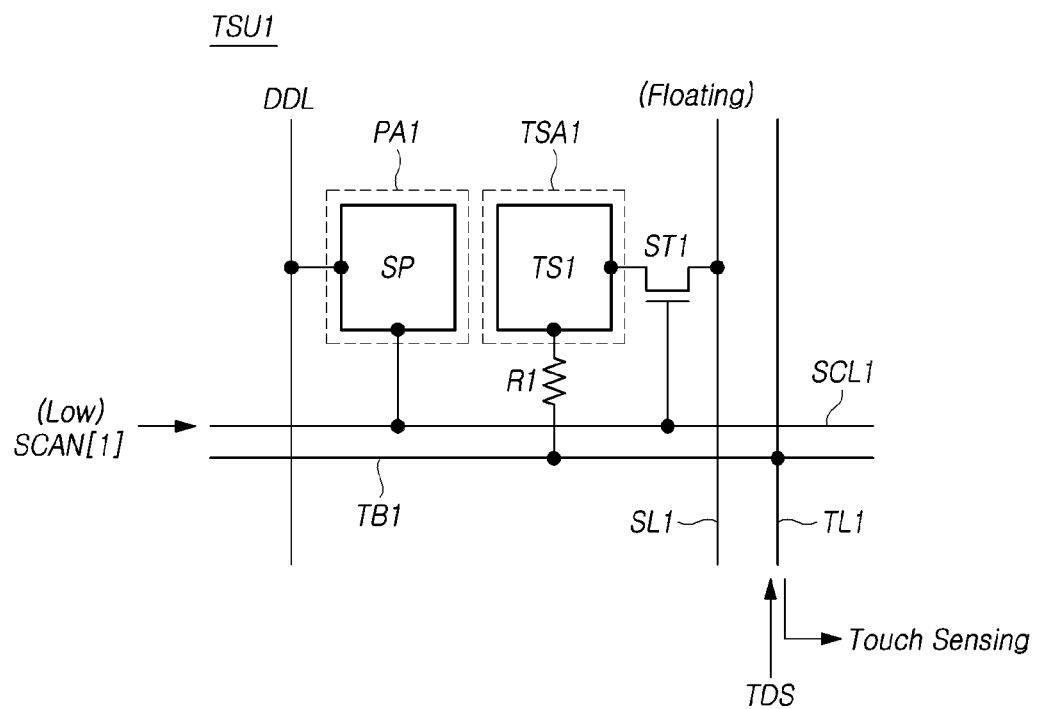
FIG. 16 illustrates a first touch sensor unit area during a touch period in the touch display device according to embodiments of the present disclosure.

FIG. 16 illustrates an example first touch sensor unit area TSU1 during a touch period TP in the touch display device 100 according to embodiments of the present disclosure.

Referring to FIG. 16, as the first sensing transistor ST1 is turned off during a touch period TP, the first touch sensor TS1 and the first sensing line SL1 may be electrically disconnected.

During the touch period TP, a touch driving signal TDS whose voltage level is varied may be supplied to the first touch line TL1, and the first sensing line SL1 may be in an electrically floating state.

During the touch period TP, the touch driving circuit 160 can output a touch driving signal TDS having a variable voltage level to the first touch line TL1. Accordingly, the touch driving signal TDS can be supplied to the first touch sensor TS1 connected to the first touch line TL1.

During the touch period TP, since the first touch sensor TS1 and the first sensing line SL1 are electrically disconnected by the turn-off of the first sensing transistor ST1, the touch driving signal TDS supplied to the first touch sensor TS1 cannot be transferred to the first sensing line SL1. Accordingly, the first sensing line SL1 may be in an electrically floating state during the touch period TP.

During the touch period TP, after outputting the touch driving signal TDS to the first touch line TL1, the touch driving circuit 160 can sense a capacitance (self-capacitance) of the first touch sensor TS1 through the first touch line TL1.

During the touch period TP, since the first sensing transistor ST1 is in the turned-off state, the first sensing line SL1 can be electrically disconnected with the first touch sensor TS1 and may be in the electrically floating state. As a result, during the touch period TP, the first sensing line SL1 cannot affect touch sensing.

Figure 17:
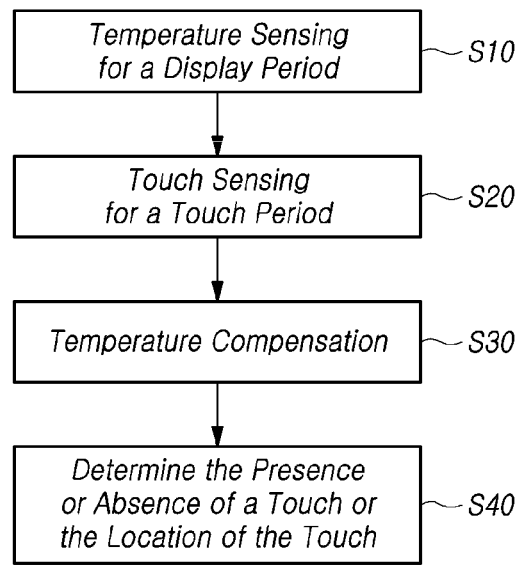
FIG. 17 is a flowchart of a touch sensing method of the touch display device according to embodiments of the present disclosure.

FIG. 17 is an example flow diagram of a touch sensing method of the display device 100 according to embodiments of the present disclosure.

Referring to FIG. 17, a touch sensing method of the touch display device 100 according to embodiments of the present disclosure may include a temperature sensing step S10, a touch sensing step S20, a temperature compensation step S30, a step of determining a touch event, such as a touch input, a touch location S40, and the like. A touch event can be any action that is determined to be a touch, such any indication that a touch has occurred, a touch itself, an indication of a touch location or the like.

In the temperature sensing step S10, the current sensing circuit TSC or the touch driving circuit 160 of the touch display device 100 can obtain a temperature sensing value by sensing the temperature of the area of a first touch sensor TS1, or obtain, as a temperature sensing value, a current sensing value by sensing a current flowing through the first touch sensor TS1. Here, the current may vary according to temperature.

The mobility of the first sensing transistor ST1 may vary according to a variance in the temperature, and thereby, the amount of current flowing through the first touch sensor TS1 connected to the first sensing transistor ST1 may vary.

In the touch sensing step S20, the touch driving circuit 160 of the touch display device 100 can obtain a first touch sensing value through the first touch sensor TS1 during a touch period TP.

In the temperature compensation step S30, the touch controller 170 of the touch display device 100 can generate a second touch sensing value by changing the first touch sensing value based on a temperature sensing value corresponding to a current sensing value (see FIG. 14).

In the step of determining the presence or absence of at least one a touch or a touch location S40, the touch controller 170 of the touch display device 100 can determine the presence or absence of a touch or a touch location based on the second touch sensing value.

The second touch sensing value may be a value obtained by removing a factor affected by the temperature from the first touch sensing value. Therefore, the determination of the presence or absence of a touch and/or the location of the touch based on the second touch sensing value may result in an accurate touch sensing result.

The temperature of the area of the first touch sensor TS1 may be a temperature in the first touch sensor TS1 or a temperature around the first touch sensor TS1.

As the temperature flowing through the first touch sensor TS1 increases, the amount of current flowing per unit time through the first touch sensor TS1 may increase.

The temperature sensing step S10 for acquiring a temperature sensing value may be performed during a display period DP. Therefore, while the temperature sensing step S10 for obtaining a temperature sensing value is in progress, a data voltage for image display can be supplied to a subpixel SP adjacent to the first touch sensor TS1.

As a temperature sensing value corresponding to a current sensing value increases, a corresponding compensation value COMP may increase, and thereby, a difference between the first touch sensing value TSEN and the second touch sensing value COMP_TSEN may increase (see FIG. 14).

In step S10, when a first current sensing value or a first temperature sensing value corresponding to a first temperature T1 is obtained, a first compensation value COMP1 corresponding to the first current sensing value or the first temperature sensing value can be determined by referring to the lookup table. Accordingly, the second touch sensing value COMP_TSEN may be a value obtained by subtracting the first compensation value COMP1 from the first touch sensing value TSEN (i.e., COMP_TSEN=TSEN-COMP1). For example, the first compensation value COMP1 may be a value obtained by multiplying the first current sensing value or the first temperature sensing value by a first weight.

In step S10, when a second current sensing value or a second temperature sensing value corresponding to a second temperature T2 higher than the first temperature T1 is obtained, a second compensation value COMP2 corresponding to the second current sensing value or the second temperature sensing value can be determined by referring to the lookup table. Accordingly, the second touch sensing value COMP_TSEN may be a value obtained by subtracting the second compensation value COMP2 from the first touch sensing value TSEN (i.e., COMP_TSEN=TSEN-COMP2). For example, the second compensation value COMP2 may be a value obtained by multiplying the second current sensing value or the second temperature sensing value by a second weight. For example, the second weight may be greater than the first weight.

In step S10, when a third current sensing value or a third temperature sensing value corresponding to a third temperature T3 higher than the second temperature T2 is obtained, a third compensation value COMP3 corresponding to the third current sensing value or the third temperature sensing value can be determined by referring to the lookup table. Accordingly, the second touch sensing value COMP_TSEN may be a value obtained by subtracting the third compensation value COMP3 from the first touch sensing value TSEN (i.e., COMP_TSEN=TSEN-COMP3). For example, the third compensation value COMP3 may be a value obtained by multiplying the third current sensing value or the third temperature sensing value by a third weight. For example, the third weight may be greater than the second weight.

Figure 18A:
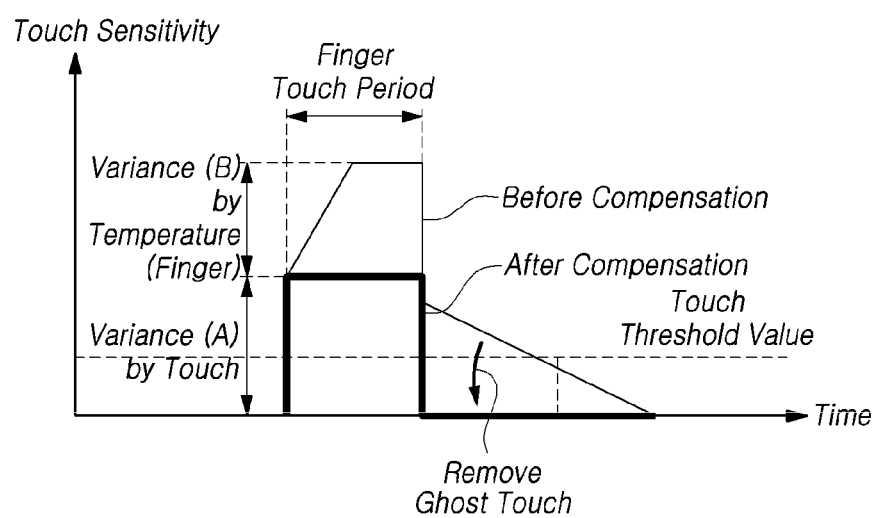
FIG. 18A is a touch sensitivity graph for explaining a compensation process for a variance in touch sensitivity caused by a variance in temperature by a finger touch in the touch display device according to embodiments of the present disclosure.

FIG. 18A is a touch sensitivity graph for explaining a compensation process for a variance in touch sensitivity (or a variance in a touch sensing value) caused by a variance in temperature by a finger touch in the touch display device according to embodiments of the present disclosure.

Referring to FIG. 18A, when a finger touch is input, the temperature of the finger may be transferred to the display panel 110, and thereby, a positive thermal drift phenomenon may occur. A variance in the temperature of the display panel 110 may be caused by the finger touch.

Referring to FIG. 18A, a touch sensing value (i.e., touch sensitivity) before a compensation process for a variance in touch sensitivity according to embodiments of the present disclosure is performed is as follows.

A touch sensing value (or a variance in the touch sensing value) obtained by a variance in the temperature of the display panel 110 by the finger touch may include a touch sensing value variance A caused by the finger touch and a touch sensing value variance B caused by the temperature of the finger.

The touch sensing value variance A caused by the finger touch, which is normally required for touch sensing, may be a variance caused by a finger capacitance.

The touch sensing value variance B caused by the temperature of the finger, which is an undesired variance that may cause a decrease in touch sensitivity, may be a variance caused by a parasitic capacitance increase $\Delta Cp$ by the positive thermal drift phenomenon during a time period in which the finger touch is input.

After the finger touch is ended, although the touch sensing value decreases, the touch sensing value may not immediately fall to a level measured in a situation before the touch is input, but may rather have a value greater than or equal to a touch threshold value for a predetermined time period. For example, the threshold value may mean a minimum touch sensing value or a reference value for determining that a touch is input.

Even when the finger touch is ended, when a touch sensing value greater than or equal to the touch threshold value is obtained from the touch driving circuit 160 for a predetermined time period (a ghost touch generation period), the touch controller 170 may erroneously determine that the finger touch is still maintained or a new finger touch is input. The recognition of such a ghost touch may cause touch sensitivity to be significantly reduced.

A touch sensing value (i.e., touch sensitivity) after a compensation process for a variance in touch sensitivity according to embodiments of the present disclosure is performed is as follows.

A touch sensing value TSEN generated by the touch driving circuit 160 based on the result of touch sensing may be a value obtained by adding a touch sensing value variance A caused by a finger touch and a touch sensing value variance B caused by the temperature of the finger, and a compensation value COMP calculated through current sensing may correspond to the sensing value variance B caused by the temperature of the finger.

A compensated touch sensing value COMP_TSEN may be a value calculated by subtracting the compensation value COMP from the touch sensing value TSEN. Accordingly, the compensated touch sensing value COMP_TSEN may include only the touch sensing value variation A caused by the finger touch, and not include the touch sensing value variation B caused by the temperature of the finger.

Therefore, as shown in FIG. 18A, after compensation is performed, the presence or absence of a touch and/or the location of the touch may be determined using the compensated touch sensing value (COMP_TSEN) from which the touch sensing value variation B caused by the temperature of the finger is removed, and thereby, a ghost touch can be removed.

Figure 18B:
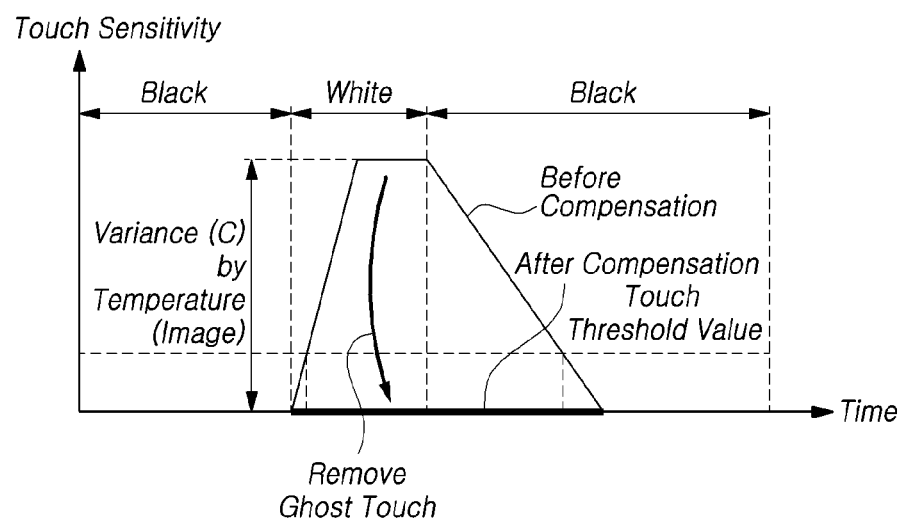
FIG. 18B is a touch sensitivity graph for explaining a compensation process for a variance in touch sensitivity caused by a variance in temperature by an image change in the touch display device according to embodiments of the present disclosure.

FIG. 18B is a touch sensitivity graph for explaining a compensation process for a variance in touch sensitivity (or a variance in a touch sensing value) caused by a variance in temperature by an image change in the touch display device according to embodiments of the present disclosure.

Referring to FIG. 18B, touch sensitivity may be decreased by an image change, as well as a finger touch.

Referring to FIG. 18B, a touch sensing value (i.e., touch sensitivity) before a compensation process for a variance in touch sensitivity according to embodiments of the present disclosure is performed is as follows.

Referring to FIG. 18B, a phenomenon in which the surface temperature of the display panel 110 is increased by a finger touch may occur similarly even when an image is changed. That is, when an image is changed, the positive thermal drift phenomenon may occur similarly. In other words, although a touch is not input, a variance in a touch sensing value may be caused by an image change.

Referring to FIG. 18B, a variance in a touch sensing value caused by an image change may be considered as a touch sensing value variance C caused by a variance in the temperature of the display panel 110 corresponding to the image change.

For example, when an image is changed from a low grayscale image (e.g., a black image) to a high grayscale image (e.g., a white image), a touch sensing value greater than or equal to a touch threshold value may be obtained from the touch driving circuit 160 even though a touch is not input in actual. When an image is changed back from the high grayscale image (e.g., the white image) to the low grayscale image (e.g., the black image), the touch sensing value may not fall immediately below the touch threshold value, but may fall below the touch threshold value after a certain time period passes.

Referring to FIG. 18B, even when a touch is not input in actual, when a touch sensing value greater than or equal to the touch threshold value is obtained from the touch driving circuit 160 by an image change, the touch controller 170 may recognize that a touch is input during a period in which the touch sensing value is greater than or equal to the touch threshold value (or a ghost touch generation period). The recognition of such a ghost touch may cause touch sensitivity to be significantly reduced.

A touch sensing value (i.e., touch sensitivity) after a compensation process for a variance in touch sensitivity according to embodiments of the present disclosure is performed is as follows.

A touch sensing value TSEN generated by the touch driving circuit 160 based on the result of touch sensing may be a value corresponding to a touch sensing value variance C caused by a variance in temperature corresponding to an image change. A compensation value COMP calculated through current sensing may correspond to the touch sensing value variance C caused by the variance in temperature corresponding to the image change.

A compensated touch sensing value COMP_TSEN may be a value calculated by subtracting the compensation value COMP from the touch sensing value TSEN. Accordingly, the compensated touch sensing value COMP_TSEN may not include a value corresponding to the touch sensing value variance C caused by the variance in the temperature corresponding to the image change.

Therefore, as shown in FIG. 18B, after compensation is performed, the presence or absence of a touch and/or the location of the touch may be determined using the compensated touch sensing value (COMP_TSEN) from which the touch sensing value variance C caused by the variance in the temperature corresponding to the image change is removed, and thereby, a ghost touch can be removed.

As described above, as shown in FIG. 7, in the touch display device 100 according to embodiments of the present disclosure, a plurality of touch sensors TS may be electrically connected to each other, and form one touch electrode TE.

Accordingly, the touch display device 100 according to embodiments of the present disclosure may include a plurality of touch bridge lines TB for electrically interconnecting the plurality of touch sensors TS in one touch electrode area TEU in which one touch electrode TE is disposed.

In the touch display device 100 according to embodiments of the present disclosure, the plurality of touch bridge lines TB may be disposed in parallel with a plurality of scanning gate lines SCL.

The touch display device 100 according to embodiments of the present disclosure may have an individual touch bridge structure in which each of the plurality of touch bridge lines TB are disposed for each touch sensor row.

According to the individual touch bridge structure of the touch display device 100 according to embodiments of the present disclosure, one touch bridge line TB may be disposed for each scanning gate line SCL. That is, according to the individual touch bridge structure of the touch display device 100 according to embodiments of the present disclosure, the number of touch bridge lines TB and the number of scanning gate lines SCL may be the same.

When the touch display device 100 according to embodiments of the present disclosure has such an individual touch bridge structure, as a respective touch bridge line TB is disposed for each touch sensor row, a great number of touch bridge lines TB may be disposed in the display panel 110. For this reason, parasitic capacitance and load may increase due to many touch bridge lines TB.

Accordingly, the touch display device 100 according to embodiments of the present disclosure may have a shared touch bridge structure for reducing parasitic capacitance and reducing load. Hereinafter, a shared touch bridge structure according to embodiments of the present disclosure will be described.

In the touch display device 100 according to embodiments of the present disclosure, a plurality of touch sensors TS may be electrically connected to each other, and form one touch electrode TE. Accordingly, the touch display device 100 according to embodiments of the present disclosure may include a touch bridge configuration for electrically interconnecting a plurality of touch sensors TS in one touch electrode area TEU in which one touch electrode TE is disposed.

The touch display device 100 according to embodiments of the present disclosure may have a shared touch bridge structure in which one touch bridge configuration is disposed for every two or more touch sensor rows.

The shared touch bridge structure of the touch display device 100 according to embodiments of the present disclosure may include a first shared touch bridge structure including a common touch bridge line in a horizontal direction, and a second shared touch bridge structure including a common touch bridge line in the horizontal direction and a common touch bridge line in a vertical direction.

Figure 19:
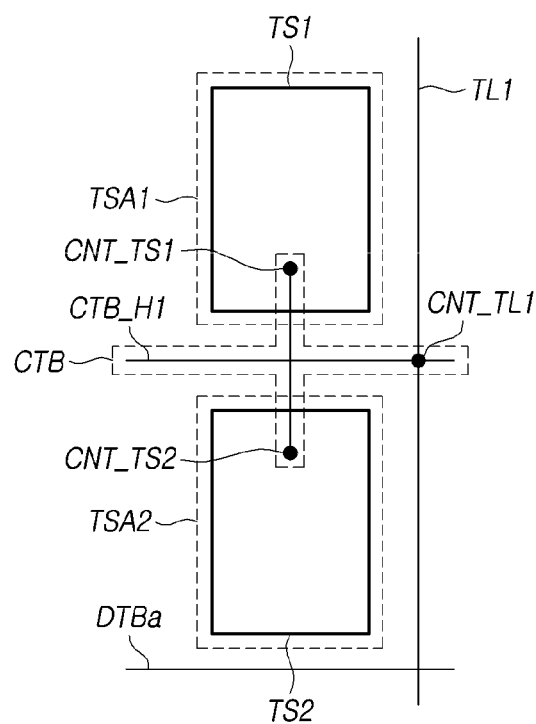
FIG. 19 illustrates a first shared touch bridge structure in the touch display device according to embodiments of the present disclosure.

FIG. 19 illustrates the first shared touch bridge structure in the touch display device 100 according to embodiments of the present disclosure.

Referring to FIG. 19, an example first shared touch bridge structure of the touch display device 100 according to embodiments of the present disclosure may include a common touch bridge (CTB) for electrically connecting a first touch sensor TS1 and a second touch sensor TS2 to a first touch line TL1.

Referring to FIG. 19, according to the first shared touch bridge structure according to the embodiments of the present disclosure, the common touch bridge CTB may include a first horizontal common touch bridge line CTB_H1 disposed between the first touch sensor TS1 disposed in a first touch sensor area TSA1 and the second touch sensor TS1 disposed in a second touch sensor area TSA2.

Referring to FIG. 19, the first horizontal common touch bridge line CTB_H1 may be electrically connected to the first touch line TL1 at a first touch line connection point CNT_TL1.

Referring to FIG. 19, an extension portion of the first horizontal common touch bridge line CTB_H1 or a portion connected to the first horizontal common touch bridge line CTB_H1 may be electrically connected to the first touch sensor TS1 at a first touch sensor connection point CNT_TS1.

Referring to FIG. 19, another extension portion of the first horizontal common touch bridge line CTB_H1, or another portion connected to the first horizontal common touch bridge line CTB_H1 may be electrically connected to the second touch sensor TS2 at a second touch sensor connection point CNT_TS2.

Referring to FIG. 19, the touch display device 100 according to embodiments of the present disclosure may include a first dummy touch bridge line DTBa disposed in parallel to the first horizontal common touch bridge line CTB_H1 and disposed adjacent to the second touch sensor TS2.

While the first horizontal common touch bridge line CTB_H1 is electrically connected to the first touch line TL1, the first dummy touch bridge line DTBa may be electrically separated from the first touch line TL1.

Hereinafter, the first shared touch bridge structure of the touch display device 100 according to embodiments of the present disclosure will be described in more detail with reference to FIGS. 20 and 21.

Figure 20:
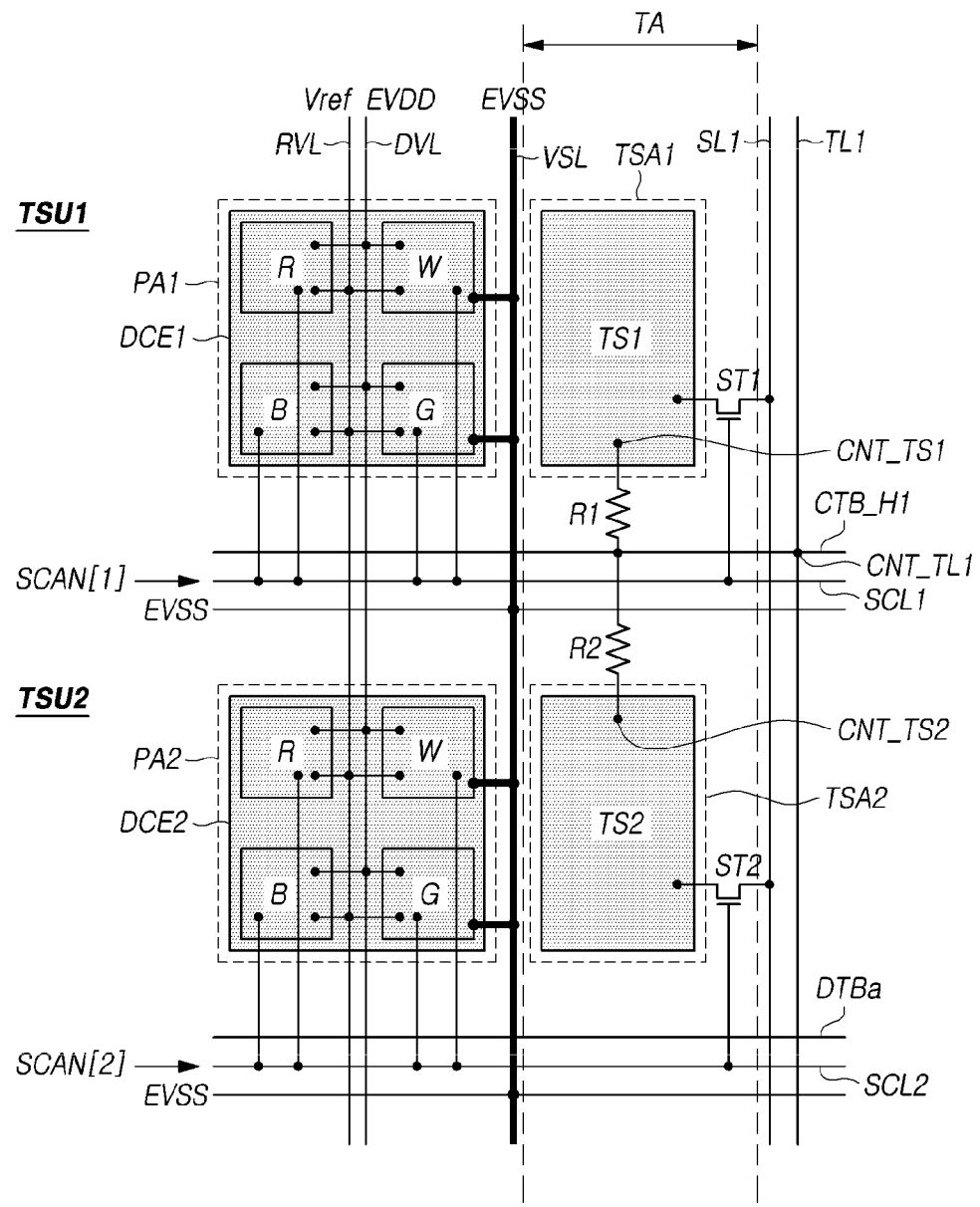
FIG. 20 is a plan view of two touch sensor unit areas to which the first shared touch bridge structure of FIG. 19 is applied.

FIG. 20 is a plan view of two touch sensor unit areas (TSU1 and TSU2) to which the first shared touch bridge structure of FIG. 19 is applied.

Referring to FIG. 20, the touch display device 100 according to embodiments of the present disclosure may include a first touch sensor unit area TSU1 and a second touch sensor unit area TSU2.

Referring to FIG. 20, the first touch sensor unit area TSU1 may include a first pixel area PA1 and a first touch sensor area TSA1 adjacent to the first pixel area PA1 in the row direction.

Referring to FIG. 20, the second touch sensor unit area TSU2 may include a second pixel area PA2 adjacent to the first pixel area PA1 in the column direction and a second touch sensor area TSA2 adjacent to the second pixel area PA2 in the row direction.

Referring to FIG. 20, the first pixel area PA1 may include at least one first subpixel (R, W, B, and/or G), and each first subpixel (R, W, B, and/or G) may include a first light emitting element ED and a first scanning transistor SCT.

Referring to FIG. 20, the second pixel area PA2 may include at least one second subpixel (R, W, B, and/or G), and each second subpixel (R, W, B, and/or G) may include a second light emitting element ED and a second scanning transistor SCT.

Referring to FIG. 20, the touch display device 100 according to embodiments of the present disclosure may include a first touch sensor TS1 disposed in the first touch sensor area TSA1 and a second touch sensor TS2 disposed in the second touch sensor area TSA2.

Referring to FIG. 20, the touch display device 100 according to embodiments of the present disclosure may include a first touch line TL1 electrically connected to the first touch sensor TS1 and the second touch sensor TS2 and extending in the column direction, and a first sensing line SL1 disposed adjacent to the first touch line TL1 and extending in the column direction.

Referring to FIG. 20, the touch display device 100 according to embodiments of the disclosure may include a first sensing transistor ST1 configured to control an electrical connection between the first sensing line SL1 and the first touch sensor TS1.

Referring to FIG. 20, the touch display device 100 according to embodiments of the disclosure may include a second sensing transistor ST2 configured to control an electrical connection between the first sensing line SL1 and the second touch sensor TS2.

Referring to FIG. 20, the touch display device 100 according to embodiments of the present disclosure may include, as the first shared touch bridge structure, a common touch bridge CTB for electrically connecting the first touch sensor TS1 and the second touch sensor TS2 to the first touch line TL1.

Referring to FIG. 20, the touch display device 100 according to embodiments of the disclosure may include a first scanning gate line SCL1 electrically connected to the gate node of the first scanning transistor SCT and the gate node of the first sensing transistor ST1.

The first scanning transistor SCT and the first sensing transistor ST1 can be turned on together and turned off together by a first scanning gate signal SCAN[1] delivered through the first scanning gate line SCL1.

Referring to FIG. 20, the touch display device 100 according to embodiments of the disclosure may include a second scanning gate line SCL2 electrically connected to the gate node of the second scanning transistor SCT and the gate node of the second sensing transistor ST2.

The second scanning transistor SCT and the second sensing transistor ST2 can be turned on together and turned off together by a second scanning gate signal SCAN[2] delivered through the second scanning gate line SCL2.

Referring to FIG. 20, the common touch bridge CTB may include a first horizontal common touch bridge line CTB_H1.

The first horizontal common touch bridge line CTB_H1 may be disposed between the first touch sensor TS1 and the second touch sensor TS2 and extend in the row direction. The first horizontal common touch bridge line CTB_H1 may electrically connect the first touch sensor TS1 and the second touch sensor TS2 to the first touch line TL1.

Referring to FIG. 20, the common touch bridge CTB may further include a first resistor pattern R1 located between the first horizontal common touch bridge line CTB_H1 and the first touch sensor TS1, and a second resistor pattern R2 located between the first horizontal common touch bridge line CTB_H1 and the second touch sensor TS2.

Referring to FIG. 20, the first resistor pattern R1 may be a first extension portion of the first horizontal common touch bridge line CTB_H1, or a first connection pattern electrically connected to the first horizontal common touch bridge line CTB_H1.

Referring to FIG. 20, the second resistor pattern R2 may be a second extension portion of the first horizontal common touch bridge line CTB_H1, or a second connection pattern electrically connected to the first horizontal common touch bridge line CTB_H1.

Referring to FIG. 20, the first horizontal common touch bridge line CTB_H1 may be electrically connected to the first touch line TL1 at a first touch line connection point CNT_TL1. The first horizontal common touch bridge line CTB_H1 or the first resistor pattern R1 may be electrically connected to the first touch sensor TS1 at a first touch sensor connection point CNT_TS1. The first horizontal common touch bridge line CTB_H1 or the second resistor pattern R2 may be electrically connected to the second touch sensor TS2 at a second touch sensor connection point CNT_TS2.

For example, the first touch line connection point CNT_TL1, the first touch sensor connection point CNT_TS1, and the second touch sensor connection point CNT_TS2 may be contact holes.

Referring to FIG. 20, the touch display device 100 according to embodiments of the present disclosure may include a first dummy touch bridge line DTBa electrically separated from the first horizontal common touch bridge line CTB_H1.

The first dummy touch bridge line DTBa may be adjacent to the second touch sensor TS2 in the column direction and may be disposed parallel to the first horizontal common touch bridge line CTB_H1.

For example, the first horizontal common touch bridge line CTB_H1 may be disposed adjacent to the first scanning gate line SCL1, but be spaced apart from the second scanning gate line SCL2 as shown in FIG. 20. Accordingly, a difference between the load of the first scanning gate line SCL1 and the load of the second scanning gate line SCL2 may occur.

Due to such a difference, the first scanning gate line SCL1 and the second scanning gate line SCL2 may have different electrical characteristics. Accordingly, a first scanning gate signal SCAN[1] on the first scanning gate line SCL1 and a second scanning gate signal SCAN[2] on the second scanning gate line SCL2 may have different signal characteristics. Thereby, there may occur a driving difference between a first subpixel disposed in the first pixel area PA1 and a second subpixel disposed in the second pixel area PA2, and in turn, this may cause image artifacts. For example, there may occur a phenomenon in which luminance disparities, color differences, or the like between a specific horizontal area and an adjacent area on the screen are viewed.

To reduce such an abnormal image phenomenon, the touch display device 100 according to embodiments of the present disclosure may include the first dummy touch bridge line DTBa disposed adjacent to the second scanning gate line SCL2. For example, the first dummy touch bridge line DTBa may be disposed in parallel to the first horizontal common touch bridge line CTB_H1, and be disposed adjacent to, and in parallel to, the second scanning gate line SCL2.

The first scanning gate line SCL1 and the second scanning gate line SCL2 can have similar characteristics by such a configuration. Accordingly, the first scanning gate signal SCAN[1] on the first scanning gate line SCL1 and the second scanning gate signal SCAN[2] on the second scanning gate line SCL2 may have signal characteristics similar to each other. Thereby, a driving difference between the first subpixel disposed in the first pixel area PA1 and the second subpixel disposed in the second pixel area PA2 can be reduced or prevented, and in turn, image artifacts can be reduced or eliminated.

The touch display device 100 according to embodiments of the present disclosure may include a first display driving line DDL disposed such that the first display driving line DDL runs across the first touch sensor unit area TSU1 and the second touch sensor unit area TSU2.

The first display driving line DDL may be connected to the at least one first subpixel (R, W, B, and/or G) disposed in the first pixel area PA1 and the at least one second subpixel (R, W, B, and/or G) disposed in the second pixel area PA2.

As shown in FIG. 20, the first display driving line DDL may include a first driving power line DVL, a second driving power line VSL, and a reference voltage line RVL.

The first driving power line DVL can supply a first driving power signal EVDD to the at least one first subpixel (R, W, B, and/or G) disposed in the first pixel area PA1 and the at least one second subpixel (R, W, B, and/or G) disposed in the second pixel area PA2.

The second driving power line VSL can supply a second driving power signal EVSS to the at least one first subpixel (R, W, B, and/or G) disposed in the first pixel area PA1 and the at least one second subpixel (R, W, B, and/or G) disposed in the second pixel area PA2.

The reference voltage line RVL can supply a reference voltage Vref to the at least one first subpixel (R, W, B, and/or G) disposed in the first pixel area PA1 and the at least one second subpixel (R, W, B, and/or G) disposed in the second pixel area PA2.

Referring to FIG. 20, the second driving power line VSL included in the first display driving line DDL may be disposed such that it runs, in the column direction, across a portion between the at least one first subpixel (R, W, B, and/or G) disposed in the first pixel area PA1 and the first touch sensor TS1 and a portion between the at least one second subpixel (R, W, B, and/or G) disposed in the second pixel area PA2 and the second touch sensor TS2.

Referring to FIG. 20, the touch display device 100 according to embodiments of the present disclosure may include a first display common electrode DCE1 disposed in the first pixel area PA1 and a second display common electrode DCE2 disposed in the second pixel area PA2.

Referring to FIG. 20, the second driving power line VSL included in the first display driving line DDL may be electrically connected to the first display common electrode DCE1 and the second display common electrode DCE2.

Referring to FIG. 20, the first touch sensor TS1 and the second touch sensor TS2 may include the same material as the first display common electrode DCE1 and the second display common electrode DCE2. For example, in the process of manufacturing the panel, the first and second display common electrodes (DCE1 and DCE2) and the first and second touch sensors (TS1 and TS2) may be formed in separate forms through a patterning process for a display common electrode material (e.g., a cathode electrode material).

As described above, the touch display device 100 according to embodiments of the present disclosure may include one or more organic layers OML disposed in one or more different locations. For example, an organic layer OML may be included in the first light emitting element ED disposed in the first pixel area PA1, and the second light emitting element ED disposed in the second pixel area PA2. In another example, one or more organic layers OML may be included over or under the first light emitting element ED and the second light emitting element ED.

Referring to FIG. 20, the first pixel area PA1 and the second pixel area PA2 may be light emitting areas and non-transmissive areas through which light may not pass. The first touch sensor area TSA1 and the second touch sensor area TSA2 may be included in a transmissive area TA allowing light to pass. For example, the non-transmissive areas may be areas where transistors related to the subpixels (R, W, B, and/or G) disposed in the first and second pixel area (PA1 and PA2) are disposed. The transmissive area TA may be an area outside of the non-transmissive areas and may have a transmittance higher than the non-transmissive areas. The transmissive area TA may be an area in which transistors related to the subpixels (R, W, B, and/or G) disposed in the first and second pixel area (PA1 and PA2) are not disposed. The transmissive area TA may include the first touch sensor area TSA1 where the first touch sensor TS1 is disposed and the second touch sensor area TSA2 where the second touch sensor TS2 is disposed. The non-transmissive areas may include areas in which the display common electrodes (DCE1 and DCE2) are disposed, and the transmissive area TA may include an area in which the display common electrodes (DCE1 and DCE2) are not disposed.

In examples where the first shared touch bridge structure is applied, the temperature sensing operation described above may be substantially equally applied to temperature sensing operation performed during a display period DP. Considering such a substantially equal operation, hereinafter, while temperature sensing operation is performed during a display period DP, only the on-off operation of the first and second sensing transistors (ST1 and ST2) and the function of the common touch bridge CTB will be briefly described.

Referring to FIG. 20, the display period DP may include a first period t1 in which a first data voltage for displaying an image is supplied to the at least one first subpixel (R, W, B, and/or G) disposed in the first pixel area PA1, and a second period t2 in which a second data voltage for displaying an image is supplied to the at least second subpixel (R, W, B, and/or G) disposed in the second pixel area PA2.

During the first period t1, a first scanning gate signal SCAN([1]) supplied through the first scanning gate line SCL1 may have a turn-on level voltage (e.g., a high level voltage or a low level voltage), and a second scanning gate signal SCAN([2]) supplied through the second scanning gate line SCL2 may have a turn-off level voltage (e.g., the low level voltage or the high level voltage).

Accordingly, during the first period t1, the first sensing transistor ST1 and the first scanning transistor SCT can be turned on by the first scanning gate signal SCAN([1]). In this situation, the second sensing transistor ST2 and the second scanning transistor SCT may be in a turn-off state.

Therefore, during the first period t1, the first touch sensor TS1 can be connected to the first sensing line SL1. In this situation, the second touch sensor TS2 may not be connected to the first sensing line SL1.

During the first period t1, the first horizontal common touch bridge line CTB_H1 may be electrically connected to the first touch sensor TS1 and the second touch sensor TS2. Further, during the first period t1, the first touch sensor TS1 and the second touch sensor TS2 may be connected to the first touch line TL1 through the first horizontal common touch bridge line CTB_H1.

During the second period t2, the first scanning gate signal SCAN([1]) supplied through the first scanning gate line SCL1 may have the turn-off level voltage (e.g., the low level voltage or the high level voltage), and the second scanning gate signal SCAN([2]) supplied through the second scanning gate line SCL2 may have the turn-on level voltage (e.g., the high level voltage or the low level voltage).

Accordingly, during the second period t2, the second sensing transistor ST2 and the second scanning transistor SCT can be turned on by the second scanning gate signal SCAN([2]). In this situation, the first sensing transistor ST1 and the first scanning transistor SCT may be in the turn-off state.

Therefore, during the second period t2, the second touch sensor TS2 can be connected to the first sensing line SL1. In this situation, the first touch sensor TS1 may not be connected to the first sensing line SL1.

During the second period t2, the first horizontal common touch bridge line CTB_H1 may be electrically connected to the first touch sensor TS1 and the second touch sensor TS2. Further, during the second period t2, the first touch sensor TS1 and the second touch sensor TS2 may be connected to the first touch line TL1 through the first horizontal common touch bridge line CTB_H1.

During the first period t1 of the display period DP, the first touch sensor TS1 and the first sensing line SL1 may be electrically connected, and a first test signal SIG as a driving signal VCM may be supplied to the first touch line TL1. Thereby, a first current can flow through the first sensing line SL1.

During the second period t2 of the display period DP, the second touch sensor TS2 and the first sensing line SL1 may be electrically connected, and a second test signal SIG as a driving signal VCM may be supplied to the first touch line TL1. Thereby, a second current can flow through the first sensing line SL1.

During the first period t1 of the display period DP, as the temperature of the first touch sensor area TSA1 increases, the amount of first current flowing through the first sensing line SL1 per unit time may increase, and as the temperature of the first touch sensor area TSA1 decreases, the amount of first current flowing through the first sensing line SL1 per unit time may decrease.

During the second period t2 of the display period DP, as the temperature of the second touch sensor area TSA2 increases, the amount of second current flowing through the first sensing line SL1 per unit time may increase, and as the temperature of the second touch sensor area TSA2 decreases, the amount of second current flowing through the first sensing line SL1 per unit time may decrease.

During the first period t1 of the display period DP, when a touch is input in the first touch sensor area TSA1 or around the first touch sensor area TSA1, or when an image displayed in relation to the first pixel area PA1 is changed, the amount of the first current flowing through the first sensing line SL1 per unit time may increase.

During the second period t2 of the display period DP, when a touch is input in the second touch sensor area TSA2 or around the second touch sensor area TSA2, or when an image displayed in relation to the second pixel area PA2 is changed, the amount of the second current flowing through the first sensing line SL1 per unit time may increase.

As the amount of current flowing through the first sensing line SL1 per unit time varies during the display period DP, a touch sensing value obtained during a touch period TP after the display period DP may be varied.

Referring to FIG. 20, during a touch period TP different from the display period DP, the first scanning gate signal SCAN([1]) delivered through the first scanning gate line SCL1 and the second scanning gate signal SCAN([2]) delivered through the second scanning gate line SCL2 may have the turn-off level voltage (e.g., the low level voltage or the high level voltage).

Accordingly, during the touch period TP, the first sensing transistor ST1 and the second sensing transistor ST2 may be in the turn-off state. The first and second scanning transistors SCT may also be in the turn-off state.

Thereby, during the touch period TP, the first touch sensor TS1 and the second touch sensor TS2 cannot be connected to the first sensing line SL1.

During the touch period TP, the first horizontal common touch bridge line CTB_H1 may be electrically connected to the first touch sensor TS1 and the second touch sensor TS2.

Further, during the touch period TP, the first touch sensor TS1 and the second touch sensor TS2 may be connected to the first touch line TL1 through the first horizontal common touch bridge line CTB_H1.

Accordingly, the first touch sensor TS1 and the second touch sensor TS2 can receive a touch driving signal TDS transmitted by the touch driving circuit 160 through the first horizontal common touch bridge line CTB_H1 and the first touch line TL1.

Figure 21:
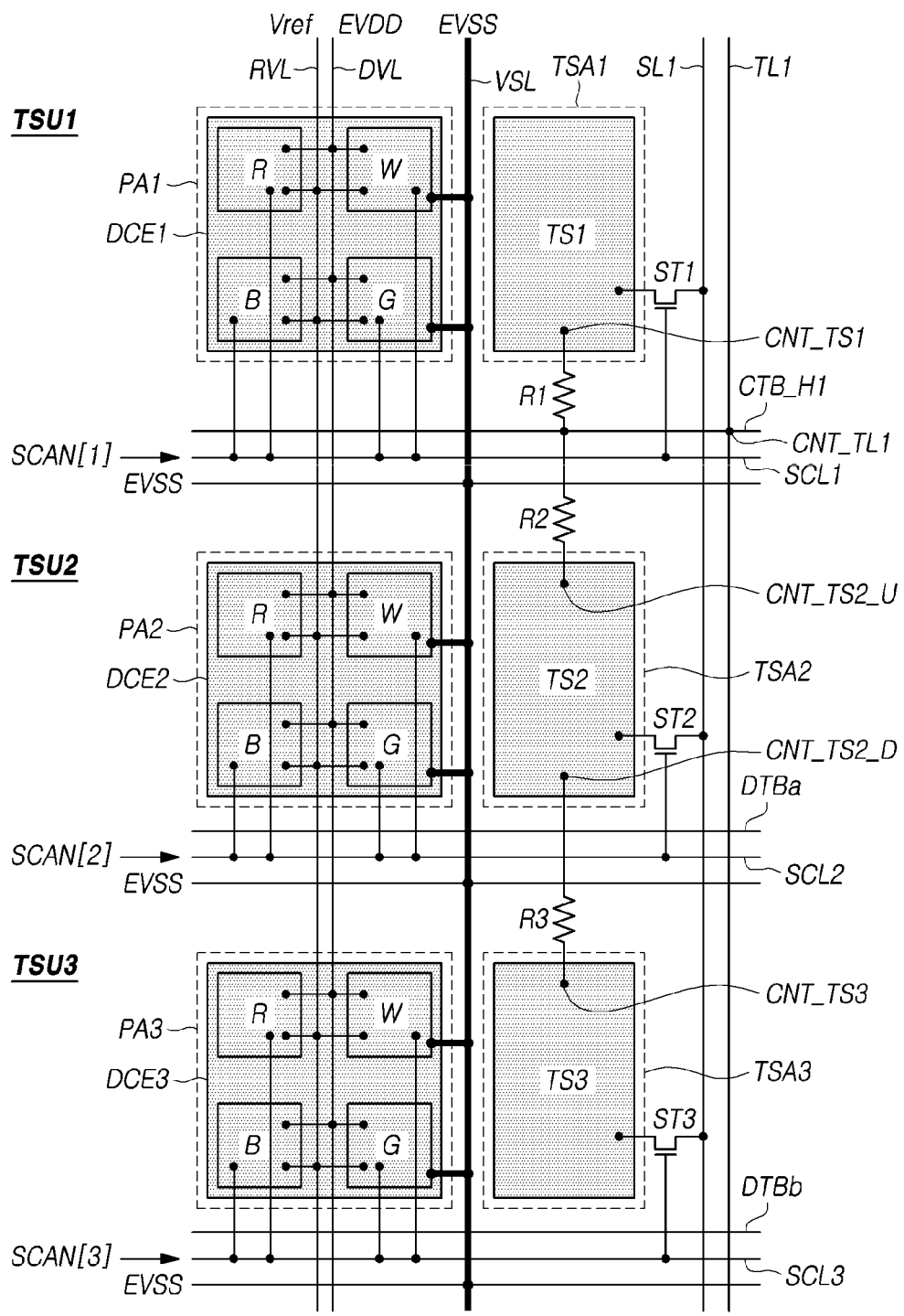
FIG. 21 is a plan view of three touch sensor unit areas to which the first shared touch bridge structure of FIG. 19 is applied.

FIG. 21 is a plan view of three touch sensor unit areas (TSU1, TSU1 and TSU2) to which the first shared touch bridge structure of FIG. 19 is applied.

Referring to FIG. 21, first to third touch sensor unit areas (TSU1, TSU2, and TSU3) may include the first shared touch bridge structure. Among the first to third touch sensor unit areas (TSU1, TSU2, and TSU3) of FIG. 21, the first and second touch sensor unit areas (TSU1 and TSU2) are the same as the first and second touch sensor unit areas TSU1 and TSU2 of FIG. 20. Considering such a same partial configuration, discussions that follow will be provided by focusing on the third touch sensor unit area TSU3 added when compared to the configuration of FIG. 20.

Referring to FIG. 21, the third touch sensor unit area TSU3 may include a third pixel area PA3 adjacent to the second pixel area PA2 in the column direction and a third touch sensor area TSA3 adjacent to the third pixel area PA3 in the row direction.

The third pixel area PA3 may include at least one third subpixel (R, W, B, and/or G), and each third subpixel (R, W, B, and/or G) may include a third light emitting element ED and a third scanning transistor SCT.

Referring to FIG. 21, the third touch sensor unit area TSU3 may further include a third touch sensor TS3 disposed in the third touch sensor area TSA3. The third touch sensor unit area TSU3 may further include a third sensing transistor ST3 configured to control an electrical connection between the first sensing line SL1 and the third touch sensor TS3.

Referring to FIG. 21, the common touch bridge CTB can electrically connect the first touch sensor TS1, the second touch sensor TS2, and the third touch sensor TS3 to the first touch line TL1.

Referring to FIG. 21, the common touch bridge CTB may include the first horizontal common touch bridge line CTB_H1.

Referring to FIG. 21, the first horizontal common touch bridge line CTB_H1 may be electrically connected to the first touch line TL1 at the first touch line connection point CNT_TL1. For example, the first touch line connection point CNT_TL1 may include a contact hole through which the first horizontal common touch bridge line CTB_H1 and the first touch line TL1 are electrically connected.

Referring to FIG. 21, the common touch bridge CTB may include the first resistor pattern R1 located between the first horizontal common touch bridge line CTB_H1 and the first touch sensor TS1.

Referring to FIG. 21, the first resistor pattern R1 may be the first extension portion of the first horizontal common touch bridge line CTB_H1, or the first connection pattern connected to the first horizontal common touch bridge line CTB_H1.

The first resistor pattern R1 may be electrically connected to the first touch sensor TS1 at the first touch sensor connection point CNT_TS1. For example, the first touch line connection point CNT_TS1 may include a contact hole through which the first resistor pattern R1 and the first touch sensor TS1 are electrically connected.

Referring to FIG. 21, the common touch bridge CTB may include the second resistor pattern R2 located between the first horizontal common touch bridge line CTB_H1 and the second touch sensor TS2.

Referring to FIG. 21, the second resistor pattern R2 may be the second extension portion of the first horizontal common touch bridge line CTB_H1, or the second connection pattern electrically connected to the first horizontal common touch bridge line CTB_H1.

The second resistor pattern R2 may be electrically connected to the second touch sensor TS2 at the second touch sensor connection point CNT_TS2_U. For example, the second touch line connection point CNT_TS2_U may include a contact hole through which the second resistor pattern R2 and the second touch sensor TS2 are electrically connected.

Referring to FIG. 21, the common touch bridge CTB may include a third resistor pattern R3 located between the second touch sensor TS2 and the third touch sensor TS3.

Referring to FIG. 21, one end of the third resistor pattern R3 may be electrically connected to the second touch sensor TS2 at another second touch sensor connection point CNT_TS2_D, and the other end of the third resistor pattern R3 may be electrically connected to the third touch sensor TS3 at a third touch sensor connection point CNT_TS3.

For example, the another second touch line connection point CNT_TS2_D may include a contact hole through which one end of the third resistor pattern R3 and the second touch sensor TS2 are electrically connected. For example, the third touch sensor connection point CNT_TS3 may include a contact hole through which the other end of the third resistor pattern R3 and the third touch sensor TS3 are electrically connected.

Referring to FIG. 21, the touch display device 100 according to embodiments of the present disclosure may include the first scanning gate line SCL1 corresponding to the first pixel area PA1 included in the first touch sensor unit area TSU1, the second scanning gate line SCL2 corresponding to the second pixel area PA2 included in the second touch sensor unit area TSU2, and a third scanning gate line SCL3 corresponding to the third pixel area PA3 included in the third touch sensor unit area TSU3.

In the first touch sensor unit area TSU1, the first scanning gate line SCL1 may be electrically connected to the gate node of the first scanning transistor SCT included in the at least one first subpixel (R, W, B, and/or G) in the first pixel area PA1, and be also electrically connected to the gate node of the first sensing transistor ST1.

In the first touch sensor unit area TSU1, the first scanning gate line SCL1 can supply the first scanning gate signal SCAN [1] to the gate node of the first scanning transistor SCT and the gate node of the first sensing transistor ST1 together.

In the second touch sensor unit area TSU2, the second scanning gate line SCL2 may be electrically connected to the gate node of the second scanning transistor SCT included in the at least one second subpixel (R, W, B, and/or G) in the second pixel area PA2, and be also electrically connected to the gate node of the second sensing transistor ST2.

In the second touch sensor unit area TSU2, the second scanning gate line SCL2 can supply the second scanning gate signal SCAN [2] to the gate node of the second scanning transistor SCT and the gate node of the second sensing transistor ST2 together.

In the third touch sensor unit area TSU3, the third scanning gate line SCL3 may be electrically connected to the gate node of a third scanning transistor SCT included in the at least one third subpixel (R, W, B, and/or G) in the third pixel area PA3, and be also electrically connected to the gate node of a third sensing transistor ST3.

In the third touch sensor unit area TSU3, the third scanning gate line SCL3 can supply a third scanning gate signal SCAN [3] to the gate node of the third scanning transistor SCT and the gate node of the third sensing transistor ST3 together.

Referring to FIG. 21, for example, the configuration of scanning gate line lines disposed in the horizontal direction in the first to third touch sensor unit areas (TSU1, TSU2, and TSU3) may include first to third scanning gate lines (SCL1, SCL2, and SCL3) respectively corresponded to the first to third touch sensor unit areas (TSU1, TSU2, and TSU3).

In contrast, the configuration of touch bridges disposed in the horizontal direction in the first to third touch sensor unit areas (TSU1, TSU2, and TSU3) may include only the first horizontal common touch bridge line CTB_H1 corresponding to the first touch sensor unit area TSU1.

Referring to FIG. 21, in the case of the first scanning gate line SCL1 among the first to third scanning gate lines (SCL1, SCL2, and SCL3), a touch bridge configuration (i.e., the first horizontal common touch bridge line CTB_H1) may be present adjacent to, and parallel to, the first scanning gate line SCL1.

In contrast, in the case of the second and third scanning gate lines (SCL2 and SCL3) among the first to third scanning gate lines (SCL1, SCL2, and SCL3), a touch bridge configuration adjacent to, and parallel to, the second and third scanning gate lines (SCL2 and SCL3) may not be present.

Referring to FIG. 21, electrical situations (e.g., electrical connections) between the first to third scanning gate lines (SCL1, SCL2, and SCL3) may be different from each other. Accordingly, an image state in the first pixel area PA1 corresponding to the first scanning gate line SCL1 and image states in the second and third pixel areas (PA2 and PA3) corresponding to the second and third scanning gate lines (SCL2 and SCL3) may be different.

In order to prevent the image abnormal phenomenon caused by imbalance or disparities in image states, a dummy touch bridge configuration adjacent to, and parallel to, the second scanning gate line SCL2 and a touch bridge configuration adjacent to, and parallel to, the third scanning gate line SCL3 may be further disposed in the display device 100.

The touch display device 100 according to embodiments of the present disclosure may include the first dummy touch bridge line DTBa adjacent to, and parallel to, the second scanning gate line SCL2, and a second dummy touch bridge line DTBb adjacent to, and parallel to, the third scanning gate line SCL3.

For example, the first dummy touch bridge line DTBa may be disposed in parallel to the first horizontal common touch bridge line CTB_H1, and be disposed adjacent to, and in parallel to, the second scanning gate line SCL2.

For example, the second dummy touch bridge line DTBb may be disposed in parallel to the first horizontal common touch bridge line CTB_H1, and be disposed adjacent to, and in parallel to, the third scanning gate line SCL3.

The first dummy touch bridge line DTBa and the second dummy touch bridge line DTBb may be electrically separated from the first touch line TL1 and electrically separated from the first horizontal common touch bridge line CTB_H1.

The first dummy touch bridge line DTBa and the second dummy touch bridge line DTBb may be in an electrically floating state.

Referring to FIG. 21, the first touch sensor unit area TSU1 may include the first display common electrode DCE1 disposed in the first pixel area PA1 The second touch sensor unit area TSU2 may include the second display common electrode DCE2 disposed in the second pixel area PA2. The third touch sensor unit area TSU3 may include a third display common electrode DCE3 disposed in the third pixel area PA3.

Referring to FIG. 21, the first display driving line DDL may be electrically connected to the first display common electrode DCE1, the second display common electrode DCE2, and the third display common electrode DCE3.

Referring to FIG. 21, the first touch sensor TS1, the second touch sensor TS2, and the third touch sensor TS3 may include the same material as the first display common electrode DCE1, the second display common electrode DCE2, and the third display common electrode DCE3.

Figure 22:
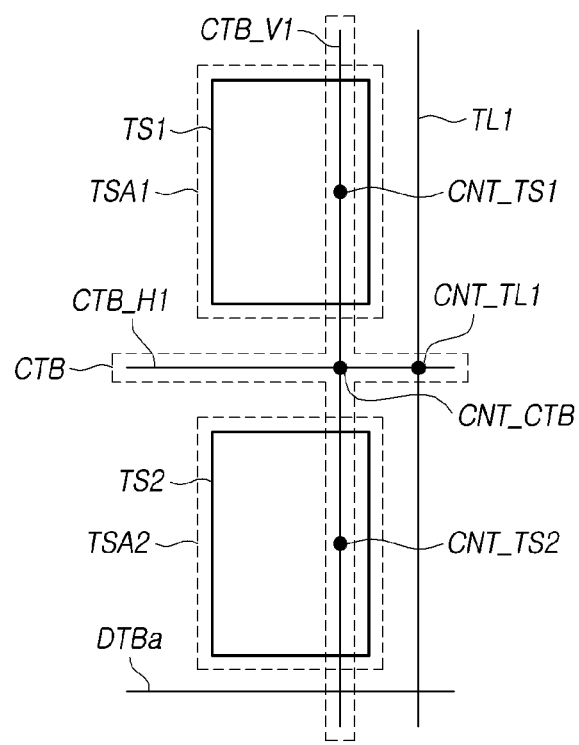
FIG. 22 illustrates a second shared touch bridge structure in the touch display device according to embodiments of the present disclosure.

FIG. 22 illustrates an example second shared touch bridge structure in the touch display device 100 according to embodiments of the present disclosure.

Referring to FIG. 22, the second shared touch bridge structure of the touch display device 100 according to embodiments of the present disclosure may include a common touch bridge CTB for electrically connecting a first touch sensor TS1 and a second touch sensor TS2 to a first touch line TL1.

Referring to FIG. 22, according to the second shared touch bridge structure according to the embodiments of the present disclosure, the common touch bridge CTB may include a first horizontal common touch bridge line CTB_H1 and a first vertical common touch bridge line CTB_V1 intersecting the first horizontal common touch bridge line CTB_H1.

The first horizontal common touch bridge line CTB_H1 may be disposed between the first touch sensor TS1 disposed in a first touch sensor area TSA1 and the second touch sensor TS2 disposed in a second touch sensor area TSA2.

The first horizontal common touch bridge line CTB_H1 may be electrically connected to the first touch line TL1 at a first touch line connection point CNT_TL1.

The first horizontal common touch bridge line CTB_H1 may be electrically connected to the first vertical common touch bridge line CTB_V1 at a common touch bridge crossing point CNT_CTB.

The first vertical common touch bridge line CTB_V1 may be disposed such that it runs across the first touch sensor area TSA1 and the second touch sensor area TSA2. Accordingly, a portion of the first vertical common touch bridge line CTB_V1 may overlap the first touch sensor area TSA1, and another portion of the first vertical common touch bridge line CTB_V1 may overlap the second touch sensor area TSA2.

The first vertical common touch bridge line CTB_V1 may be disposed such that it runs along an area adjacent to the first touch sensor area TSA1 and the second touch sensor area TSA2 without running across the first touch sensor area TSA1 and the second touch sensor area TSA2. Thus, the first vertical common touch bridge line CTB_V1 may not overlap the first touch sensor area TSA1 and the second touch sensor area TSA2.

Referring to FIG. 22, the touch display device 100 according to embodiments of the present disclosure may include a first dummy touch bridge line DTBa disposed in parallel to the first horizontal common touch bridge line CTB_H1 and disposed adjacent to the second touch sensor TS2.

While the first horizontal common touch bridge line CTB_H1 is electrically connected to the first touch line TL1, the first dummy touch bridge line DTBa may be electrically separated from the first touch line TL1.

Hereinafter, the second shared touch bridge structure of the touch display device 100 according to embodiments of the present disclosure will be described in more detail with reference to FIGS. 23 and 24.

Figure 23:
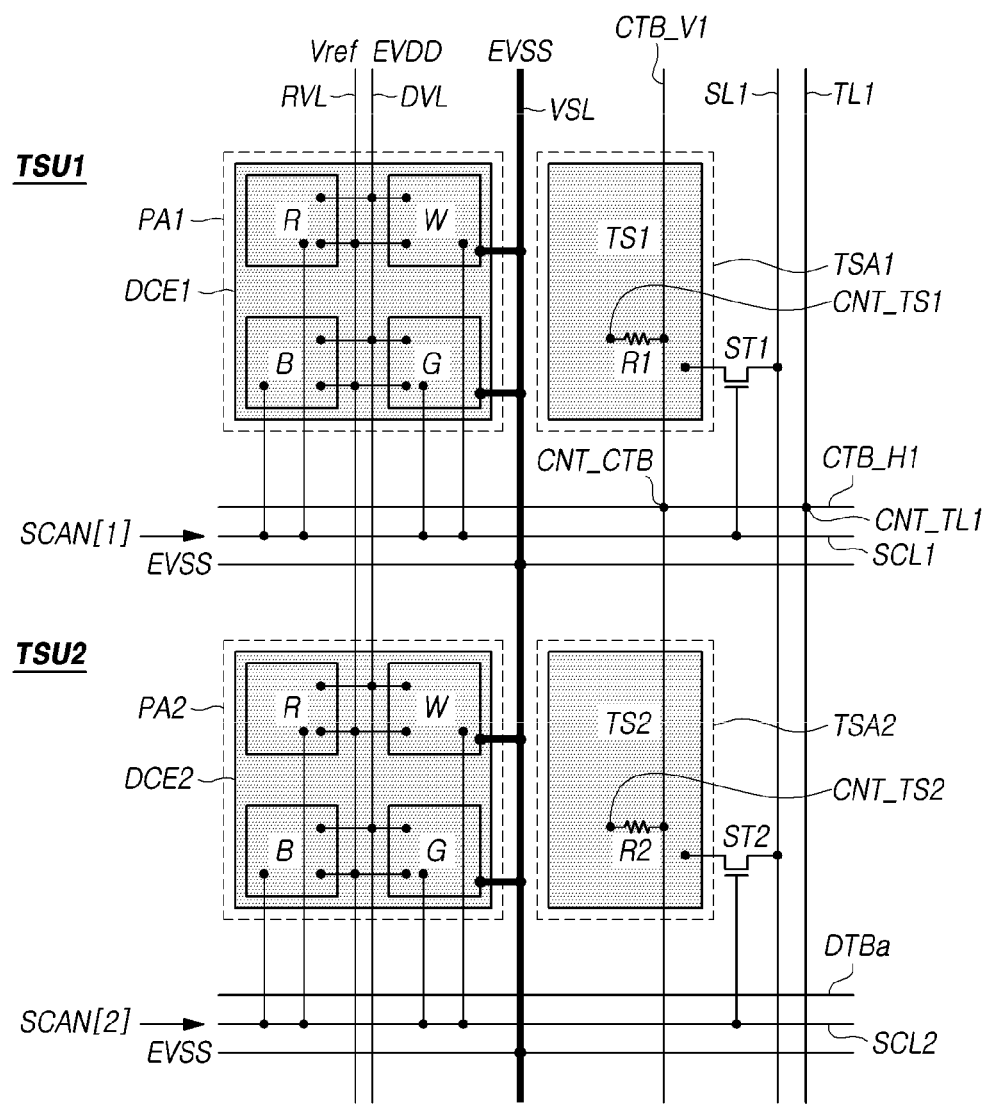
FIG. 23 is a plan view of two touch sensor unit areas to which the second shared touch bridge structure of FIG. 22 is applied.

FIG. 23 is a plan view of two touch sensor unit areas (TSU1 and TSU2) to which the second shared touch bridge structure of FIG. 22 is applied. It should be noted that a partial configuration in the plan view of FIG. 23 and a partial configuration in the plan view of FIG. 20 are the same as each other substantially or nearly. Considering such a similarity, description of substantially the same features or contents as those in the configuration of FIG. 20 will be omitted, and thus, description will be provided by focusing on different features or contents from those in the configuration of FIG. 20.

Referring to FIG. 23, in the case of the second shared touch bridge structure, a common touch bridge CTB may include a first horizontal common touch bridge line CTB_H1 and a first vertical common touch bridge line CTB_V1.

The first horizontal common touch bridge line CTB_H1 may be electrically connected to a first touch line TL1, be disposed between a first touch sensor TS1 and a second touch sensor TS2, and extend in the row direction.

The first vertical common touch bridge line CTB_V1 can connect the first touch sensor TS1 and the second touch sensor TS2 to the first horizontal common touch bridge line CTB_H1, and may intersect the first horizontal common touch bridge line CTB_H1.

Referring to FIG. 23, a portion of the first vertical common touch bridge line CTB_V1 may overlap the first touch sensor TS1, and another portion of the first vertical common touch bridge line CTB_V1 may overlap the second touch sensor TS2.

Referring to FIG. 23, the first vertical common touch bridge line CTB_V1 may be electrically connected to the first touch sensor TS1 at a first touch line connection point CNT_TS1. The first vertical common touch bridge line CTB_V1 may be electrically connected to the second touch sensor TS2 at a second touch sensor connection point CNT_TS2.

Referring to FIG. 23, the common touch bridge CTB may further include a first resistor pattern R1 between the first vertical common touch bridge line CTB_V1 and the first touch sensor TS1, and a second resistor pattern R2 between the first vertical common touch bridge line CTB_V1 and the second touch sensor TS2.

Referring to FIG. 23, the first resistor pattern R1 may be a first extension portion of the first vertical common touch bridge line CTB_V1, or a first connection pattern electrically connected to the first vertical common touch bridge line CTB_V1. The second resistor pattern R2 may be a second extension portion of the first vertical common touch bridge line CTB_V1, or a second connection pattern electrically connected to the first vertical common touch bridge line CTB_V1.

Referring to FIG. 23, a first dummy touch bridge line DTBa may be disposed adjacent to the second touch sensor TS2.

For example, the first dummy touch bridge line DTBa may be disposed in parallel with the first horizontal common touch bridge line CTB_H1 and electrically separated from the first horizontal common touch bridge line CTB_H1.

Referring to FIG. 23, among the first and second scanning gate lines (SCL1 and SCL2), in the case of the first scanning gate line SCL1, a touch bridge configuration (i.e., the first horizontal common touch bridge line CTB_H1) may be present adjacent to, and parallel to, the first scanning gate line SCL1.

In contrast, in the case of the second scanning gate lines SCL2, a touch bridge configuration adjacent to, and parallel to, the second scanning gate lines SCL2 may not be present.

Referring to FIG. 23, electrical situations (e.g., electrical connections) between the first and second scanning gate lines (SCL1 and SCL2) may be different from each other. Accordingly, an image state in the first pixel area PA1 corresponding to the first scanning gate line SCL1 and an image state in the second pixel area PA2 corresponding to the second scanning gate lines SCL2 may be different.

In order to prevent the image abnormal phenomenon caused by imbalance or disparities in image states, a dummy touch bridge configuration adjacent to, and parallel to, the second scanning gate line SCL2 may be further disposed in the display device 100.

The touch display device 100 according to embodiments of the present disclosure may include the first dummy touch bridge line DTBa adjacent to, and parallel to, the second scanning gate line SCL2.

For example, the first dummy touch bridge line DTBa may be disposed in parallel to the first horizontal common touch bridge line CTB_H1, and be disposed adjacent to, and in parallel to, the second scanning gate line SCL2.

For example, the first dummy touch bridge line DTBa may be electrically separated from the first touch line TL1 and electrically separated from the first horizontal common touch bridge line CTB_H1. The first dummy touch bridge line DTBa may be in an electrically floating state.

In examples where the second shared touch bridge structure is applied, the temperature sensing operation described above may be substantially equally applied to temperature sensing operation performed during a display period DP. Considering such a substantially equal operation, hereinafter, while temperature sensing operation is performed during a display period DP, only the on-off operation of the first and second sensing transistors (ST1 and ST2) and the function of the common touch bridge CTB will be briefly described.

During a first period t1 of the display period DP, the first touch sensor TS1 and a first sensing line SL1 may be electrically connected, and a test signal SIG may be supplied to the first sensing line SL1. Thereby, a current can flow through a first touch line TL1.

During a second period t2 of the display period DP, the second touch sensor TS2 and the first sensing line SL1 may be electrically connected, and a test signal SIG may be supplied to the first sensing line SL1. Thereby, a current can flow through the first touch line TL1.

The test signal SIG may be a DC voltage signal having a constant first voltage.

When the test signal SIG is supplied to the first sensing line SL1, a driving signal VCM corresponding to the DC voltage signal may be supplied to the first touch line TL1.

For example, the DC voltage signal of the driving signal VCM supplied to the first touch line TL1 may have a second voltage value less than the first voltage value. In another example, the DC voltage signal of the driving signal VCM supplied to the first touch line TL1 may have a second voltage value greater than the first voltage value.

The test signal SIG may be an AC voltage signal whose voltage level is varied. For example, a voltage level of the test signal SIG may vary in synchronization with rising timing of the scanning gate signals (SCAN[1] and SCAN[2]).

During the first period t1 of the display period DP, as the temperature of the first touch sensor area TSA1 increases, the amount of current flowing through the first touch line TL1 per unit time may increase, and as the temperature of the first touch sensor area TSA1 decreases, the amount of current flowing through the first touch line TL1 per unit time may decrease.

During the second period t2 of the display period DP, as the temperature of the second touch sensor area TSA2 increases, the amount of current flowing through the first touch line TL1 per unit time may increase, and as the temperature of the second touch sensor area TSA2 decreases, the amount of current flowing through the first touch line TL1 per unit time may decrease.

During the first period t1 of the display period DP, when a touch is input in the first touch sensor area TSA1 or around the first touch sensor area TSA1, or when an image displayed in relation to the first pixel area PA1 is changed, the amount of current flowing through the first touch line TL1 per unit time may increase.

During the second period t2 of the display period DP, when a touch is input in the second touch sensor area TSA2 or around the second touch sensor area TSA2, or when an image displayed in relation to the second pixel area PA2 is changed, the amount of current flowing through the first sensing line TL1 per unit time may increase.

As the amount of current flowing through the first touch line TL1 per unit time varies during the display period DP, a touch sensing value obtained during a touch period TP after the display period DP may be varied.

Figure 24:
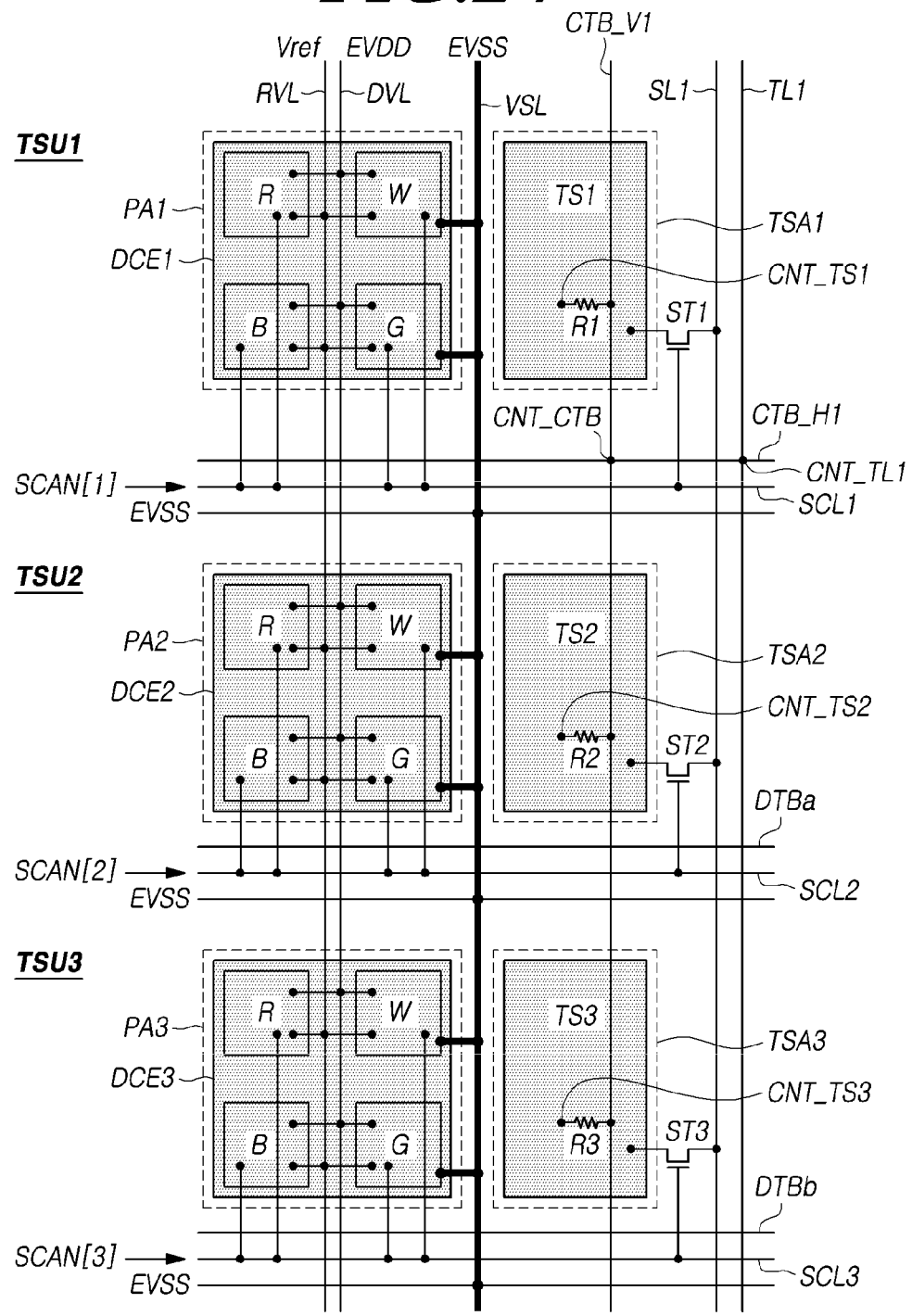
FIG. 24 is a plan view of three touch sensor unit areas to which the second shared touch bridge structure of FIG. 22 is applied.

FIG. 24 is a plan view of three touch sensor unit areas (TSU1, TSU2, and TSU3) to which the second shared touch bridge structure of FIG. 22 is applied. Referring to FIG. 24, first to third touch sensor unit areas (TSU1, TSU2 and TSU3) may include the second shared touch bridge structure. Among the first to third touch sensor unit areas (TSU1, TSU2, and TSU3) of FIG. 24, the first and second touch sensor unit areas (TSU1 and TSU2) are the same as the first and second touch sensor unit areas (TSU1 and TSU2) of FIG. 23. Considering such a same partial configuration, discussions that follow will be provided by focusing on the third touch sensor unit area TSU3 added when compared to the configuration of FIG. 23.

Referring to FIG. 24, the third touch sensor unit area TSU3 may include a third pixel area PA3 adjacent to the second pixel area PA2 in the column direction and a third touch sensor area TSA3 adjacent to the third pixel area PA3 in the row direction.

The third pixel area PA3 may include at least one third subpixel (R, W, B, and/or G), and each third subpixel (R, W, B, and/or G) may include a third light emitting element ED and a third scanning transistor SCT.

Referring to FIG. 24, the third touch sensor unit area TSU3 may further include a third touch sensor TS3 disposed in the third touch sensor area TSA3. The third touch sensor unit area TSU3 may further include a third sensing transistor ST3 configured to control an electrical connection between the first sensing line SL1 and the third touch sensor TS3.

Referring to FIG. 24, a common touch bridge CTB may include a first horizontal common touch bridge line CTB_H1 and a first vertical common touch bridge line CTB_V1.

Referring to FIG. 24, the first horizontal common touch bridge line CTB_H1 may be electrically connected to the first touch line TL1 at the first touch line connection point CNT_TL1. For example, the first touch line connection point CNT_TL1 may include a contact hole through which the first horizontal common touch bridge line CTB_H1 and the first touch line TL1 are electrically connected.

Referring to FIG. 24, the common touch bridge CTB may include the first resistor pattern R1 located between the first vertical common touch bridge line CTB_V1 and the first touch sensor TS1.

The first resistor pattern R1 may be electrically connected to the first touch sensor TS1 at the first touch sensor connection point CNT_TS1. For example, the first touch line connection point CNT_TS1 may include a contact hole through which the first resistor pattern R1 and the first touch sensor TS1 are electrically connected.

Referring to FIG. 24, the common touch bridge CTB may include the second resistor pattern R2 located between the first vertical common touch bridge line CTB_V1 and the second touch sensor TS2.

The second resistor pattern R2 may be electrically connected to the second touch sensor TS2 at the second touch sensor connection point CNT_TS2. For example, the second touch line connection point CNT_TS2_U may include a contact hole through which the second resistor pattern R2 and the second touch sensor TS2 are electrically connected.

Referring to FIG. 24, the common touch bridge CTB may include a third resistor pattern R3 located between the first vertical common touch bridge line CTB_V1 and the third touch sensor TS3.

The third resistor pattern R3 may be electrically connected to the second touch sensor TS3 at a third touch sensor connection point CNT_TS3. For example, the third touch line connection point CNT_TS3 may include a contact hole through which the third resistor pattern R3 and the third touch sensor TS3 are electrically connected.

Referring to FIG. 24, each of the first resistor pattern R1, the second resistor pattern R2, and the third resistor pattern R3 may be a respective extension portion of the first vertical common touch bridge line CTB_V1 or a respective separate pattern connected to the first vertical common touch bridge line CTB_V1.

Referring to FIG. 24, the touch display device 100 according to embodiments of the present disclosure may include the first scanning gate line SCL1 corresponding to the first pixel area PA1 included in the first touch sensor unit area TSU1, the second scanning gate line SCL2 corresponding to the second pixel area PA2 included in the second touch sensor unit area TSU2, and a third scanning gate line SCL3 corresponding to the third pixel area PA3 included in the third touch sensor unit area TSU3.

In the first touch sensor unit area TSU1, the first scanning gate line SCL1 may be electrically connected to the gate node of the first scanning transistor SCT included in the at least one first subpixel (R, W, B, and/or G) in the first pixel area PA1, and be also electrically connected to the gate node of the first sensing transistor ST1.

In the first touch sensor unit area TSU1, the first scanning gate line SCL1 can supply the first scanning gate signal SCAN [1] to the gate node of the first scanning transistor SCT and the gate node of the first sensing transistor ST1 together.

In the second touch sensor unit area TSU2, the second scanning gate line SCL2 may be electrically connected to the gate node of the second scanning transistor SCT included in the at least one second subpixel (R, W, B, and/or G) in the second pixel area PA2, and be also electrically connected to the gate node of the second sensing transistor ST2.

In the second touch sensor unit area TSU2, the second scanning gate line SCL2 can supply the second scanning gate signal SCAN [2] to the gate node of the second scanning transistor SCT and the gate node of the second sensing transistor ST2 together.

In the third touch sensor unit area TSU3, the third scanning gate line SCL3 may be electrically connected to the gate node of a third scanning transistor SCT included in the at least one third subpixel (R, W, B, and/or G) in the third pixel area PA3, and be also electrically connected to the gate node of a third sensing transistor ST3.

In the third touch sensor unit area TSU3, the third scanning gate line SCL3 can supply a third scanning gate signal SCAN [3] to the gate node of the third scanning transistor SCT and the gate node of the third sensing transistor ST3 together.

Referring to FIG. 24, for example, the configuration of scanning gate line lines disposed in the horizontal direction in the first to third touch sensor unit areas (TSU1, TSU2, and TSU3) may include first to third scanning gate lines (SCL1, SCL2, and SCL3) respectively corresponded to the first to third touch sensor unit areas (TSU1, TSU2, and TSU3).

In contrast, the configuration of touch bridges disposed in the horizontal direction in the first to third touch sensor unit areas (TSU1, TSU2, and TSU3) may include only the first horizontal common touch bridge line CTB_H1 corresponding to the first touch sensor unit area TSU1.

Referring to FIG. 24, in the case of the first scanning gate line SCL1 among the first to third scanning gate lines (SCL1, SCL2, and SCL3), a touch bridge configuration (i.e., the first horizontal common touch bridge line CTB_H1) may be present adjacent to, and parallel to, the first scanning gate line SCL1.

In contrast, in the case of the second and third scanning gate lines (SCL2 and SCL3) among the first to third scanning gate lines (SCL1, SCL2, and SCL3), a touch bridge configuration adjacent to, and parallel to, the second and third scanning gate lines (SCL2 and SCL3) may not be present.

Referring to FIG. 24, electrical situations (e.g., electrical connections) between the first to third scanning gate lines (SCL1, SCL2, and SCL3) may be different from each other. Accordingly, an image state in the first pixel area PA1 corresponding to the first scanning gate line SCL1 and image states in the second and third pixel areas (PA2 and PA3) corresponding to the second and third scanning gate lines (SCL2 and SCL3) may be different.

In order to prevent imbalance or disparities in image states, a dummy touch bridge configuration adjacent to, and parallel to, the second scanning gate line SCL2, and a touch bridge configuration adjacent to, and parallel to, the third scanning gate line SCL3 may be further disposed in the display device 100.

The touch display device 100 according to embodiments of the present disclosure may include the first dummy touch bridge line DTBa adjacent to, and parallel to, the second scanning gate line SCL2, and a second dummy touch bridge line DTBb adjacent to, and parallel to, the third scanning gate line SCL3.

For example, the first dummy touch bridge line DTBa may be disposed in parallel to the first horizontal common touch bridge line CTB_H1, and be disposed adjacent to, and in parallel to, the second scanning gate line SCL2.

For example, the second dummy touch bridge line DTBb may be disposed in parallel to the first horizontal common touch bridge line CTB_H1, and be disposed adjacent to, and in parallel to, the third scanning gate line SCL3.

The first dummy touch bridge line DTBa and the second dummy touch bridge line DTBb may be electrically separated from the first touch line TL1 and electrically separated from the first horizontal common touch bridge line CTB_H1.

The first dummy touch bridge line DTBa and the second dummy touch bridge line DTBb may be in an electrically floating state.

Referring to FIG. 24, the first touch sensor unit area TSU1 may include a first display common electrode DCE1 disposed in the first pixel area PA1. The second touch sensor unit area TSU2 may include a second display common electrode DCE2 disposed in the second pixel area PA2. The third touch sensor unit area TSU3 may include a third display common electrode DCE3 disposed in the third pixel area PA3.

Referring to FIG. 24, a first display driving line DDL may be electrically connected to the first display common electrode DCE1, the second display common electrode DCE2, and the third display common electrode DCE3.

Referring to FIG. 24, the first touch sensor TS1, the second touch sensor TS2, and the third touch sensor TS3 may include the same material as the first display common electrode DCE1, the second display common electrode DCE2, and the third display common electrode DCE3.

Figure 25:
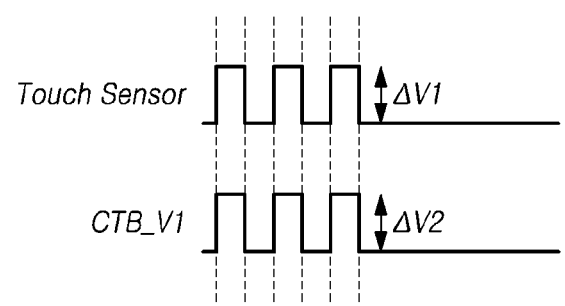
FIG. 25 illustrates driving synchronization between a first vertical common touch bridge line and a touch sensor in a touch display device according to embodiments of the present disclosure.

FIG. 25 illustrates driving synchronization between a first vertical common touch bridge line CTB_V1 and a touch sensor in the touch display device according to embodiments of the present disclosure.

Referring to FIG. 25, during a touch period TP for touch sensing, the first and second sensing transistors (ST1 and ST2) may be turned off.

During the touch period TP, the touch driving circuit 160 can output a touch driving signal TDS having a variable voltage level to the first touch line TL1.

The touch driving signal TDS applied to the first touch line TL1 can be supplied to the first touch sensor TS1 and the second touch sensor TS2 through the common touch bridge CTB electrically connected to the first touch line TL1.

Therefore, when the first sensing transistor ST1 and the second sensing transistor ST2 are turned off, during the touch period TP, a signal having a variable voltage level can be applied to the first vertical common touch bridge line CTB_V1 included in the common touch bridge CTB.

The amplitude ΔV2 of the signal applied to the first vertical common touch bridge line CTB_V1 may be the same as, or similar in a predefined range to, the amplitude ΔV1 of the touch driving signal TDS applied to the touch sensors (TS1 and TS2).

Accordingly, even when the first vertical common touch bridge line CTB_V1 overlaps the touch sensors (TS1 and TS2) as shown in FIGS. 23 and 24, an electric potential difference may not occur. As a result, the formation of parasitic capacitance between the first vertical common touch bridge line CTB_V1 and the touch sensors (TS1 and TS2) can be eliminated or reduced.

Figure 26:
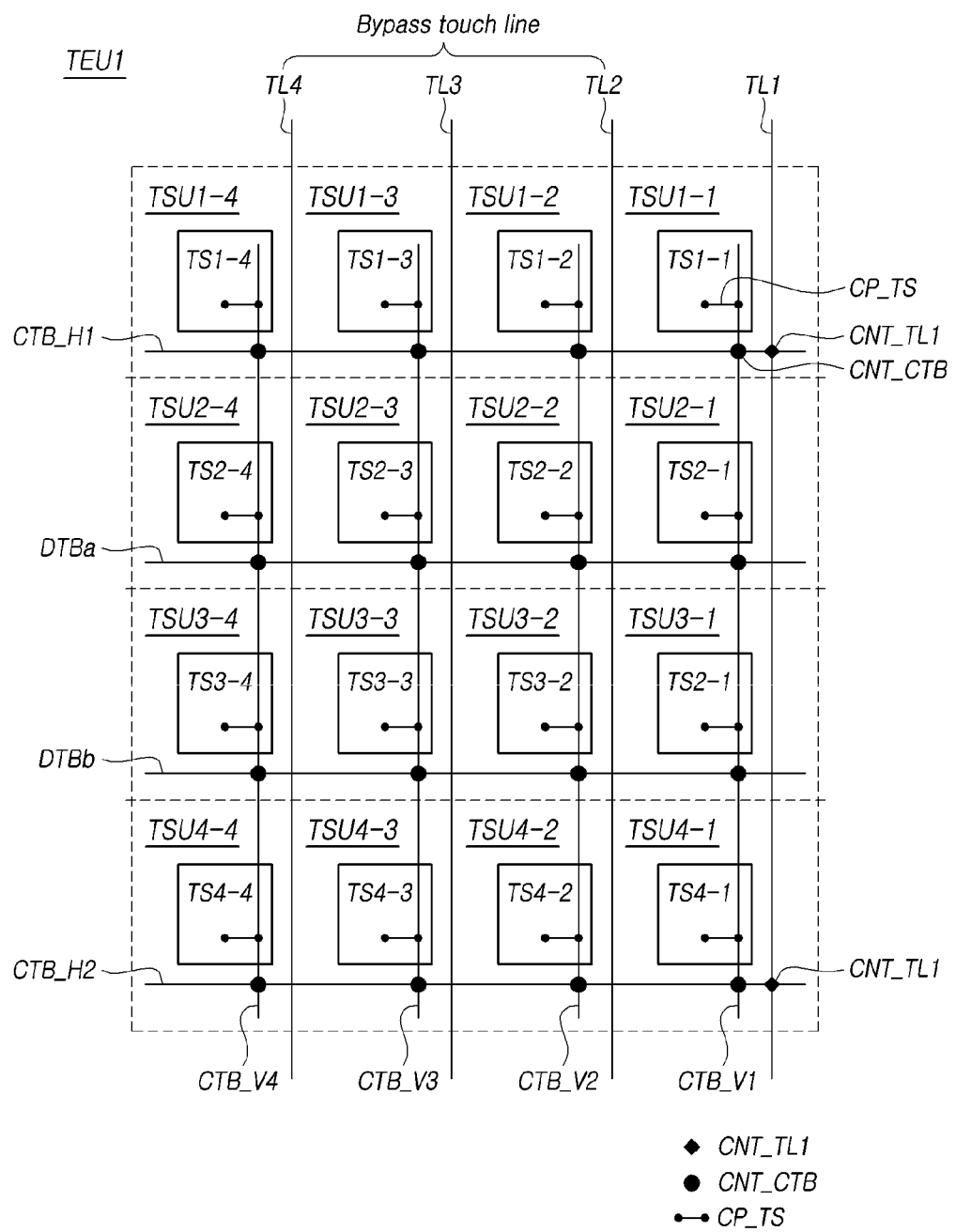
FIG. 26 is a plan view schematically illustrating a first touch electrode area to which the second shared touch bridge structure of FIGS. 22 to 24 is applied.

FIG. 26 is a plan view illustrating an example first touch electrode area TEU1 to which the second shared touch bridge structure of FIGS. 22 to 24 is applied.

It should be noted here that only components driven for touch sensing during a touch period TP are shown in FIG. 26. Referring to FIG. 26, components driven for touch sensing during a touch period TP may include a first touch line TL1, a common touch bridge CTB, and touch sensors included in the first touch electrode area TEU1.

For example, FIG. 26 illustrates an example where the first touch electrode area TEU1 is an area where a first touch electrode TE1 is disposed, the number of touch sensor rows is four, and the number of touch sensor columns is four.

Referring to FIG. 26, for example, the first touch electrode area TEU1 may include 16 touch sensor unit areas (TSU1-1, TSU1-2, TSU1-3, TSU1-4, TSU2-1, TSU2-2, TSU2-3, TSU2-4, TSU3-1, TSU3-2, TSU3-3, TSU3-4, TSU4-1, TSU4-2, TSU4-3, and TSU4-4). The 16 touch sensor unit areas (TSU1-1, TSU1-2, TSU1-3, TSU1-4, TSU2-1, TSU2-2, TSU2-3, TSU2-4, TSU3-1, TSU3-2, TSU3-3, TSU3-4, TSU4-1, TSU4-2, TSU4-3, and TSU4-4) can be arranged in 4 rows and 4 columns. However, for convenience of explanation, respective pixel areas included in the 16 touch sensor unit areas (TSU1-1, TSU1-2, TSU1-3, TSU1-4, TSU2-1, TSU2-2, TSU2-3, TSU2-4, TSU3-1, TSU3-2, TSU3-3, TSU3-4, TSU4-1, TSU4-2, TSU4-3, and TSU4-4) are omitted in FIG. 26. Further, for convenience of explanation, discussions for respective pixel areas included in the 16 touch sensor unit areas (TSU1-1, TSU1-2, TSU1-3, TSU1-4, TSU2-1, TSU2-2, TSU2-3, TSU2-4, TSU3-1, TSU3-2, TSU3-3, TSU3-4, TSU4-1, TSU4-2, TSU4-3, and TSU4-4) are omitted.

Referring to FIG. 26, 16 touch sensors (TS1-1, TS1-2, TS1-3, TS1-4, TS2-1, TS2-2, TS2-3, TS2-4, TS3-1, TS3-2, TS3-3, TS3-4, TS4-1, TS4-2, TS4-3, and TS4-4) may be disposed in the 16 touch sensor unit areas (TSU1-1, TSU1-2, TSU1-3, TSU1-4, TSU2-1, TSU2-2, TSU2-3, TSU2-4, TSU3-1, TSU3-2, TSU3-3, TSU3-4, TSU4-1, TSU4-2, TSU4-3, and TSU4-4), respectively.

Referring to FIG. 26, the 16 touch sensors (TS1-1, TS1-2, TS1-3, TS1-4, TS2-1, TS2-2, TS2-3, TS2-4, TS3-1, TS3-2, TS3-3, TS3-4, TS4-1, TS4-2, TS4-3, and TS4-4) may be electrically connected by the common touch bridge CTB, and thereby, may form one first touch electrode TE1.

Referring to FIG. 26, the common touch bridge CTB included in the first touch electrode area TEU1 may include n horizontal common touch bridge lines (e.g., CTB_H1 and CTB_H2) and m vertical common touch bridge lines (e.g., CTB_V1, CTB_V2, CTB_V3, and CTB_V4).

The number n of the horizontal common touch bridge lines (e.g., CTB_H1 and CTB_H2) may be 1 or more.

In the example of FIG. 26, n is 2. Accordingly, the first touch electrode area TEU1 may include a first horizontal common touch bridge line CTB_H1 and a second horizontal common touch bridge line CTB_H2.

The number m of the vertical common touch bridge lines (e.g., CTB_V1, CTB_V2, CTB_V3, and CTB_V4) may be the number of touch sensor columns included in the first touch electrode area TEU1.

In the example of FIG. 26, the number of touch sensor rows may be 4, and the number of touch sensor columns may be 4. Accordingly, the first touch electrode area TEU1 may include a first vertical common touch bridge line CTB_V1, a second vertical common touch bridge line CTB_V2, a third vertical common touch bridge line CTB_V3, and a fourth vertical common touch bridge line CTB_V4.

Referring to FIG. 26, a plurality of touch lines (TL1, TL2, TL3, and TL4) may run across the first touch electrode unit area TEU1.

Among the plurality of touch lines (TL1, TL2, TL3, and TL4), the first touch line TL1 may be electrically connected to the first touch electrode TE1, and the second to fourth touch lines (TL2, TL3, and TL4) may be touch lines bypassing the first touch electrode TE1 without being electrically connected to the first touch electrode TE1. That is, the first touch line TL1 may be electrically connected to the 16 touch sensors (TS1-1, TS1-2, TS1-3, TS1-4, TS2-1, TS2-2, TS2-3, TS2-4, TS3-1, TS3-2, TS3-3, TS3-4, TS4-1, TS4-2, TS4-3, and TS4-4) forming the first touch electrode TE1.

Referring to FIG. 26, in the first touch electrode unit area TEU1, the first vertical common touch bridge line CTB_V1 may be disposed such that it corresponds to a first touch sensor column, the second vertical common touch bridge line CTB_V2 may be disposed such that it corresponds to a second touch sensor column, the third vertical common touch bridge line CTB_V3 may be disposed such that it corresponds to a third touch sensor column, and the fourth vertical common touch bridge line CTB_V4 may be disposed such that it corresponds to a fourth touch sensor column.

Referring to FIG. 26, in the first touch electrode unit area TEU1, the first horizontal common touch bridge line CTB_H1 may be disposed such that it corresponds to a first touch sensor row, and the second horizontal common touch bridge line CTB_H2 may be disposed such that it corresponds to a fourth touch sensor row.

Referring to FIG. 26, in the first touch electrode unit area TEU1, a first dummy touch bridge line DTBa may be disposed such that it corresponds to a second touch sensor row, and a second dummy touch bridge line DTBb may be disposed such that it corresponds to a third touch sensor row.

Referring to FIG. 26, the first horizontal common touch bridge line CTB_H1 may be electrically connected to the first touch line TL1 at a first touch line connection point CNT_TL1, and the second horizontal common touch bridge line CTB_H2 may be electrically connected to the first touch line TL1 at another first touch line connection point CNT_TL1.

Referring to FIG. 26, the first horizontal common touch bridge line CTB_H1 may have four different common touch bridge intersecting points CNT_CTB.

The four common touch bridge intersecting points CNT_CTB of the first horizontal common touch bridge line CTB_H1 may be electrically connected to the first vertical common touch bridge line CTB_V1, the second vertical common touch bridge line CTB_V2, the third vertical common touch bridge line CTB_V3, and the fourth vertical common touch bridge line CTB_V4.

Referring to FIG. 26, the second horizontal common touch bridge line CTB_H2 may have four different common touch bridge intersecting points CNT_CTB.

The four common touch bridge intersecting points CNT_CTB of the second horizontal common touch bridge line CTB_H2 may be electrically connected to the first vertical common touch bridge line CTB_V1, the second vertical common touch bridge line CTB_V2, the third vertical common touch bridge line CTB_V3, and the fourth vertical common touch bridge line CTB_V4.

Referring to FIG. 26, the first vertical common touch bridge line CTB_V1, the second vertical common touch bridge line CTB_V2, the third vertical common touch bridge line CTB_V3, and the fourth vertical common touch bridge line CTB_V4 may intersect the first dummy touch bridge line DTBa and the second dummy touch bridge line DTBb.

In contrast, the first vertical common touch bridge line CTB_V1, the second vertical common touch bridge line CTB_V2, the third vertical common touch bridge line CTB_V3, and the fourth vertical common touch bridge line CTB_V4 may be electrically separated from the first dummy touch bridge line DTBa and the second dummy touch bridge line DTBb.

Referring to FIG. 26, the first vertical common touch bridge line CTB_V1 may be electrically connected to four touch sensors (TS1-1, TS2-1, TS3-1, and TS4-1) arranged in the first touch sensor column from the right through four connection patterns CP_TS. For example, each of the four connection patterns CP_TS may be a respective extension portion of the first vertical common touch bridge line CTB_V1 or be a respective pattern connected to the first vertical common touch bridge line CTB_V1, and may be referred to as a resistor pattern having a predetermined resistance value.

The second vertical common touch bridge line CTB_V2 may be electrically connected to four touch sensors (TS1-2, TS2-2, TS3-2, and TS4-2) arranged in the second touch sensor column from the right through four connection patterns CP_TS. For example, each of the four connection patterns CP_TS may be a respective extension portion of the second vertical common touch bridge line CTB_V2 or be a respective pattern connected to the second vertical common touch bridge line CTB_V2, and may be referred to as a resistor pattern having a predetermined resistance value.

The third vertical common touch bridge line CTB_V3 may be electrically connected to four touch sensors (TS1-3, TS2-3, TS3-3, and TS4-3) arranged in the third touch sensor column from the right through four connection patterns CP_TS. For example, each of the four connection patterns CP_TS may be a respective extension portion of the third vertical common touch bridge line CTB_V3 or be a respective pattern connected to the third vertical common touch bridge line CTB_V3, and may be referred to as a resistor pattern having a predetermined resistance value.

The fourth vertical common touch bridge line CTB_V4 may be electrically connected to four touch sensors (TS1-4, TS2-4, TS3-4, and TS4-4) arranged in the fourth touch sensor column from the right through four connection patterns CP_TS. For example, each of the four connection patterns CP_TS may be a respective extension portion of the fourth vertical common touch bridge line CTB_V4 or be a respective pattern connected to the fourth vertical common touch bridge line CTB_V4, and may be referred to as a resistor pattern having a predetermined resistance value.

According to the embodiments described herein, the touch display device 100 and the touch sensing method for removing a ghost touch can be provided.

According to the embodiments described herein, the touch display device 100 and the touch sensing method can be provided for preventing a ghost touch from being recognized after a touch input by a touch object such as a finger is performed.

According to the embodiments described herein, the touch display device 100 and the touch sensing method can be provided for preventing a ghost touch from being recognized in a situation where an image is changed.

According to the embodiments described herein, the touch display device 100 can be provided that has a temperature sensor structure with a form combined with a touch sensor structure, and the touch sensing method performed based on the temperature sensor structure can be provided.

According to the embodiments described herein, the touch display device 100 and the touch sensing method can be provided for compensating for a value resulting from touch sensing based on a value obtained by sensing current in which temperature is reflected.

According to the embodiments described herein, the touch display device 100 can be provided that has a shared touch bridge structure capable of reducing parasitic capacitance and load in relation to a touch sensor structure, and the touch sensing method performed based on the shared touch bridge structure can be provided.

According to the embodiments described herein, the touch display device 100 can be provided that has a dummy touch bridge structure capable of preventing a phenomenon where a specific area (e.g., a specific horizontal area) in a screen is displayed abnormally, and the touch sensing method performed based on the dummy touch bridge structure can be provided.

The above description has been presented to enable any person skilled in the art to make, use and practice the technical features of the present disclosure, and has been provided in the context of a particular application and its requirements as examples. Various modifications, additions and substitutions to the described embodiments will be readily apparent to those skilled in the art, and the principles described herein may be applied to other embodiments and applications without departing from the scope of the present disclosure. The above description and the accompanying drawings provide examples of the technical features of the present disclosure for illustrative purposes only. That is, the disclosed embodiments are intended to illustrate the scope of the technical features of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A touch display device comprising:
    a first subpixel included in a first pixel area, the first subpixel having a first light emitting element and a first scanning transistor;
    a second subpixel included in a second pixel area adjacent to the first pixel area in a column direction, the second subpixel having a second light emitting element and a second scanning transistor;
    a first touch sensor disposed in a first touch sensor area adjacent to the first pixel area in a row direction;
    a second touch sensor disposed in a second touch sensor area adjacent to the second pixel area in the row direction;
    a first touch line electrically connected to the first touch sensor and the second touch sensor and extending in the column direction;
    a first sensing line disposed adjacent to the first touch line and extending in the column direction;
    a first sensing transistor configured to control an electrical connection between the first sensing line and the first touch sensor;
    a second sensing transistor configured to control an electrical connection between the first sensing line and the second touch sensor; and
    a common touch bridge electrically connecting the first touch sensor and the second touch sensor to the first touch line,
    wherein the common touch bridge comprises:
    a first horizontal common touch bridge line electrically connected to the first touch line, disposed between the first touch sensor and the second touch sensor, and extending in the row direction, and
    a first vertical common touch bridge line that connects the first touch sensor and the second touch sensor to the first horizontal common touch bridge line and intersects the first horizontal common touch bridge line.

2. The touch display device of claim 1, further comprising:
    a first scanning gate line electrically connected to a gate node of the first scanning transistor and a gate node of the first sensing transistor; and
    a second scanning gate line electrically connected to a gate node of the second scanning transistor and a gate node of the second sensing transistor.

3. The touch display device of claim 1, further comprising: a dummy touch bridge line electrically separated from the first touch line.

4. The touch display device of claim 1, further comprising:
    a third subpixel included in a third pixel area adjacent to the second pixel area in the column direction and comprising a third light emitting element and a third scanning transistor;
    a third touch sensor disposed in a third touch sensor area adjacent to the third pixel area in the row direction; and
    a third sensing transistor configured to control an electrical connection between the first sensing line and the third touch sensor,
    wherein the common touch bridge electrically connects the first touch sensor, the second touch sensor, and the third touch sensor to the first touch line.

5. The touch display device of claim 1, wherein the first vertical common touch bridge further comprises:
    a first resistor pattern located between the first horizontal common touch bridge line and the first touch sensor; and
    a second resistor pattern located between the first horizontal common touch bridge line and the second touch sensor, and
    wherein the first resistor pattern is a first extension portion of the first horizontal common touch bridge line or a first connection pattern electrically connected to the first horizontal common touch bridge line, and the second resistor pattern is a second extension portion of the first horizontal common touch bridge line or a second connection pattern electrically connected to the first horizontal common touch bridge line.

6. The touch display device of claim 1, further comprising: a dummy touch bridge line adjacent to the second touch sensor in the column direction, disposed parallel to the first horizontal common touch bridge line, and electrically separated from the first horizontal common touch bridge line.

7. The touch display device of claim 1, wherein the vertical common touch bridge further comprises:
    a first resistor pattern located between the first vertical common touch bridge line and the first touch sensor; and
    a second resistor pattern located between the first vertical common touch bridge line and the second touch sensor,
    wherein the first resistor pattern is a first extension portion of the first vertical common touch bridge line or a first connection pattern electrically connected to the first vertical common touch bridge line, and the second resistor pattern is a second extension portion of the first vertical common touch bridge line or a second connection pattern electrically connected to the first vertical common touch bridge line.

8. The touch display device of claim 1, further comprising: a dummy touch bridge line adjacent to the second touch sensor in the column direction, disposed parallel to the first horizontal common touch bridge line, and electrically separated from the first horizontal common touch bridge line.

9. The touch display device of claim 1, wherein a portion of the first vertical common touch bridge line overlaps the first touch sensor, and another portion of the first vertical common touch bridge line overlaps the second touch sensor.

10. The touch display device of claim 1, wherein when the first sensing transistor and the second sensing transistor are turned off, a signal having a variable voltage level is supplied to the first vertical common touch bridge line.

11. The touch display device of claim 1, wherein each of the first touch sensor area and the second touch sensor area is included in a transmissive area allowing light to be transmitted.

12. The touch display device of claim 1, further comprising: a first display driving line connected to the first subpixel and the second subpixel,
    wherein the first display driving line is disposed in the column direction, and runs across an area between the first subpixel and the first touch sensor and through an area between the second subpixel and the second touch sensor.

13. The touch display device of claim 12, further comprising:
a first display common electrode disposed in the first pixel area; and
a second display common electrode disposed in the second pixel area,
wherein the first display driving line is electrically connected to the first display common electrode and the second display common electrode, and
wherein the first touch sensor and the second touch sensor comprise a same material as the first display common electrode and the second display common electrode.

14. The touch display device of claim 1, further comprising: at least one organic layer included in the first light emitting element and the second light emitting element or disposed over or under the first light emitting element and the second light emitting element.

15. The touch display device of claim 1, wherein a display period of the touch display device includes a first period in which a first image data voltage is supplied to the first subpixel and a second period in which a second image data voltage is supplied to the second subpixel,
wherein during the first period, the first sensing transistor is turned on together with the first scanning transistor,
wherein during the second period, the second sensing transistor is turned on together with the second scanning transistor, and
wherein during a touch period different from the display period, the first sensing transistor and the second sensing transistor are turned off.

16. The touch display device of claim 15, wherein during the first period, the first touch sensor and the first sensing line are electrically connected, a first test signal is supplied to the first touch line, and a first current flows through the first sensing line, and
wherein during the second period, the second touch sensor and the first sensing line are electrically connected, a second test signal is supplied to the first touch line, and a second current flows through the first sensing line.

17. The touch display device of claim 15, wherein during the first period, the first touch sensor and the first sensing line are electrically connected, a first test signal is supplied to the first sensing line, and a first current flows in the first touch line, and
wherein during the second period, the second touch sensor and the first sensing line are electrically connected, the second test signal is supplied to the first sensing line, and a second current flows through the first touch line.

18. A touch sensing method comprising:
acquiring a temperature sensing value by sensing a temperature of a first touch sensor area of a touch display device;
acquiring a first touch sensing value through the first touch sensor during a touch period;
generating a second touch sensing value by changing the first touch sensing value based on the temperature sensing value; and
determining whether a touch event has occurred is input or a touch location based on the second touch sensing value,
wherein the touch display device comprising:
a first subpixel included in a first pixel area, the first subpixel having a first light emitting element and a first scanning transistor;
a second subpixel included in a second pixel area adjacent to the first pixel area in a column direction, the second subpixel having a second light emitting element and a second scanning transistor;
the first touch sensor disposed in the first touch sensor area adjacent to the first pixel area in a row direction;
a second touch sensor disposed in a second touch sensor area adjacent to the second pixel area in the row direction;
a first touch line electrically connected to the first touch sensor and the second touch sensor and extending in the column direction;
a first sensing line disposed adjacent to the first touch line and extending in the column direction;
a first sensing transistor configured to control an electrical connection between the first sensing line and the first touch sensor;
a second sensing transistor configured to control an electrical connection between the first sensing line and the second touch sensor; and
a common touch bridge electrically connecting the first touch sensor and the second touch sensor to the first touch line,
wherein a display period of the touch display device includes a first period in which a first image data voltage is supplied to the first subpixel and a second period in which a second image data voltage is supplied to the second subpixel,
wherein during the first period, the first sensing transistor is turned on together with the first scanning transistor,
wherein during the second period, the second sensing transistor is turned on together with the second scanning transistor, and
wherein during a touch period different from the display period, the first sensing transistor and the second sensing transistor are turned off.

19. The method of claim 18 wherein the step of acquiring a temperature sensing value by sensing a temperature of a first touch sensor area includes:
acquiring a current sensing value as the temperature sensing value by sensing a current through the first touch sensor.

20. The method of claim 18 wherein the touch event is a touch input.

21. The method of claim 18 wherein the touch event is sensing a touch location.